(12) United States Patent
Michiwaki

(10) Patent No.: US 9,909,608 B2
(45) Date of Patent: Mar. 6, 2018

(54) STRUCTURE FOR PREVENTING REVERSE ROTATION OF THREADED BODY

(71) Applicants: Next Innovation Inc., Tokyo (JP); NejiLaw inc., Tokyo (JP)

(72) Inventor: Hiroshi Michiwaki, Tokyo (JP)

(73) Assignees: Nejilaw Inc., Tokyo (JP); Next Innovation Inc., Tokyo (JP)

( * ) Notice: Subject to any disclaimer, the term of this patent is extended or adjusted under 35 U.S.C. 154(b) by 0 days.

(21) Appl. No.: 14/909,444

(22) PCT Filed: Jul. 31, 2014

(86) PCT No.: PCT/JP2014/070232
§ 371 (c)(1),
(2) Date: May 23, 2016

(87) PCT Pub. No.: WO2015/016317
PCT Pub. Date: Feb. 5, 2015

(65) Prior Publication Data
US 2016/0290384 A1    Oct. 6, 2016

(30) Foreign Application Priority Data

Aug. 1, 2013  (JP) .................................. 2013-160201
Aug. 30, 2013 (JP) .................................. 2013-179660
Oct. 15, 2013 (JP) .................................. 2013-214728

(51) Int. Cl.
*F16B 39/24* (2006.01)
*F16B 39/282* (2006.01)
*F16B 43/00* (2006.01)

(52) U.S. Cl.
CPC ............ *F16B 39/24* (2013.01); *F16B 39/282* (2013.01); *F16B 43/00* (2013.01)

(58) Field of Classification Search
CPC .......... F16B 39/22; F16B 39/24; F16B 39/28; F16B 39/282; F16B 39/122; F16B 43/00
(Continued)

(56) References Cited

U.S. PATENT DOCUMENTS 1,009,244 A     11/1911  Hartsough
1,876,836 A  *   9/1932  Berge .................. F16B 39/24
                                                      411/148

(Continued)

FOREIGN PATENT DOCUMENTS

CN    1042399    5/1990
DE    3309884    9/1984

(Continued)

OTHER PUBLICATIONS

EP14832134, "Extended European Search Report", Mar. 2, 2017, 8 pages.

(Continued)

*Primary Examiner* — Roberta Delisle
(74) *Attorney, Agent, or Firm* — Kilpatrick Townsend & Stockton LLP

(57) ABSTRACT

The objective is to prevent the loosening of a structure with which a member 80 to be fastened and a base material 90 are fastened through a male screw body 10 and a washer 50. A screw-body-side seat part 22 is formed on the male screw body 10, and a first receiving part 60 and second receiving part 70 are formed on the washer side. A member-side seat part 82 is formed on the member 80 to be fastened. The first receiving part 60 and the screw-body-side seat part 22 have sawtooth-shaped recesses and protrusions. When an attempt is made to rotate the male screw body 10 in the direction of loosening, the recesses and protrusions engage one another, thereby preventing rotation. A recessed housing part of the member-side seat part 82 and the outer wall of the second (Continued)

receiving part 70 of the washer 50 have an eccentric circular shape. When an attempt is made to rotate the washer 50 in the direction of loosening, the eccentric circular shapes engage one another, thereby preventing rotation.

18 Claims, 51 Drawing Sheets

(58) Field of Classification Search
    USPC .................. 411/132, 143, 145, 147, 149
    See application file for complete search history.

(56) References Cited

U.S. PATENT DOCUMENTS

| | | | | |
|---|---|---|---|---|
| 2,537,575 | A * | 1/1951 | Crowther | F16B 43/00 411/134 |
| 2,746,506 | A * | 5/1956 | Poupitch | F16B 39/24 411/134 |
| 3,241,589 | A * | 3/1966 | Enders | F16B 39/24 411/135 |
| 3,275,055 | A * | 9/1966 | Gutshall | F16B 39/24 411/134 |
| 3,385,341 | A * | 5/1968 | Garstkiewicz | F16B 39/24 411/134 |
| 3,417,802 | A * | 12/1968 | Oldenkott | F16B 39/24 411/134 |
| 3,540,509 | A * | 11/1970 | Gutshall | F16B 39/24 411/134 |
| 3,926,237 | A * | 12/1975 | Enders | F16B 39/282 411/135 |
| 4,377,361 | A | 3/1983 | Frieberg | |
| 5,168,684 | A | 12/1992 | Bruhm | |
| 6,776,565 | B2 * | 8/2004 | Chang | F16B 39/282 411/136 |
| 7,261,506 | B2 * | 8/2007 | Smolarek | F16B 39/282 411/114 |
| 2002/0192048 | A1 | 12/2002 | Bushell et al. | |
| 2004/0047706 | A1 * | 3/2004 | Chang | F16B 39/282 411/161 |
| 2005/0089385 | A1 * | 4/2005 | Lin | F16B 39/24 411/154 |
| 2006/0216129 | A1 * | 9/2006 | Lin | F16B 39/282 411/161 |
| 2007/0196195 | A1 * | 8/2007 | Lin | F16B 39/282 411/161 |
| 2009/0003960 | A1 * | 1/2009 | Lin | F16B 41/002 411/161 |
| 2011/0170983 | A1 * | 7/2011 | Day | F16B 39/24 411/370 |
| 2012/0083850 | A1 | 4/2012 | Kaufman et al. | |

FOREIGN PATENT DOCUMENTS

| | | |
|---|---|---|
| DE | 29919029 | 5/2000 |
| EP | 2362108 | 8/2011 |
| GB | 1548295 | 7/1979 |
| JP | 713278 | 10/1932 |
| JP | 382673 | 3/1963 |
| JP | 417112 | 4/1966 |
| JP | 44-019654 B | 8/1969 |
| JP | 47-17055 U | 10/1972 |
| JP | 48-30770 Y1 | 9/1973 |
| JP | 50-76259 U | 7/1975 |
| JP | 51-21068 U | 2/1976 |
| JP | 56-15821 U | 2/1981 |
| JP | 58-118308 U | 8/1983 |
| JP | 60-133215 U | 9/1985 |
| JP | 61-140208 U | 8/1986 |
| JP | 63-86103 U | 6/1988 |
| JP | 03-049411 U | 5/1991 |
| JP | 2001-124045 A | 5/2001 |
| JP | 2004-23227 A | 1/2004 |
| JP | 200590530 A | 4/2005 |
| JP | 2006-068179 A | 3/2006 |
| JP | 2006-336809 A | 12/2006 |
| JP | 2007-146881 A | 6/2007 |
| TW | 414271 U | 12/2000 |
| TW | 489961 U | 6/2002 |
| WO | 2005003573 A1 | 1/2005 |
| WO | WO2015016317 A1 | 2/2015 |

OTHER PUBLICATIONS

CN201480042314.6, "Chinese Office Action", Mar. 1, 2017, 10 pages.

* cited by examiner

FIG. 5C
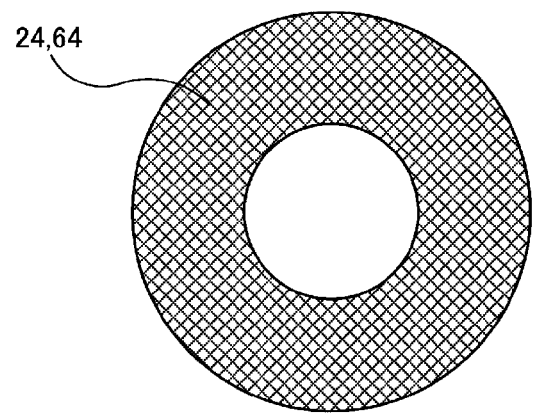
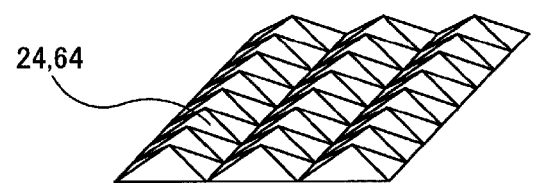

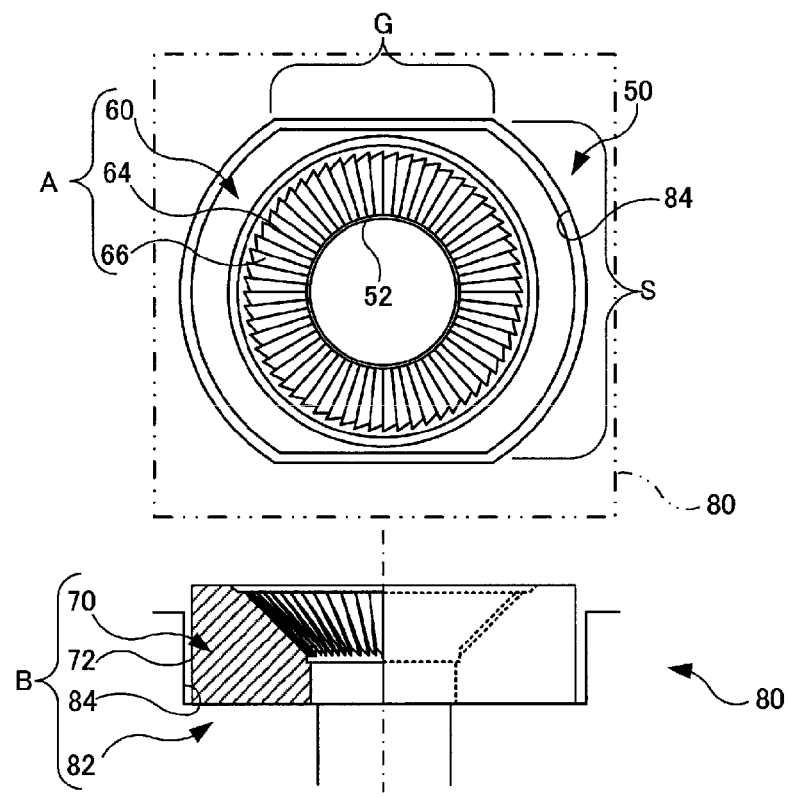

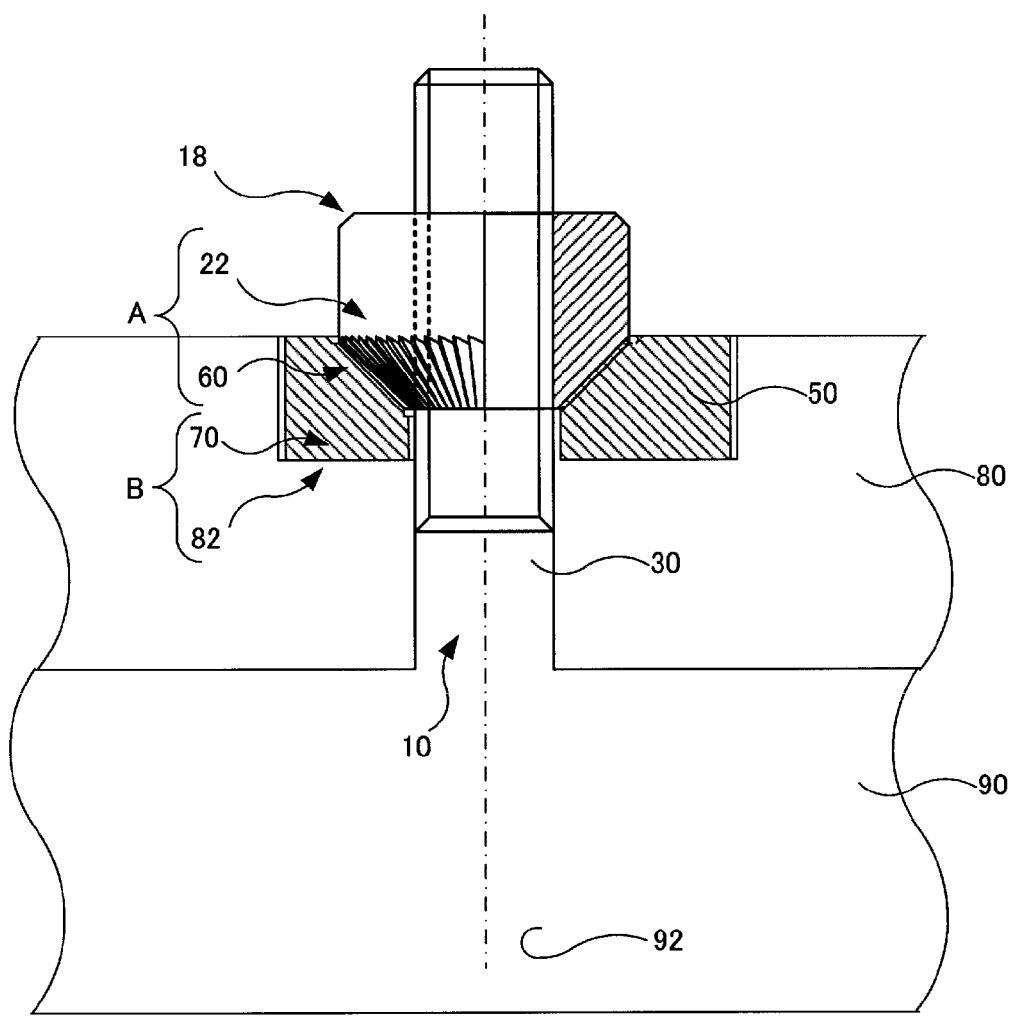

24,64

24,64

FIG. 30C
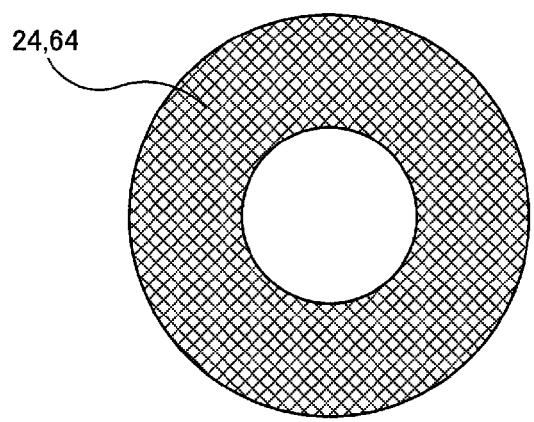
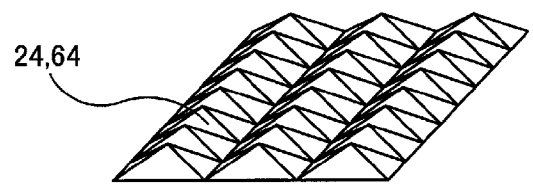

STRUCTURE FOR PREVENTING REVERSE ROTATION OF THREADED BODY

TECHNICAL FIELD

Embodiments of the present invention relate to a reverse rotation preventing structure that may prevent reverse rotation of a threaded body being fastened.

BACKGROUND ART

In the related arts, in many cases, a threaded body is used to fasten objects to be fastened together. The threaded body is provided in a structure in which a male screw body is screwed with a female screw body. The male screw body may include spiral grooves on a pillar-shaped outer circumference, and the female screw body may include spiral grooves on an inner circumference of a tubular member.

The threaded body is used in a way that the male screw body is inserted into a hole formed on a member to be fastened, and screwed with the female screw body. Then, the objects are fastened together through a head part of the male screw body and the tubular member of the female screw body. For easy use of the threaded body for fastening, there was designed a threaded body including a so-called bolt having a hexagonal prism-shaped head part at one end of a male screw body, and a nut having an outer circumferential surface provided in a shape of a hexagonal prism-shaped column. In addition, a so-called small screw having a head part with a metal slit (minus-shaped slot or cross-shaped slot) on a cross section, rather than a hexagonal shape, is widely used.

Further, a washer is inserted around the male screw body when fastening the threaded body. The washer prevents the objects to be fastened from buckling or damage when fastening, or conversely restricts loosening of the threaded body by aggressively and strongly pressing the objects to be fastened.

For example, according to "Japanese Industrial Standards (JIS) 1251 Spring Washer", washers include a general ring-shaped "flat washer", a "tongue washer" having a protrusion extending in a radial direction on an outer or inner circumference and configured to engage a member to be fastened or a threaded body to prevent loosening, a "nail washer" having nails bent in an axial direction to engage an object to be fastened, a "spring washer" configured to prevent loosening of a threaded body through elastic deformation, and a "toothed washer" having teeth around to lock into a fastening surface.

DISCLOSURE OF INVENTION

Technical Goals

However, since an existing washer is only expected to provide friction or locking with respect to a loosening preventing structure between a threaded body and the washer, effects thereof are insufficient as is well known. Thus, in an environment in which oscillation is strong, the threaded body is loosened slowly although the washer is used.

In view of the above issue, the present invention was implemented through an intensive study of inventor(s) of the present invention, and an aspect of the present invention provides a structure for preventing loosening of a threaded body that may highly prevent reverse rotation, in detail, loosening of the threaded body through a simple and easy structure by effectively utilizing a washer.

Technical Solutions

To achieve the above goals, according to an aspect of the present invention, there is provided a structure for preventing reverse rotation of a threaded body, the structure including a screw body having a thread and a washer, the structure in which a member to be fastened is fastened through the screw body and the washer, wherein the screw body may include a screw-body-side seat part to face the washer, the washer may include a first receiving part to face the screw-body-side seat part, and a second receiving part to face the member to be fastened, the member including a member-side seat part, a first engaging mechanism may be provided between the screw-body-side seat part and the first receiving part to maintain an engaging state therebetween although torque is applied to the screw-body-side seat part in a predetermined direction, and a second engaging mechanism may be provided between the member-side seat part and the washer to maintain an engaging state therebetween although torque is applied to the washer in the predetermined direction, such that rotation of the screw body being fastened in the predetermined direction may be prevented.

The second engaging mechanism may be provided between the member-side seat part and the second receiving part to maintain an engaging state therebetween although torque is applied to the washer in the loosening direction, such that reverse rotation of the screw body being fastened in the predetermined direction, for example, rotation of the screw body in the loosening direction, may be prevented.

The first engaging mechanism may include screw-body-side recesses and protrusions formed on the screw-body-side seat part, and first-receiving-part-side recesses and protrusions formed on the first receiving part to engage the screw-body-side recesses and protrusions, such that the engaging state may be obtained.

The screw-body-side recesses and protrusions may have a shape of saw blades provided in a circumferential direction.

The screw-body-side recesses and protrusions may have a threaded or wavy shape provided in a circumferential direction.

The screw-body-side recesses and protrusions may have an emboss shape.

The screw-body-side recesses and protrusions may correspond to swirling-shaped grooves or threads.

The first-receiving-part-side recesses and protrusions may have a shape of saw blades provided in a circumferential direction.

The first-receiving-part-side recesses and protrusions may have a threaded or wavy shape provided in a circumferential direction.

The first-receiving-part-side recesses and protrusions may have an emboss shape.

The first-receiving-part-side recesses and protrusions may correspond to swirling-shaped grooves or threads.

Screw-body-side taper faces may be formed on the screw-body-side seat part to be inclined in a radial direction.

Washer-side taper faces may be formed on the first receiving part to be inclined in a radial direction.

An engaging strength of the first engaging mechanism may increase in the loosening direction as a distance between the screw-body-side seat part and the first receiving part decreases.

The first engaging mechanism may allow relative rotation of the screw-body-side seat part in a tightening direction between the screw-body-side seat part and the first receiving part.

The washer may be elastically deformed in an axial direction of the screw body.

The member-side seat part may include a recessed housing part to receive the second receiving part.

The second engaging mechanism may obtain the engaging state by interlocking the second receiving part and the recessed housing part.

A distance from a shaft of the screw body to an inner wall of the recessed housing part may change in a circumferential direction, and a distance from the shaft of the screw body to an outer wall of the second receiving part may change in the circumferential direction, such that the engaging state may be obtained through a contact between the inner wall of the recessed housing part and the outer wall of the second receiving part.

A fastening strength of the screw body may be transferred to the member to be fastened through a contact surface between a bottom of the recessed housing part and the second receiving part.

The inner wall of the recessed housing part and the outer wall of the second receiving part may have a shape of circles eccentric with respect to the shaft of the screw body.

The member-side seat part may include a member-side step part stepped in an axial direction of the screw body, and the second receiving part may include a washer-side step part to engage the member-side step part.

The washer may include a washer-side contact part at a distance from a shaft of the screw body around the second receiving part, the distance changing in a circumferential direction, the washer-side contact part may contact and engage a portion of the body to be fastened, such that the second engaging mechanism may maintain a contact state therebetween although torque is applied to the washer in the predetermined direction, the first engaging mechanism may prevent relative rotation between the screw body and the washer in the predetermined direction, and the second engaging mechanism may prevent relative rotation between the washer and the member to be fastened in the predetermined direction, whereby relative rotation between the screw body and the member to be fastened in the predetermined direction may be prevented.

The washer-side contact part may be formed in a range of a portion of the circumferential direction.

The washer-side contact part may include a first washer-side contact area to face one rotating direction of the screw body, and a second washer-side contact area to face another rotating direction of the screw body.

The member to be fastened may include a member-side contact part to be in contact with the washer-side contact part, the member-side contact part at a distance from a shaft of the screw body around the member-side seat part, the distance changing in a circumferential direction, and the second engaging mechanism may maintain the contact state therebetween through the washer-side contact part and the member-side contact part although torque is applied to the washer in the predetermined direction, such that rotation of the screw body being the member to be fastened in the predetermined direction may be prevented by the second engaging mechanism.

The member-side contact part may include a first member-side contact area to face the other rotating direction of the screw body and to be in contact with the washer-side contact part, and a second member-side contact area to face the one rotating direction of the screw body and to be in contact with the second member-side contact part.

The washer-side contact part may extend from the member to be fastened toward the washer in an axial direction of the screw body.

The washer-side contact part may extend from the second receiving part of the washer toward the member to be fastened in an axial direction of the screw body.

The member-side contact part may be formed by an outer wall of a column or a cylinder having an axis differing from that of the screw body.

The first engaging mechanism may include screw-body-side recesses and protrusions formed on the screw-body-side seat part, and first-receiving-part-side recesses and protrusions formed on the first receiving part to engage the screw-body-side recesses and protrusions, such that the engaging state may be obtained.

The first-receiving-part-side recesses and protrusions may have a shape of saw blades provided in a circumferential direction.

Screw-body-side taper faces may be formed on the screw-body-side seat part to be inclined in a radial direction.

Washer-side taper faces may be formed on the first receiving part to be inclined in a radial direction.

An engaging strength of the first engaging mechanism may increase in the loosening direction as a distance between the screw-body-side seat part and the first receiving part decreases.

The first engaging mechanism may allow relative rotation of the screw-body-side seat part in a tightening direction between the screw-body-side seat part and the first receiving part.

An outer wall of the second receiving part may have a shape of a circle eccentric with respect to the shaft of the screw body.

A member-side step part may be stepped, as the member-side contact part, in an axial direction of the screw body around the member-side seat part, and a washer-side step part to engage the member-side step part may be formed, as the washer-side contact part, around the second receiving part.

The second receiving part of the washer may include a washer-side inclined surface to face the member-side seat part, the washer-side inclined surface may include an area in which a distance from a shaft center to a cross-sectional shape perpendicular to the shaft of the screw body changes in a circumferential direction of the screw body, the washer-side inclined surface may engage the member-side seat part of the member to be fastened, such that the second engaging mechanism may maintain a contact state therebetween although torque is applied to the washer in the predetermined direction, the first engaging mechanism may prevent relative rotation between the screw body and the washer in the predetermined direction, and the second engaging mechanism may prevent relative rotation between the washer and the member to be fastened in the predetermined direction, whereby relative rotation between the screw body and the member to be fastened in the predetermined direction may be prevented.

The washer-side inclined surface may include a curved surface.

The washer-side inclined surface may include a partial circumferential surface of a virtual column having an axis inclined with respect to the shaft of the screw body.

The washer-side inclined surface may include an area that is displaced in a direction from the first receiving part in the axial direction of the screw body toward the second receiving part when moving in a radially outward direction of the screw body.

The washer-side inclined surface may include an area that is displaced in a direction from the first receiving part in the axial direction of the screw body toward the second receiving part when moving in a radially inward direction of the screw body.

The washer-side inclined surface may include a first washer-side inclined area to face one rotating direction of the screw body, and a second washer-side inclined area to face another rotating direction of the screw body.

The first washer-side inclined area and the second washer-side inclined area may be connected to each other, and a singular point or a singular line may be disposed on a boundary therebetween.

The member-side seat part of the member to be fastened may include an area in which a distance from a shaft center to a cross-sectional shape perpendicular to the shaft of the screw body changes in a circumferential direction of the screw body, the second engaging mechanism may maintain a contact state therebetween through the washer-side inclined surface and the member-side inclined surface although torque is applied to the washer in the predetermined direction, and rotation of the screw body being the member to be fastened in the predetermined direction may be prevented by the second engaging mechanism.

The member-side inclined surface may include a first member-side inclined area to face the other rotating direction of the screw body and to be in contact with the washer-side inclined surface, and a second member-side inclined area to face the one rotating direction of the screw body and to be in contact with the washer-side inclined surface.

The member-side inclined surface may be formed by an outer circumferential surface of a column or a cylinder having an axis inclined with respect to the shaft of the screw body.

The first engaging mechanism may include screw-body-side recesses and protrusions formed on the screw-body-side seat part, and first-receiving-part-side recesses and protrusions formed on the first receiving part to engage the screw-body-side recesses and protrusions, such that the engaging state may be obtained.

The first-receiving-part-side recesses and protrusions may have a shape of saw blades provided in a circumferential direction.

Screw-body-side taper faces may be formed on the screw-body-side seat part to be inclined in a radial direction.

Washer-side taper faces may be formed on the first receiving part to be inclined in a radial direction.

An engaging strength of the first engaging mechanism may increase in the loosening direction as a distance between the screw-body-side seat part and the first receiving part decreases.

The first engaging mechanism may allow relative rotation of the screw-body-side seat part in a tightening direction between the screw-body-side seat part and the first receiving part.

Advantageous Effect

According to embodiments of the present invention, loosening of a threaded body may be prevented definitely by preventing reverse rotation of the threaded body, for example, rotation of the threaded body in a loosening direction, through a simple structure.

BRIEF DESCRIPTION OF DRAWINGS

FIGS. 5A through 5C illustrate modified examples of the saw blades of the same structure for preventing reverse rotation.

FIGS. 7A and 7B illustrate top views and cross-sectional side views of washers used in applications of the same structure for preventing reverse rotation.

FIG. 15 is a cross-sectional side view illustrating a fastening state in a case of applying a structure for preventing reverse rotation of a threaded body of the present invention to a female screw body.

FIGS. 31A through 31C illustrate modified examples of the saw blades of the same structure for preventing reverse rotation.

BEST MODE FOR CARRYING OUT THE INVENTION

Figure 1:
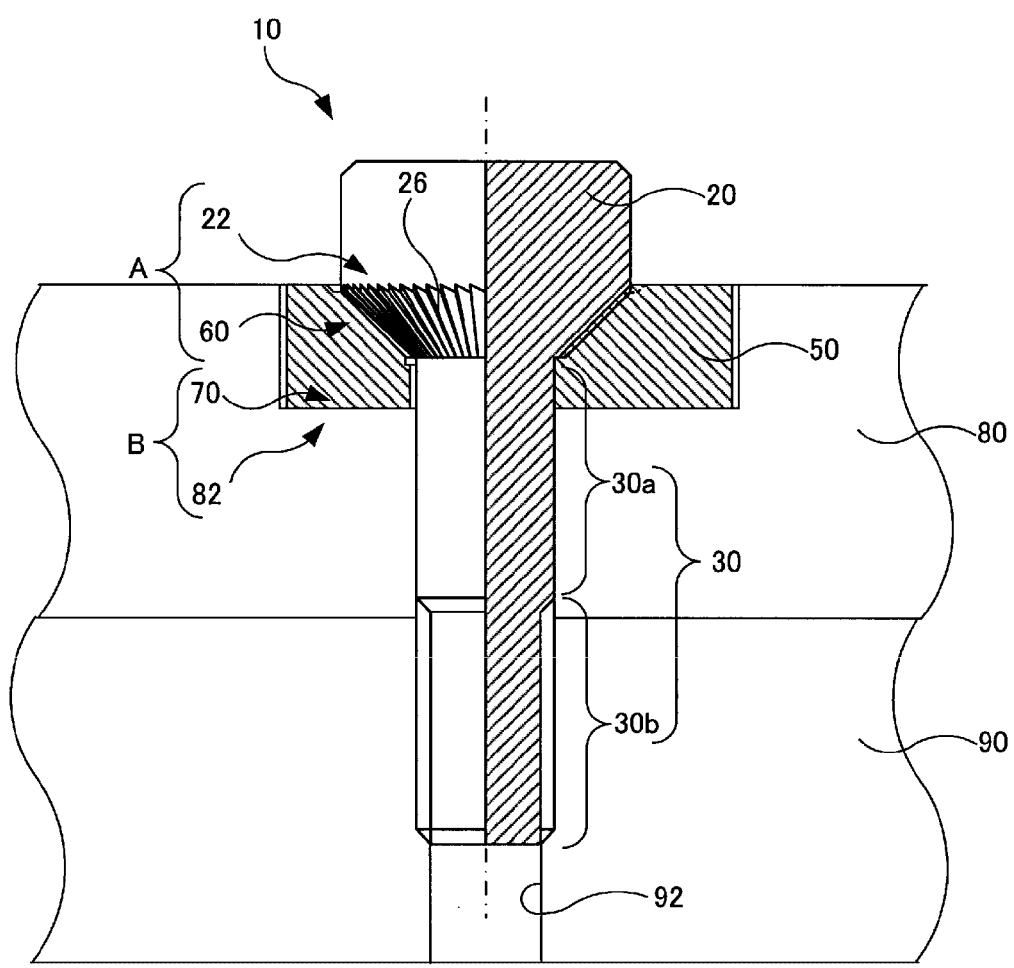
FIG. 1 is a cross-sectional side view illustrating a structure for preventing reverse rotation of a threaded body according to an embodiment A-1 of the present invention.

Hereinafter, embodiments of the present invention will be divided into three groups A, B, and C and described accordingly. The group A relates to a structure for preventing reverse rotation of a threaded body according to embodiments A-1 through A-4 illustrated in FIGS. 1 through 15. The group B relates to a structure for preventing reverse rotation of a threaded body according to embodiments of B-1 and B-2 illustrated in FIGS. 16A through 26. The group C relates to a structure for preventing reverse rotation of a threaded body according to embodiments C-1 through C-3 illustrated in FIGS. 27A through 35. For ease of description, common or similar names or reference numerals are used among the groups to describe members, parts, and the like. However, such names or reference numerals are separate from and irrelevant to one another among the groups.

First, the embodiments of the present invention belonging to the group A will be described in detail with reference to the drawings.

Figure 3:
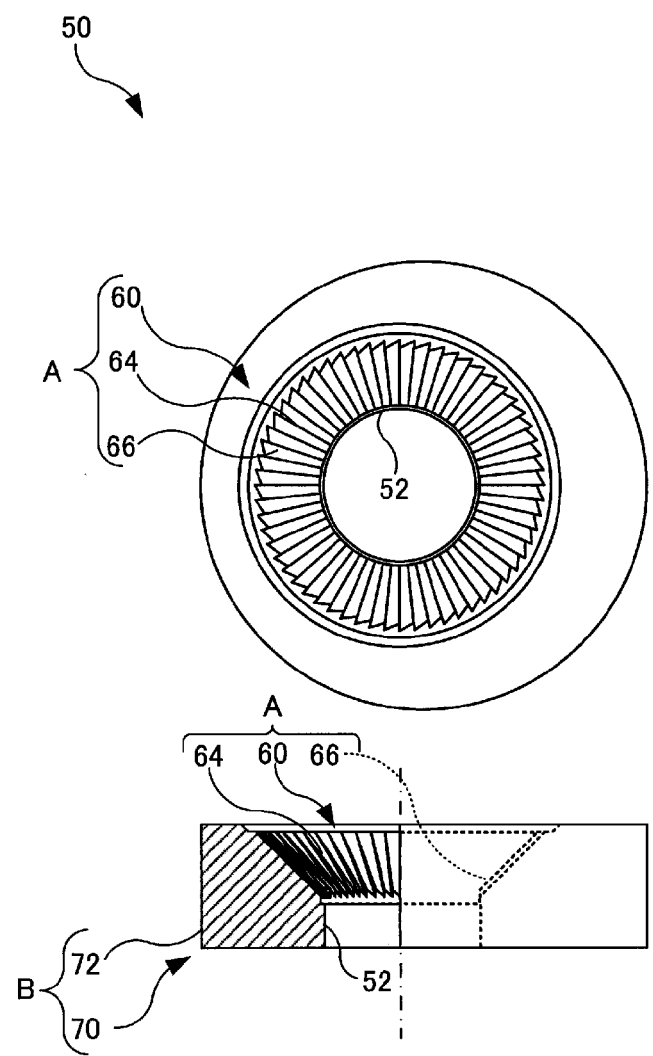
FIG. 3 illustrates a top view and a cross-sectional side view of a washer used for the same structure for preventing reverse rotation.

FIG. 1 illustrates a structure for preventing reverse rotation of a threaded body according to the embodiment A-1. As shown in FIG. 3, the structure for preventing reverse rotation of the threaded body includes a male screw body 10, a ring-shaped washer 50, a member 80 to be fastened, and a base 90. The base 90 includes a female screw hole 92 to be screwed with the male screw body 10. The member 80 to be fastened is interposed between the base 90 and the male screw body 10, thereby being fastened.

The male screw body 10 is a so-called bolt, and includes a head part 20 and a shaft part 30. A screw-body-side seat part 22 is formed at a part corresponding to a lower portion or a root of the head part 20. The shaft part 30 includes a cylindrical part 30a and a threaded part 30b. The cylindrical part 30a is not essential.

A first receiving part 60 is formed on one side (upper surface side of FIG. 1) of the washer 50. The first receiving part 60 faces the screw-body-side seat part 22, and a first engaging mechanism A is provided therebetween. When at least the screw-body-side seat part 22 rotates the male screw body 10 being fastened in a loosening direction, the first receiving part 60 and the screw-body-side seat part 22 engage each other, and the first engaging mechanism A prevents relative rotation of the first receiving part 60 and the screw-body-side seat part 22 in the corresponding rotating direction.

A second receiving part 70 is formed on another side (lower surface side of FIG. 1) of the washer 50. The first receiving part 70 faces the member 80 to be fastened.

The member 80 to be fastened includes a member-side seat part 82 to face the second receiving part 70 of the washer 50. A second engaging mechanism B is provided between the member-side seat part 82 of the member 80 to be fastened and the second receiving part 70 of the washer 50. When at least the washer 50 rotates in the loosening direction along with the male screw body 10, the first receiving part 70 and the member-side seat part 82 engage each other, and the second engaging mechanism B prevents relative rotations of the second receiving part 70 and the member-side seat part 82 in the corresponding rotating direction.

In response to the operations of the first engaging mechanism A and the second engaging mechanism B, relative rotation of the male screw body 10 and the member 80 to be fastened is restricted through interposition of the washer 50 when the male screw body 10 rotates in the loosening direction. Thus, loosening of the male screw body 10 is prevented.

Figure 2:
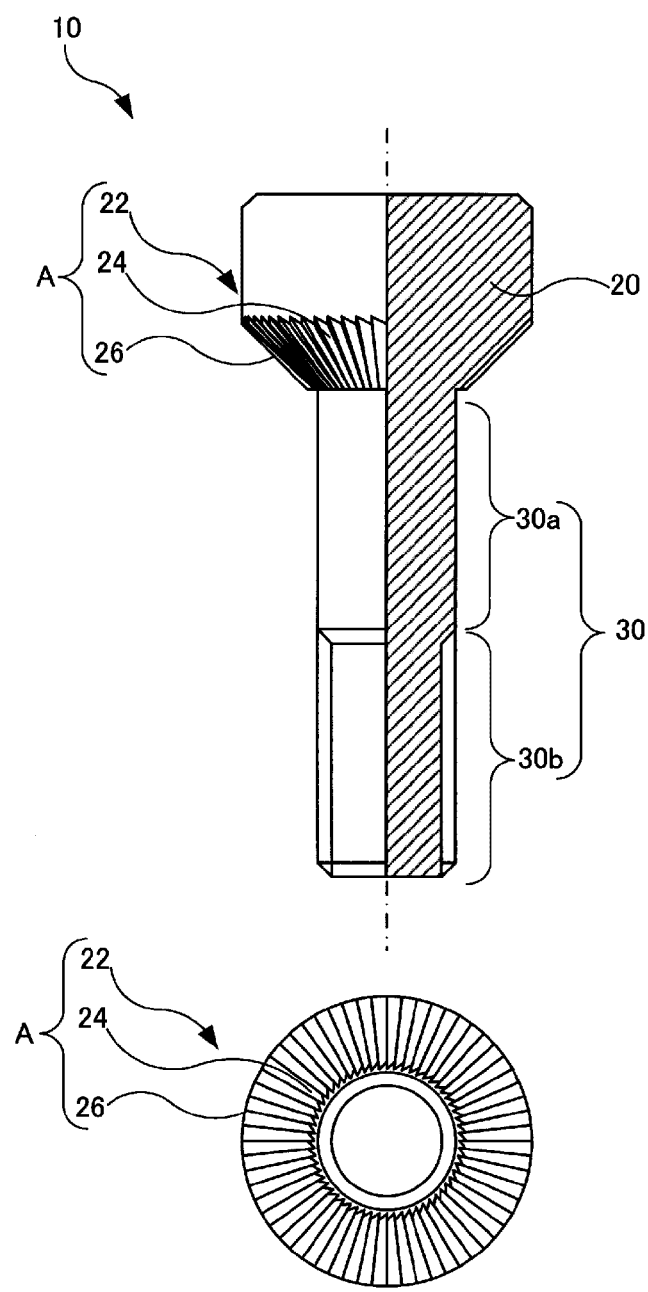
FIG. 2 illustrates a cross-sectional side view and a bottom view of a male screw body used for the same structure for preventing reverse rotation.

As shown in FIG. 2, as the first engaging mechanism A, screw-body-side recesses and protrusions 24 are formed on the screw-body-side seat part 22 of the male screw body 10. The screw-body-side recesses and protrusions 24 are formed in a shape of a plurality of saw blades continuously provided in a circumferential direction. An extending direction of each of the screw-body-side recesses and protrusions 24, for example, an extending direction of a ridge, corresponds to a radial direction of the male screw body 10. Thus, the screw-body-side recesses and protrusions 24 extend radially from a shaft center.

Further, screw-body-side taper faces 26 are formed on the screw-body-side seat part 22 to be inclined in a radial direction. The screw-body-side taper faces 26 are inclined so that a center side thereof may be close to an end of a screw. Thus, the screw-body-side taper faces 26 are provided in a conical shape protruding on a front side of the screw. More preferably, the aforementioned screw-body-side recesses and protrusions 24 are formed on the screw-body-side taper faces 26.

As shown in FIG. 3, as the first engaging mechanism A, first-receiving-part-side recesses and protrusions 64 are formed on the first receiving part 60 of the washer 50 to engage the screw-body-side recesses and protrusions 24. The first-receiving-part-side recesses and protrusions 64 are formed in a shape of a plurality of saw blades continuously provided in the circumferential direction. An extending direction of each of the first-receiving-part-side recesses and protrusions 64, for example, an extending direction of a ridge, corresponds to the radial direction of the male screw body 10. Thus, the first-receiving-part-side recesses and protrusions 64 extend radially from a center of a through hole 52 of the washer 50.

Further, preferably, washer-side taper faces 66 are formed on the first receiving part 60 to be inclined in the radial direction. The washer-side taper faces 66 are inclined so that a center side thereof may be close to the end of the screw, thereby forming a shape of a pot. Thus, the washer-side taper faces 66 are provided in a conical shape recessed on the front side of the screw. The aforementioned first-receiving-part-side recesses and protrusions 64 are formed on the washer-side taper faces 66.

Figure 4A:
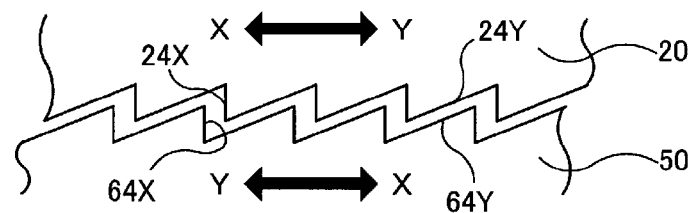
FIG. 4A illustrates an operation of saw blades of the same structure for preventing reverse rotation of the threaded body.

Accordingly, when strongly tightening the male screw body 10, the screw-body-side taper faces 26 of the screw-body-side seat part 22 are inserted into the recesses of the washer-side taper faces 66 of the washer 50 in the first engaging mechanism A, and the screw-body-side recesses and protrusions 24 engage the first-receiving-part-side recesses and protrusions 64. As shown in FIG. 4A, when the male screw body 20 rotates in a fastening direction Y, the toothed shapes of both allow relative slide thereof in a way that inclined surfaces 24Y and 64Y thereof are in contact with each other and a distance therebetween increases in an axial direction. Conversely, when the male screw body 20 rotates in a loosening direction X, the toothed shapes prevent the relative movement thereof in a way that vertical surfaces (steeply inclined surfaces) 24X and 64X thereof are in contact with each other. In detail, by strongly tightening the male screw body 10, an engaging strength of the first engaging mechanism A may increase in the loosening direction X since the engagement between the screw-body-side recesses and protrusions 24 and the first-receiving-part-side recesses and protrusions 64 is enhanced as a distance between the screw-body-side seat part 22 and the first receiving part 60 decreases. Here, by differently setting inclination angles of the screw-body-side taper faces 26 and inclination angles of the washer-side taper faces 66, in detail, by setting inclination angles of the washer-side taper faces 66 from the shaft center to be narrower than inclination angles of the screw-body-side taper faces 26 from the shaft center, the male screw body 10 may be strongly tightened without rickety, irrespective of pitches of teeth formed on the respective taper faces.

Referring to FIG. 3 again, a distance from the shaft center of the screw to an outer wall 72 of the second receiving part 70 of the washer 50 changes in the circumferential direction. In detail, the outer wall 72 is provided in a shape of a circle eccentric with respect to the shaft center of the screw (a center of the through hole 52).

Meanwhile, the member-side seat part 82 of the member 80 to be fastened includes a recessed housing part 84 to receive the second receiving part 70 of the washer 50. An inner wall of the recessed housing part 84 is provided in a shape of a circle eccentric with respect to the shaft center of the screw. Further, the second receiving part 70 and the recessed housing part 84 have equal eccentricities, and a difference in diameters (a space margin) between the second receiving part 70 and the recessed housing part 84 is set to be less than the eccentricities.

As shown in FIG. 1, when the second receiving part 70 of the washer 50 is received in the recessed housing part 84 of the member 80 to be fastened, both interlock each other. Thus, relative rotation thereof in the circumferential direction is restricted while being aligned with the shaft center of the screw. In detail, the second receiving part 70 and the recessed housing part 84 act as the second engaging mechanism B.

As described above, the structure for preventing reverse rotation of the threaded body according to the embodiment A-1 prevents reverse rotation, in detail, loosening of the male screw body 10 in the way that, by interposing the washer 50, the first engaging mechanism A is provided between the screw-body-side seat part 22 and the first receiving part 60, the second engaging mechanism B is provided between the member-side seat part 82 and the second receiving part 70, and the male screw body 10 engages the member 80 to be fastened in the circumferential direction by mutual restrictions of the first engaging mechanism A and the second engaging mechanism B when an attempt is made to loosen the male screw body 10. Thus, despite occurrence of oscillations, a fastening state free from loosening may be obtained.

Further, in the present embodiment, as the first engaging mechanism A, the screw-body-side recesses and protrusions 24 and the first-receiving-part-side recesses and protrusions 64 are formed in the shapes of a plurality of saw blades continuously provided in the circumferential direction, and act as a so-called ratchet device or one-way clutch device. Thus, in a case of fastening operation, relative movements of the screw-body-side recesses and protrusions 24 and the first-receiving-part-side recesses and protrusions 64 are allowed, whereby smooth relative rotation is implemented. Conversely, in a case of loosening operation, relative movements of the screw-body-side recesses and protrusions 24 and the first-receiving-part-side recesses and protrusions 64 are completely restricted. Therefore, both fastening workability and loosening preventing may be reasonably achieved.

In addition, in the embodiment A-1, as the first engaging mechanism A, the screw-body-side taper faces 26 and the washer-side taper faces 66 are formed on the screw-body-side seat part 22 and the first receiving part 60, respectively, and thus a contact area therebetween may increase. Furthermore, a fastening force in the axial direction of the male screw body 10 is also applied in the radial direction through the taper faces. The taper faces strongly press one another in the radial direction, whereby self-excitation centering may be performed. Therefore, concentricities of the male screw body 10 and the washer 50 may increase, and an engagement precision of the screw-body-side recesses and protrusions 24 and the first-receiving-part-side recesses and protrusions 64 may increase. Additionally, a minute difference in angle may be made by setting inclinations of the screw-body-side taper faces 26 on the protrusion side to be slightly steep, and setting inclination angles of the washer-side taper faces 66 on the recess side to be slightly narrow. In doing so, with an increase in a fastening pressure, the taper faces may be gradually in contact with one another from the center in the radially outward direction.

Besides, in the embodiment A-1, as the second engaging mechanism B, the shapes of the outer wall of the second receiving part 70 of the washer 50 and the inner wall of the recessed housing part 84 of the member 80 to be fastened avoid being concentric with respect to the shaft center of the screw. In other words, the distance from the shaft center of the screw to the inner wall of the recessed housing part 84 and, the distance from the shaft center of the screw to the outer wall of the second receiving part 70 change in the circumferential direction. By the shapes described above, when the inner wall of the recessed housing part 84 engages the second receiving part 70, relative rotation thereof in the circumferential direction is restricted while shaft centers thereof match. In detail, here, the shapes correspond to eccentric perfect circles, and thus the washer 50 or the member 80 to be fastened may be manufactured in a simple shape, and relative rotation thereof may also be prevented.

Figure 4B:
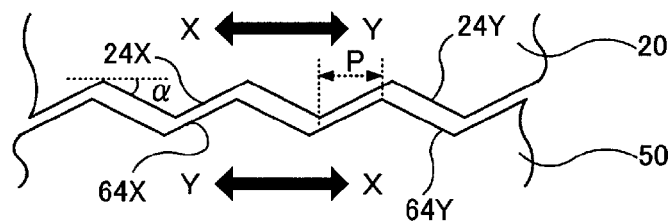
FIGS. 4B through 4D illustrate modified examples of the saw blades.
Figure 4C:
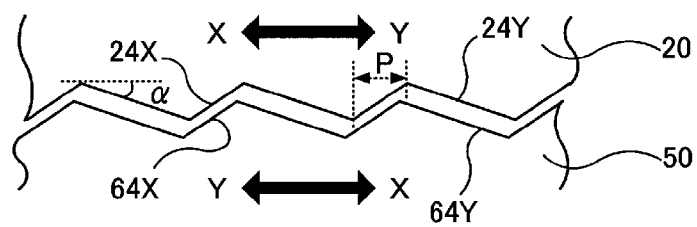

In the embodiment A-1, as the first engaging mechanism A, the screw-body-side recesses and protrusions 24 and the first-receiving-part-side recesses and protrusions 64 are provided in the shape of saw blades. However, the embodiment of the present invention is not limited thereto. For example, as shown in FIG. 4B, the recesses and protrusions may be provided in a threaded shape (including inclined surfaces on both sides). In doing so, when the male screw body 20 rotates in the loosening direction X, the inclined surfaces 24X and 64X perform relative movement. However, along the inclined surfaces, the screw-body-side recesses and protrusions 24 and the first-receiving-part-side recesses and protrusions 64 are separate from one another. When a moving distance (a separation angle α) is set to be greater than a lead angle of the male screw body 10, the screw-body-side recesses and protrusions 24 and the first-receiving-part-side recesses and protrusions 64 are separate from one another although an attempt is made to loosen the male screw body 10. Thus, the male screw body 10 may not be loosened. In addition, FIG. 4B illustrates the recesses and protrusions having cross-sections of isosceles triangles. However, as shown in FIG. 4C, the inclination angles of the inclined surfaces 24X and 64X to be in contact with each other when rotation is performed in the loosening direction may be set to be smoother than the inclination angles of the inclined surfaces 24Y and 64Y to be in contact with each other when rotation is performed in the fastening direction. In doing so, a circumferential distance P of the inclined surfaces 24Y and 64Y which need to move over each other when rotation is performed in the fastening direction may decrease, and thus a gutter (gap) after fastening may be reduced.

Figure 4D:
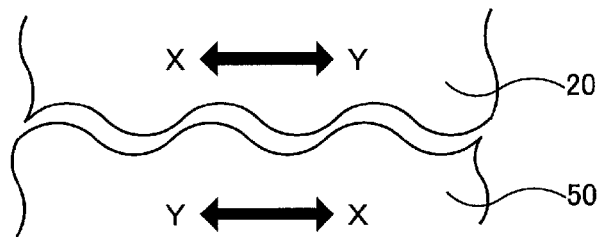
Figure 5A:
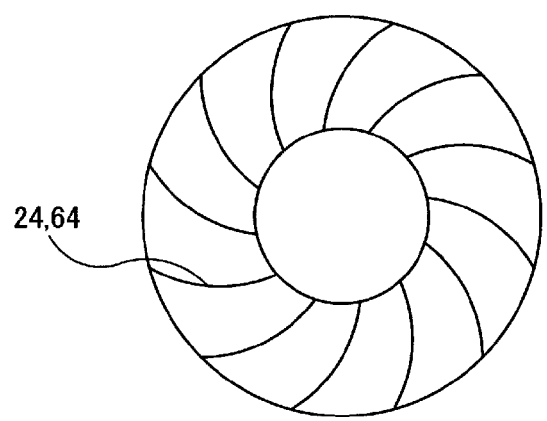
Figure 5B:
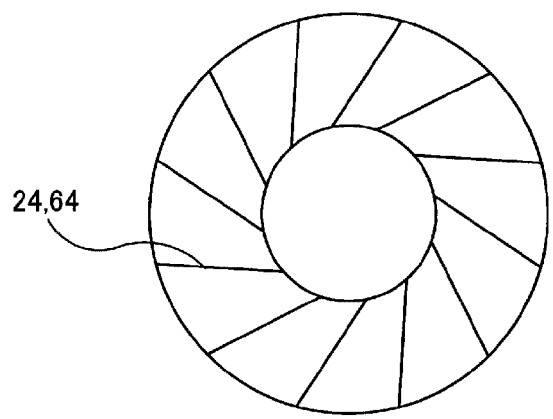

Further, as an application of FIGS. 4A through 4C, as shown in FIG. 4D, the recesses and protrusions may be provided in a wavy shape in which crests and roots are curved. In this example, when fastening, smooth manipulation may be obtained. Moreover, although the embodiment A-1 suggests the recesses and protrusions extending in the radial direction, swirling-shaped (spiral) grooves or threads (recesses and protrusions) may be formed, as shown in FIG. 5A. As shown in FIG. 5B, grooves or threads (recesses and protrusions) extending rectilinearly may be disposed to be inclined such that a circumferential phase may change with respect to the radial direction of the screw. As shown in FIG. 5C, a so-called emboss shape in which a plurality of minute recesses and protrusions are formed in the circumferential direction of the screw and on both sides (planarly) of the radial direction may be adopted.

Furthermore, as shown in the embodiment A-1, the shapes of the screw-body-side recesses and protrusions 24 and the first-receiving-part-side recesses and protrusions 64 do not need to match (be similar to one another). For example, a combination of different shapes selected from the variety of the shapes as shown in FIGS. 4A through 5C may be used.

Figure 6A:
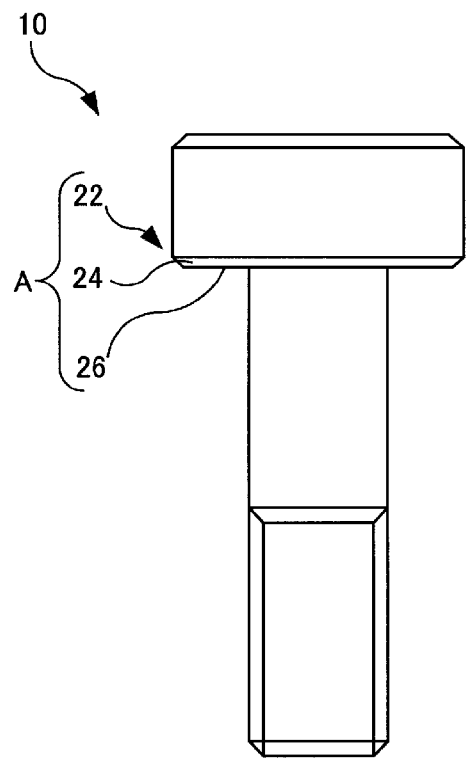
FIGS. 6A and 6B are side views illustrating applications of the male screw body of the same structure for preventing reverse rotation, the male screw body being not tightened.
Figure 6B:
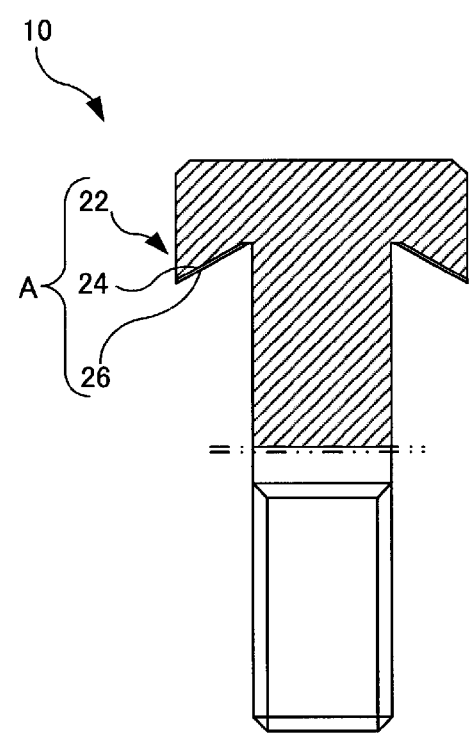

In the embodiment A-1, the screw-body-side taper faces 26 are provided in a shape of protrusions, and the washer-side taper faces 66 are provided in a shape of recesses. However, the embodiment of the present invention is not limited thereto. For example, the screw-body-side taper faces 26 may be provided in a planar shape as shown in FIG. 6A, or in a recessed shape as shown in FIG. 6B. The foregoing may also be applicable to the washer-side taper faces. In particular, although not shown in the drawings, the inclination angles of the taper faces may not need to match when an elastic deformation of the washer 50 is effectively utilized. The taper faces may be formed on one side of the male screw body 10 or the washer 50. Further, by providing the taper faces in the shape of protrusions or recesses, both may be in close contact with each other using elastic deformation of the washer. In addition, to obtain an elasticity of the washer 50, a basic shape of the washer 50 may be a so-called spring washer which is formed in a spiral shape.

As an application of the embodiment A-1, as shown in FIG. 7A, the outer wall of the second receiving part 70 of the washer 50 and the inner wall of the recessed housing part 84 of the member-side seat part 82 may be provided in a shape of partial arcs S concentric with respect to the shaft center of the screw, and remaining portions may be provided in a shape being cut off rectilinearly, like chords G. In this example, the distance from the shaft center of the screw to the inner wall of the recessed housing part 84, and the distance from the shaft center of the screw to the outer wall of the second receiving part 70 change in the circumferential direction. Thus, by the shape of the chords the inner wall of the recessed housing part 84 engages the second receiving part 70, whereby relative rotation thereof in the circumferential direction is restricted.

Figure 7B:
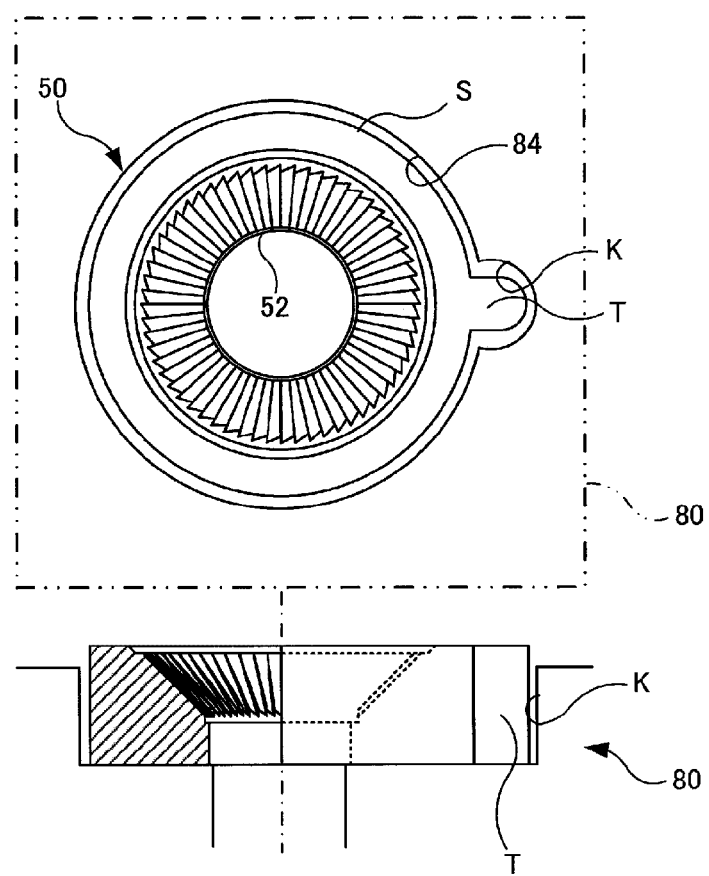

As shown in FIG. 7B, the outer wall of the second receiving part 70 of the washer 50 may be provided in a shape of a partial arc S concentric with respect to the shaft center of the screw, and a lump T extending in the radial direction may be provided in a remaining portion. In this example, a dent K recessed in the radial direction may be formed on the inner wall of the recessed housing part 84. In response to engagement of the lump T and the dent K, the inner wall of the recessed housing part 84 engages the second receiving part 70, whereby relative rotation thereof in the circumferential direction is restricted. In this example, the dent K formed in the recessed housing part 84 may be provided in a shape of a small perfect circle (partial arc). When cutting the recessed housing part 84, the dent K may be formed using a rod-shaped drill once. In addition, although not shown in the drawings, a hollow (notch) may be formed on the second receiving part 70 of the washer 50, and a projection protruding in the radially inward direction may be formed on the recessed housing part 84.

Figure 8:
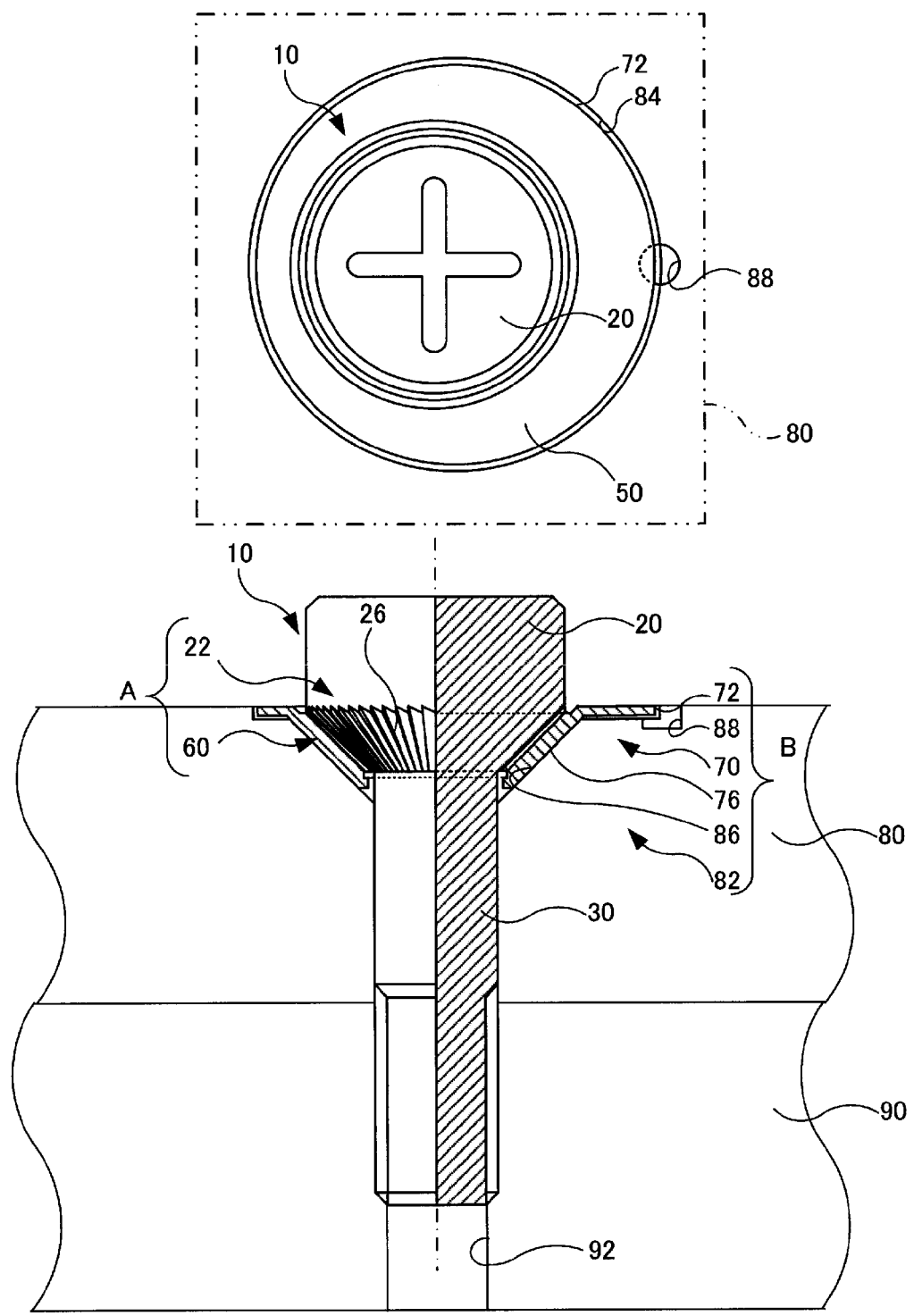
FIG. 8 illustrates a top view and a cross-sectional side view of a fastening state of a structure for preventing reverse rotation of a threaded body according to an embodiment A-2.

Hereinafter, a structure for preventing reverse rotation of a threaded body according to an embodiment A-2 of the present invention will be described with reference to FIG. 8. In the structure for preventing reverse rotation, the male screw body 10 is the same as that according to the embodiment A-1, whereas the washer 50 and the member 80 to be fastened differ from those according to the embodiment A-1 in terms of structure. Accordingly, such differences will be described in detail, and duplicated descriptions of the male screw body 10 will be omitted.

Figure 9A:
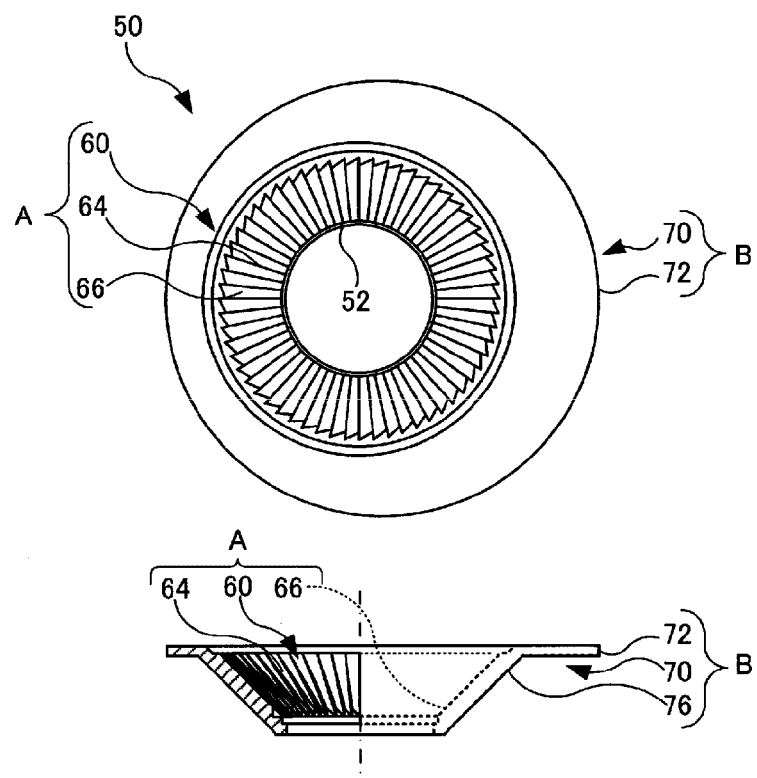
FIG. 9A illustrates a top view and a cross-sectional side view of a washer used for the same structure for preventing reverse rotation.

As shown in FIG. 9A, when compared to the embodiment A-1, the washer 50 is provided to be relatively thin, and second washer-side taper faces 76 protruding in a frontward direction of the screw are formed on the second receiving part 70 to face the member 80 to be fastened.

Further, as shown in the embodiment A-1, the outer wall 72 of the second receiving part 70 of the washer 50 and the inner wall of the recessed housing part 84 are provided in the shape of eccentric perfect circles, and thus interlock each other, whereby rotation in the circumferential direction is restricted.

Referring to FIG. 8 again, member-side taper faces 86 being recessed on a front side of the screw are formed on the bottom of the recessed housing part 84 of the member 80 to be fastened. Thus, the member-side taper faces 86 are in contact with the second washer-side taper faces 76 of the washer 50, whereby the fastening force of the male screw body 10 is received through the washer 50.

A lift space 88 is formed on a portion of the inner wall of the recessed housing part 84. The lift space 88 is obtained by extending the inner wall of the recessed housing part 84 in the radially outward direction, and increase a depth of a recessed portion. By the lift space 88, a gap is formed on a portion of the outer wall of the second receiving part 70 of the washer 50.

When the member 80 to be fastened is fastened through the male screw body 10 and the washer 50, the screw-body-side recesses and protrusions 24 of the male screw body 10 engage the first-receiving-part-side recesses and protrusions 64 of the washer 50 as the first engaging mechanism A. Moreover, the outer wall of the second receiving part 70 of the washer 50 interlocks the inner wall of the recessed housing part 84 as the second engaging mechanism B, whereby rotation in the circumferential direction is restricted. Accordingly, reverse rotation, in detail, loosening of the male screw body 10 is prevented.

Figure 9B:
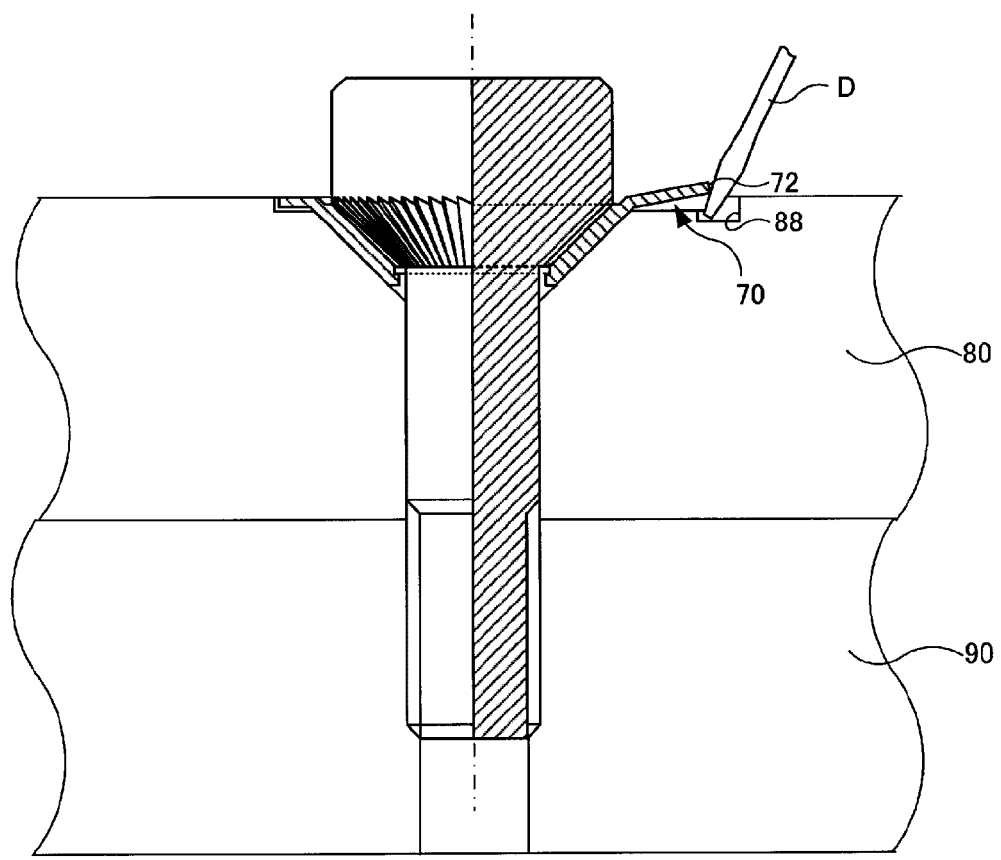
FIG. 9B is a cross-sectional side view illustrating an operation of releasing the same structure for preventing reverse rotation.

An operation in a case of forcedly loosening the male screw body 10 will be described with reference to FIG. 9B. For example, by inserting a front end of a minus screwdriver D into the lift space 88, the front end of the screwdriver D is inserted into a rear side of the washer 50. In this state, by lifting the front end of the minus screwdriver D, the second receiving part 70 of the washer 50 may be deformed in an upward direction. Accordingly, the second engaging mechanism B is released through the second receiving part 70 and the recessed housing part 84. In this state, when rotating the male screw body 10 in the loosening direction, the washer 50 may also rotate together, and thus the male screw body 10 may also be loosened.

Figure 10A:
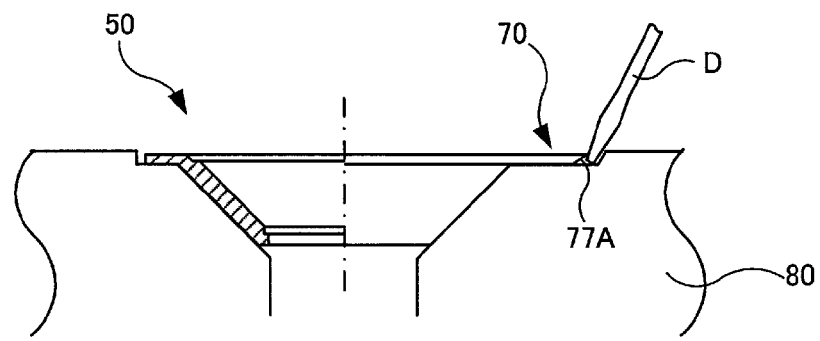
FIG. 10A is a cross-sectional side view illustrating an operation of releasing the washer used in an application of the same structure for preventing reverse rotation.
Figure 10B:
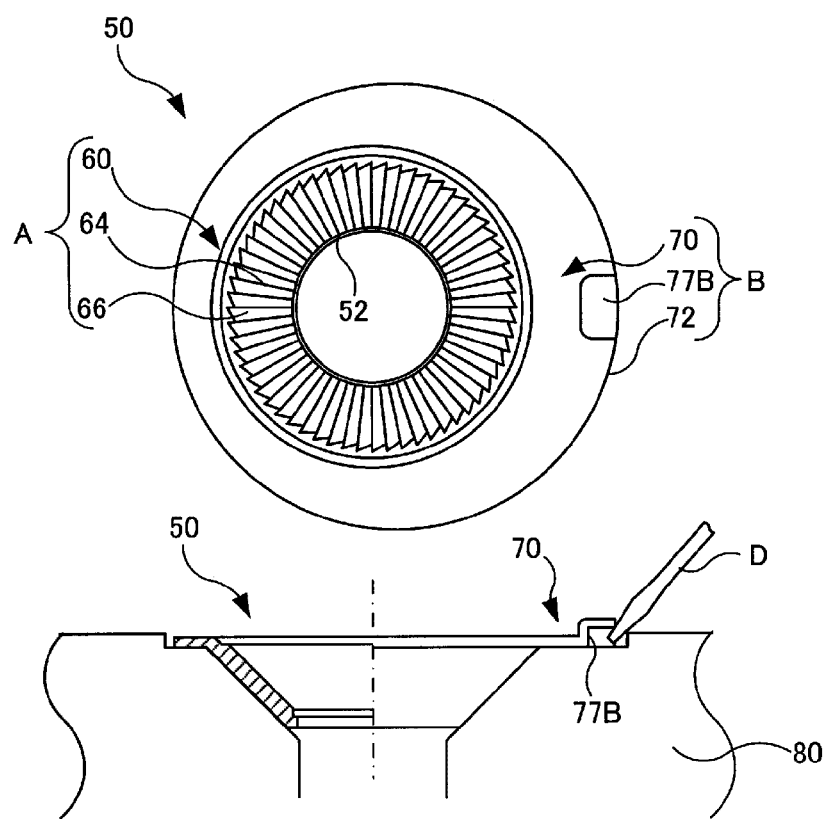
FIG. 10B illustrates a top view and a cross-sectional side view of the washer used in the same application.

Further, in the embodiment A-2, the lift space 88 is formed in the recessed housing part 84 of the member 80 to be fastened. However, the embodiment of the present invention is not limited thereto. For example, as shown in FIG. 10A, by forming an inclined surface 77A on the outer wall of the washer 50, the front end of the minus screwdriver D may be inserted into the rear side (the side of the member 80 to be fastened) of the washer 50. As shown in FIG. 10B, a recessed part 77B for insertion is formed on a rim of the washer 50 to be separate from the member 80 to be fastened. Through the recessed part 77B for insertion, the front end of the minus screwdriver D may be inserted into the rear side of the washer 50. In addition, by generating a crescent gap (not shown) using a difference in diameter between an external diameter of the washer 50 and an internal diameter of the recessed housing part 84, the front end of the minus screwdriver D may be inserted into the rear side of the washer 50 through the crescent gap.

Figure 11A:
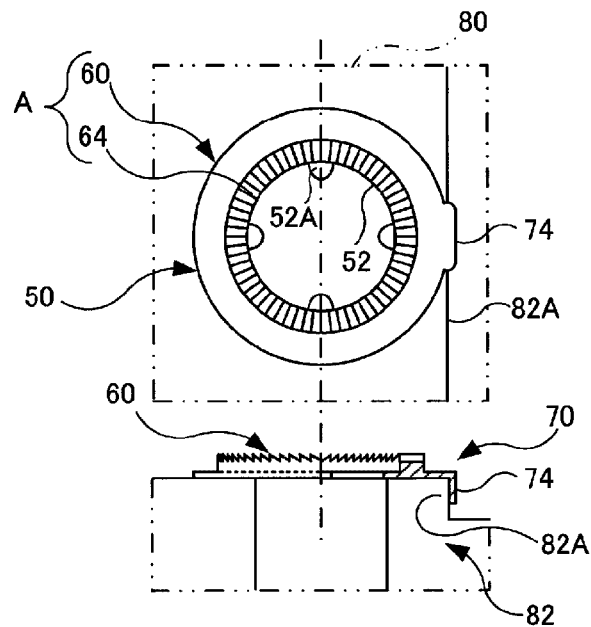
FIG. 11A illustrates a top view and a cross-sectional side view of a washer of a structure for preventing reverse rotation of a threaded body according to an embodiment A-3.
Figure 11B:
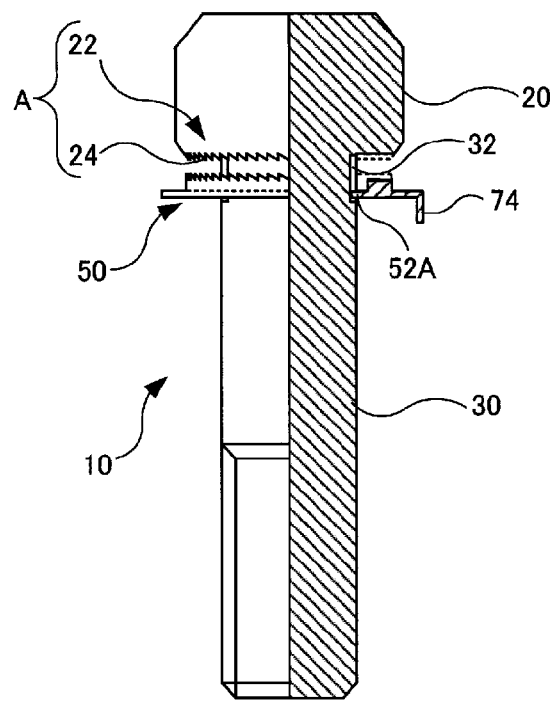
FIG. 11B is a cross-sectional side view illustrating a state in which the washer and the male screw body are integrated.
Figure 11C:
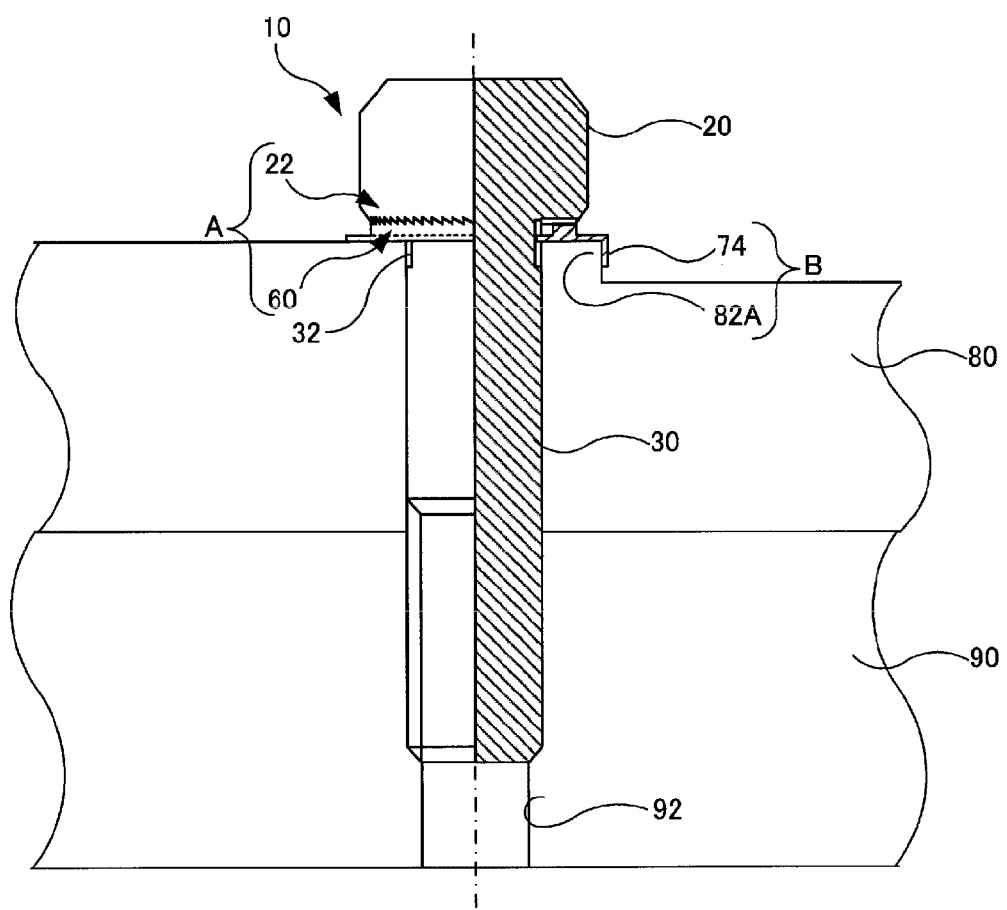
FIG. 11C is a cross-sectional side view illustrating a fastening state thereof.

FIGS. 11A through 11C illustrate a structure for preventing loosening of a screw according to an embodiment A-3. As shown in FIG. 11B, the screw-body-side seat part 22 of the male screw body 10 is provided in a planar shape, and the screw-body-side recesses and protrusions 24 in the shape of saw blades are formed thereon. A constriction 32 is formed on the base of the shaft part 30 of the male screw body 10 to maintain the washer 50.

Referring to FIG. 11A, the first receiving part 60 of the washer 50 is provided in a planar shape, and the first-receiving-part-side recesses and protrusions 64 in the shape of saw blades are formed thereon. An engaging lump 52A protruding on an inner circumferential side is formed in the through hole 52 of the washer 50, thereby engaging the constriction 32 of the male screw body 10. Accordingly, the male screw body 10 and the washer 50 may be integrated (combined) in advance.

Further, a washer-side step part 74 is formed on the second receiving part 70 of the washer 50 to extend in an axial direction of the screw. The washer-side step part 74 is provided using a nail bent on the side of the member 80 to be fastened.

A member-side step part 82A is provided in the member-side seat part 82 of the member 80 to be fastened to extend in the axial direction of the screw. The member-side step part 82A is a step depressed on the front side of the screw. Distances from the shaft center of the screw to the washer-side step part 74 and the member-side step part 82A match. Accordingly, as shown in FIG. 11C, when strongly tightening the male screw body 10, the washer-side step part 74 engages the member-side step part 82A, whereby relative rotation of the washer 50 and the member 80 to be fastened is prevented.

In addition, in the embodiment A-3, the male screw body 10 and the washer 50 are integrated in advance through the constriction 32 of the male screw body 10 and the engaging lump 52A of the washer 50. However, the manner therefor is not limited thereto. For example, by providing magnetism on at least one side, the male screw body 10 and the washer 50 may be integrated using a magnetic force. Besides, the male screw body 10 and the washer 50 may be integrated in advance using an adhesive, (spot) welding, and press fitting (frictional force). The male screw body 10 and the washer 50 may also be integrated using an auxiliary device such as an O-ring.

Figure 12:
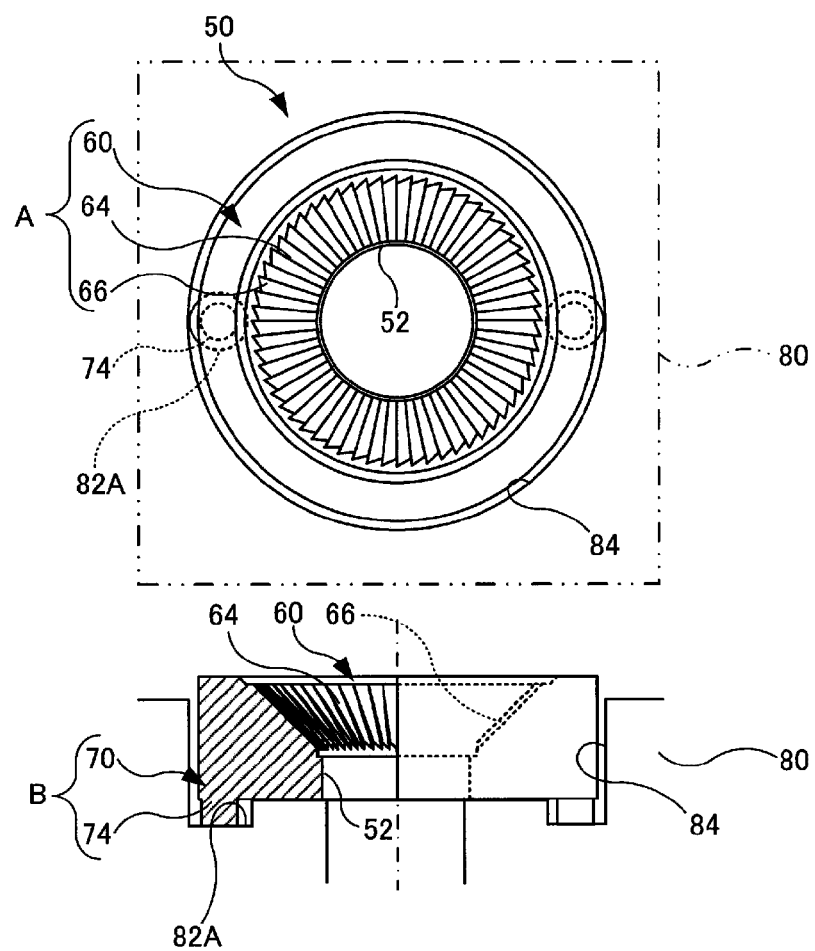
FIG. 12 illustrates a top view and a cross-sectional side view of the washer used in an application of the same structure for preventing reverse rotation.

In the present embodiment, the washer-side step part 74 is formed on an outer circumference of the washer 50. However, the embodiment of the present invention is not limited thereto. For example, as shown in FIG. 12, the washer-side step part (lump) 74 may be formed on an inner side of the outer ridge of the washer 50. A member-side step part (dent) 82A is formed in the recessed housing part 84 of the member 80 to be fastened to receive the washer-side step part 74. Accordingly, the washer-side step part (lump) 74 engages the member-side step part (dent) 82A, and relative rotation is prevented.

Figure 13A:
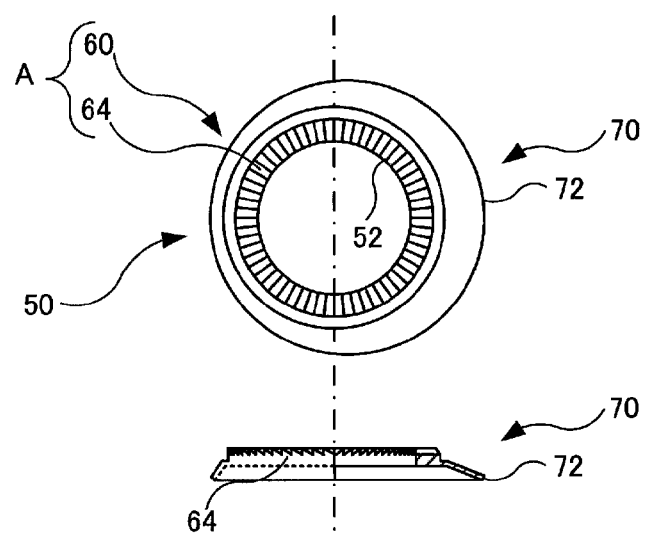
FIG. 13A illustrates a top view and a cross-sectional side view of a washer of a structure for preventing reverse rotation of a threaded body according to an embodiment A-4.
Figure 13B:
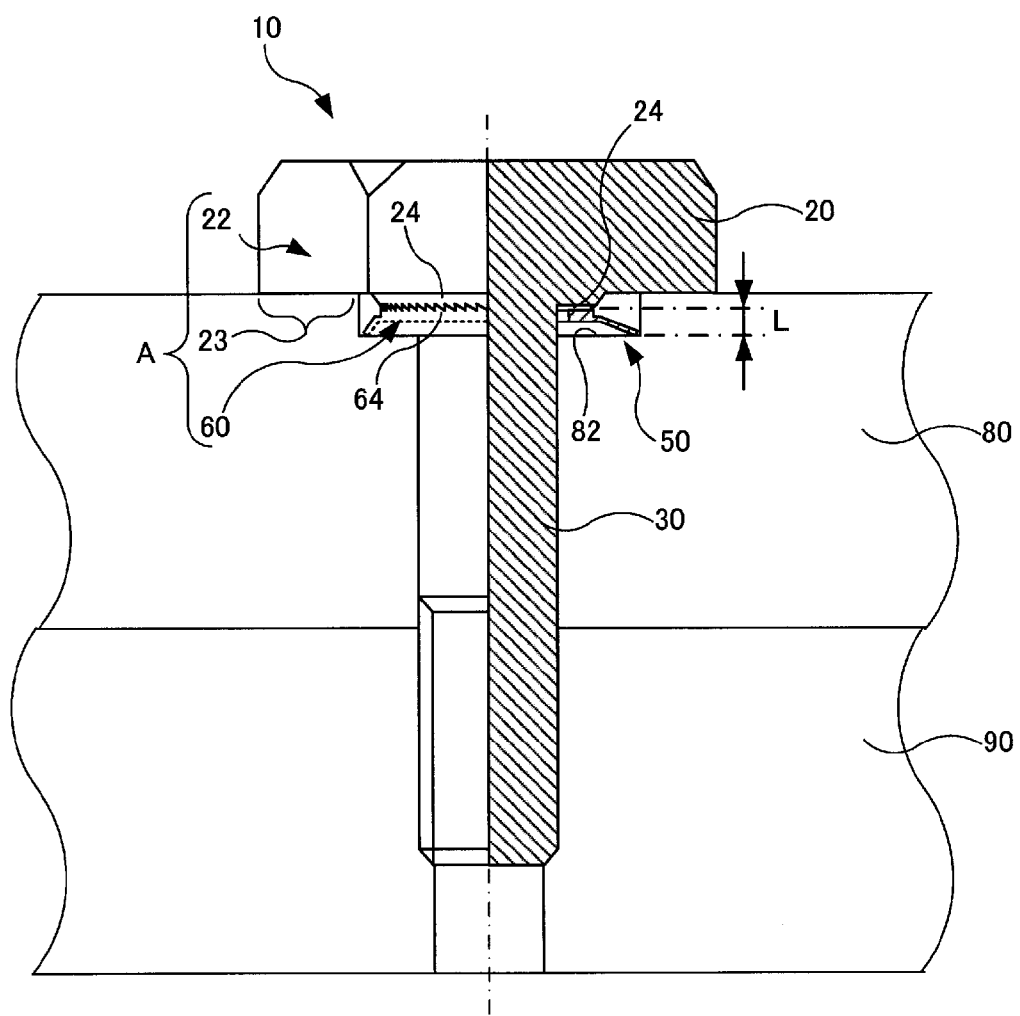
FIG. 13B is a cross-sectional side view illustrating a fastening state thereof.

FIGS. 13A and 13B illustrate a structure for preventing reverse rotation of a threaded body according to an embodiment A-4 of the present invention. In FIG. 13A, an appearance of the washer 50 corresponds to a shape of a circle eccentric with respect to the shaft center of the screw. The washer is a so-called disc spring, and is elastically deformed in an axial direction when receiving a fastening force from the male screw body 10.

As shown in FIG. 13B, the washer 50 is received in the recessed housing part 82 of an eccentric circular shape formed in the member 80 to be fastened. The screw-body-side recesses and protrusions 24 are formed at a center of the screw-body-side seat part 22 of the male screw body 10, and engage the first-receiving-part-side recesses and protrusions 64 of the washer 50. Further, a pressed face 23 to be in direct contact with the member 80 to be fastened is formed on an outer side of the screw-body-side recesses and protrusions 24 in the screw-body-side seat part 22.

A gap L between the bottom of the recessed housing part 82 and the screw-body-side recesses and protrusions 24 of the male screw body 10 is set to be relatively small when compared to an axial dimension of the washer 50. Accordingly, when strongly tightening the male screw body 10, the washer 50 is inserted and elastically deformed between the bottom of the recessed housing part 82 and the screw-body-side recesses and protrusions 24. However, such an elastic deformation level is sufficient to restrict relative rotation of the screw-body-side recesses and protrusions 24 and the first-receiving-part-side recesses and protrusions 64. That is because the fastening force of the male screw body 10 is transferred directly to the member 80 to be fastened through the pressed face 23. In doing so, the strength and the rigidity of the washer 50 may decrease, whereby a manufacturing cost may be reduced.

Figure 14:
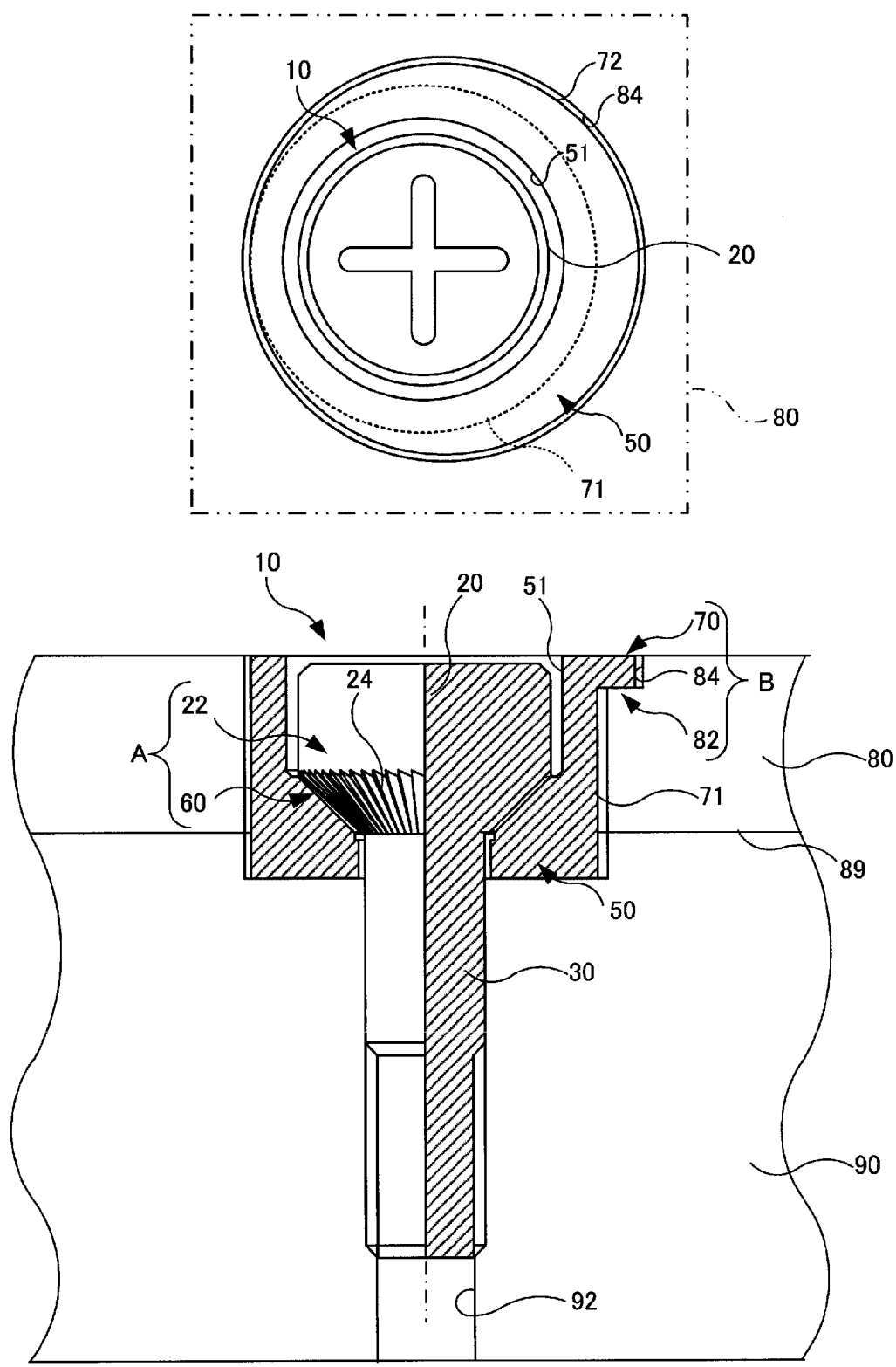
FIG. 14A is a top view illustrating a fastening state of a structure for preventing reverse rotation of a threaded body associated with applications of the embodiments A-1 through A-4.
FIG. 14B is a cross-sectional side view thereof.

For example, as shown in FIG. 14, the first receiving part 60 of the washer 50 may be provided in a shape of a cylinder to receive the head part 20 of the male screw body 10. In detail, a receiving hole 51 is formed on the surface of the washer 50 to receive the head part 20 of the male screw body 10. Accordingly, the head part 20 is difficult to be in contact with an external member, and thus it is difficult to loosen the male screw body 10. In this example, the second receiving part 70 being an eccentric circle may be formed limitedly in a vicinity of the head part 20 (the upper end side of FIG. 14) of the washer 50. As described above, by forming both a circumferential wall 71 of a concentric circle and the second receiving part 70 of an eccentric circle in the washer 50, and engaging each of the circumferential wall 71 and the second receiving part 70 with the member 80 to be fastened, a concentricity with the female screw hole 92 may be obtained through the circumferential wall 71, and also relative rotation thereof may be prevented through the second engaging mechanism B.

As shown in FIG. 14, a boundary surface 89 between the member 80 to be fastened and the base 90 may be disposed in the middle of the axial direction of the washer 50. In doing so, when a shearing force corresponding to the boundary surface 89 is applied between the member 80 to be fastened and the base 90, the shearing force may be received by the outer circumferential surface (the circumferential wall 71 or the outer wall 72) of the washer 50. Thus, without thickening the male screw body 10, the male screw body 10 and the washer 50 may be integrated by increasing the rigidity of the washer 50, and the rigidity with respect to the shearing force may increase. In addition, in this example, by separating a ring-shaped part in which the first-receiving-part-side recesses and protrusions 64 of the first receiving part 60 are formed from the washer 50 forming a long cylindrical shape having the eccentric flange-shaped outer wall 72, the outer circumference of the first receiving part 60 forming a ring shape may be eccentric with respect to the shaft center of the screw. Meanwhile, an eccentric interlocking part obtained by inserting the corresponding ring-shaped part may be provided in the washer 50, and relative rotation of the corresponding ring-shaped part and the washer 50 may be prevented.

In the embodiments A-1 through A-4, the head part of the male screw body 10 engages the washer 50. However, the embodiments are not limited to an application to a male screw body. The loosening preventing device may be applied to a female screw body. For example, as shown in FIG. 15, by providing the first engaging mechanism A and the second engaging mechanism B among a female screw body 18, the washer 50, and the member 80 to be fastened, reverse rotation of the female screw body 18 may also be prevented.

In addition, in the embodiments A-1 through A-4, the appearance of the washer 50 corresponds to a circular shape or a partial arc. However, other shapes may be adopted. For example, the appearance of the washer 50 may be an elliptical shape, an oval shape, and a polygonal shape. In detail, in a case of preventing relative rotation through interlocking with the recessed housing part, the appearance of the washer 50 with respect to the shaft center may preferably correspond to an imperfect circular shape (a shape other than a concentric perfect circle). In the embodiment 4 of FIG. 13, the washer 50 being the disc spring is elastically deformed. However, the washer 50 may be elastically deformed like a spring washer. Further, the washer may be formed using a composite material of metal and an elastically deformable material (for example, rubber), to be elastically deformed.

Hereinafter, embodiments of the present invention belonging to the group B will be described in detail with reference to the drawings.

Figure 16A:
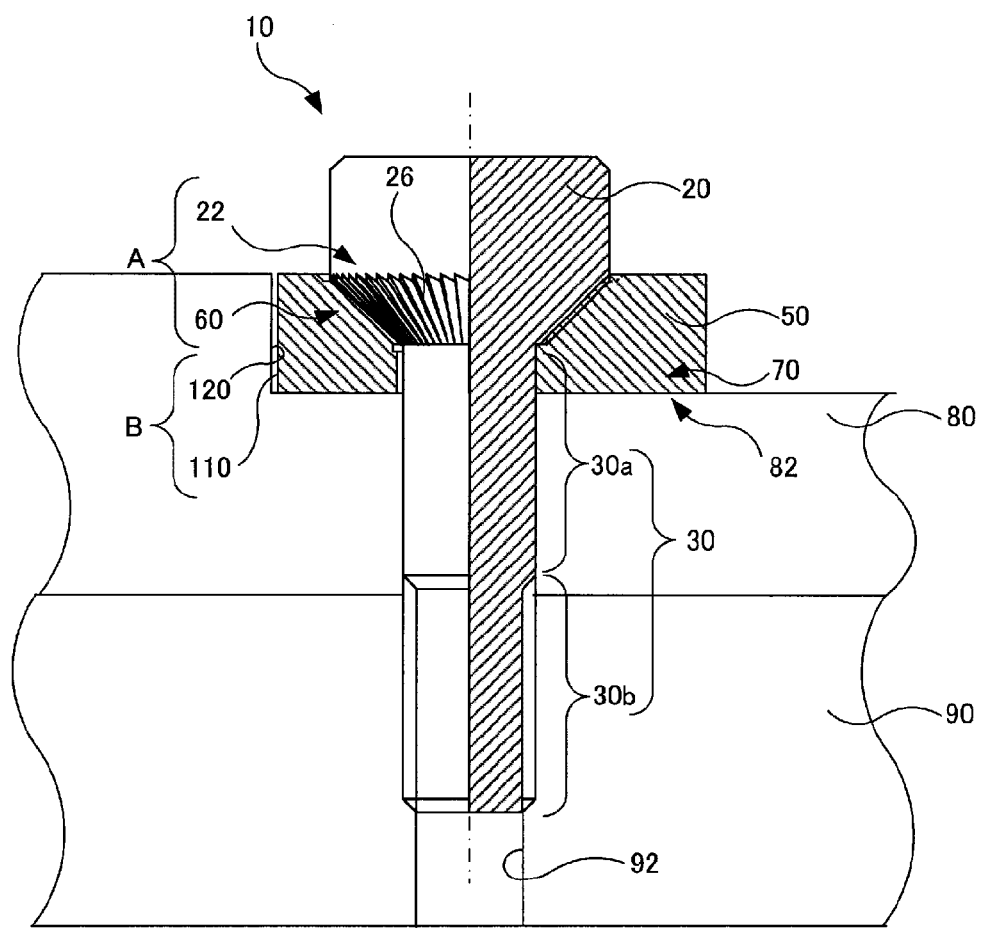
FIG. 16A is a cross-sectional side view illustrating a structure for preventing reverse rotation of a threaded body according to an embodiment B-1 of the present invention.
Figure 16B:
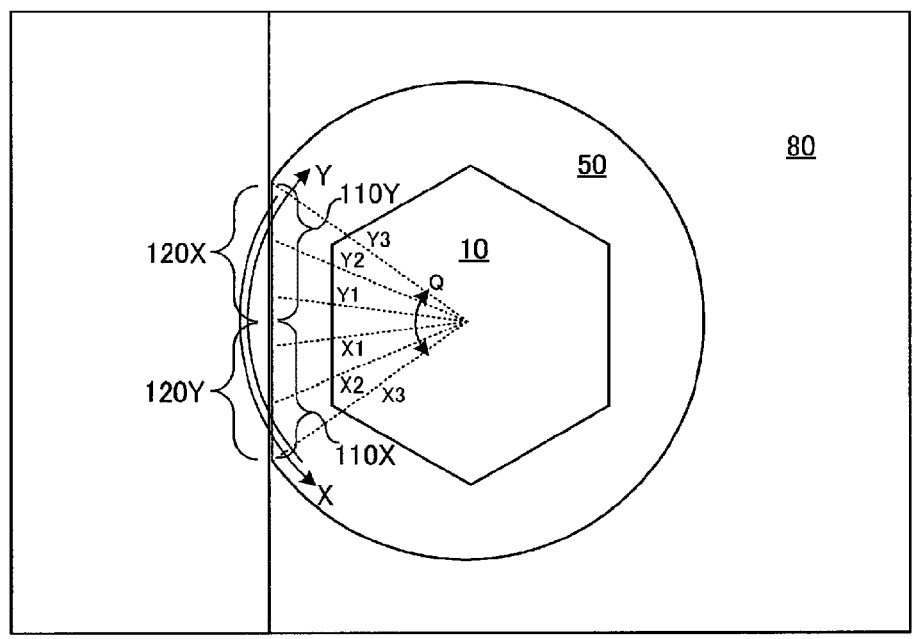
FIG. 16B is a top view thereof.
Figure 18:
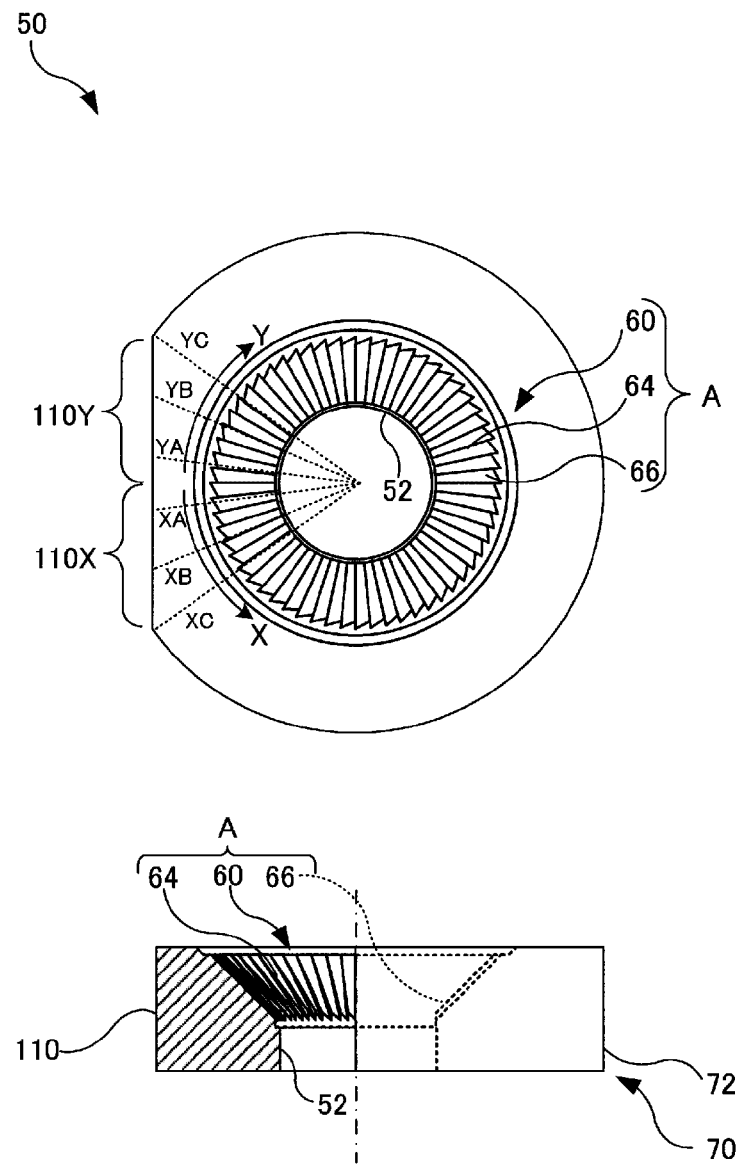
FIG. 18 illustrates a top view and a cross-sectional side view of a washer used for the structure for preventing reverse rotation.

FIGS. 16A and 16B illustrate a structure for preventing reverse rotation of a threaded body according to an embodiment B-1. Referring to FIG. 18, the structure for preventing reverse rotation of the threaded body includes a male screw body 10, a ring-shaped washer 50, a member 80 to be fastened, and a base 90. The base 90 includes a female screw hole 92 to be screwed with the male screw body 10. The member 80 to be fastened is interposed between the base 90 and the male screw body 10, thereby being fastened.

The male screw body 10 is a so-called bolt, and includes a head part 20 and a shaft part 30. A screw-body-side seat part 22 is formed at a part corresponding to a lower portion or a root of the head part 20. The shaft part 30 includes a cylindrical part 30a and a threaded part 30b. The cylindrical part 30a is not essential.

A first receiving part 60 is formed on one side (upper side of FIG. 16A) of the washer 50. The first receiving part 60 faces the screw-body-side seat part 22, and a first engaging mechanism A is provided therebetween. When at least the screw-body-side seat part 22 rotates the male screw body 10 being fastened in a loosening direction, the first receiving part 60 and the screw-body-side seat part 22 engage each other, and the first engaging mechanism A prevents relative rotation of the first receiving part 60 and the screw-body-side seat part 22 in the corresponding rotating direction.

A second receiving part 70 is formed on another side (lower side of FIG. 16A) of the washer 50. The first receiving part 70 faces the member 80 to be fastened.

The member 80 to be fastened includes a member-side seat part 82 to face the second receiving part 70 of the washer 50. The second receiving part 70 and the member-side seat part 82 are ring-shaped planar areas in contact with each other, and transfer a fastening force (axial force) of the male screw body 10 to the member 80 to be fastened. In detail, a large portion of the axial force of the male screw body 10 is transferred to the member 80 to be fastened through the washer 50.

A second engaging mechanism B is provided in the vicinity of the member-side seat part 82 of the member 80 to be fastened and the second receiving part 70 of the washer 50 to maintain a contact state therebetween although torque is applied to the washer 50 in a predetermined direction, and to restrict relative rotation thereof.

As shown in FIG. 16B, the second engaging mechanism B includes a washer-side contact part 110 and a member-side contact part 120. An outer wall of the washer 50 is provided in a shape of a partial arc concentric with respect to the shaft center of the screw, and a remaining portion is provided in a shape being cut off rectilinearly, like a chord. The chord corresponds to the washer-side contact part 110. In detail, when considering the washer-side contact part 110 only, the washer-side contact part 110 is provided, in the vicinity of the second receiving part 70, by a plane perpendicular to the radial direction and facing the radially outward direction.

Meanwhile, the member-side contact part 120 is provided, in the vicinity of the member-side seat part 82, by a plane perpendicular to the radial direction and facing the radially inward direction. Thus, the washer-side contact part 110 and the member-side contact part 120 face each other to be in contact with each other.

In detail, the washer-side contact part 110 includes a first washer-side contact area 110X to face one rotating direction X of the male screw body 10, and a second washer-side contact area 110Y to face another rotating direction Y of the male screw body. The member-side contact part 120 includes a first member-side contact area 120Y to face the other rotating direction Y of the male screw body 10 to be in contact with the first washer-side contact area 110X, and a second member-side contact area 120X to face the one rotating direction X of the male screw body 10 to be in contact with the second washer-side contact area 110Y.

For example, in a case in which the male screw body 10 is a right-hand screw, when rotating the male screw body 10 in the direction Y to tighten the male screw body 10, the washer 50 performs relative rotation in the direction Y with respect to the member-side seat part 82 accordingly. However, as a result, the contact state between the first washer-side contact area 110X and the first member-side contact area 120Y is maintained, and relative rotation thereof is restricted. Similarly, when loosening the male screw body 10 in the direction X, the washer 50 performs relative rotation in the direction X with respect to the member-side seat part 82 accordingly. However, as a result, the contact state between the second washer-side contact area 110Y and the second member-side contact area 120X is maintained, and relative rotation thereof is restricted.

The washer-side contact part 110 and the member-side contact part 120 are disposed within an angle range Q of a portion of the circumferential direction of the male screw body 10. When the washer-side contact part 110 and the member-side contact part 120 are formed on all sides, the structure of the washer-side contact part 110 or the member-side contact part 120 is complicated, a manufacturing cost increases, and an operation of fastening the male screw body 110 is easily interfered. The angle range to provide the contact part is preferably less than 180 degrees, and more preferably less than 120 degrees. In the present embodiment, the washer-side contact part 110 and the member-side contact part 120 are disposed within the angle range of about 70 degrees. Thus, a remaining range of 290 degrees may open the vicinity of the male screw body 10.

Furthermore, in the present embodiment, the washer-side contact part 110 and the member-side contact part 120 extend on the washer 50 from the member-side seat part 82 of the member 80 to be fastened in the axial direction of the male screw body 10. Thus, the washer 50 may effectively utilize the outer circumferential surface thereof as the washer-side contact part 110.

In addition, here, a structure in which rotation of the washer 50 is also restricted when the male screw body 10 rotates in both directions X and Y is illustrated. However, the embodiment of the present invention is not limited thereto. When at least the washer 50 rotates in the loosening direction X along with the male screw body 10, the contact state between the second washer-side contact area 110Y and the second member-side contact area 120X may be maintained, and relative rotation of the second receiving part 70 and the member-side seat part 82 with respect to the corresponding rotating direction X may be prevented.

As described above, by the operations of the first engaging mechanism A and the second engaging mechanism B, when the male screw body 10 rotates in the loosening direction X, relative rotation of the male screw body 10 and the member 80 to be fastened is restricted through interposition of the washer 50. Accordingly, loosening of the male screw body 10 is prevented. In addition, when the male screw body 10 rotates in the tightening direction Y, co-rotation of the washer 50 may be restricted by the second engaging mechanism B, and an engaging operation of the first engaging mechanism A may be properly performed.

Figure 17:
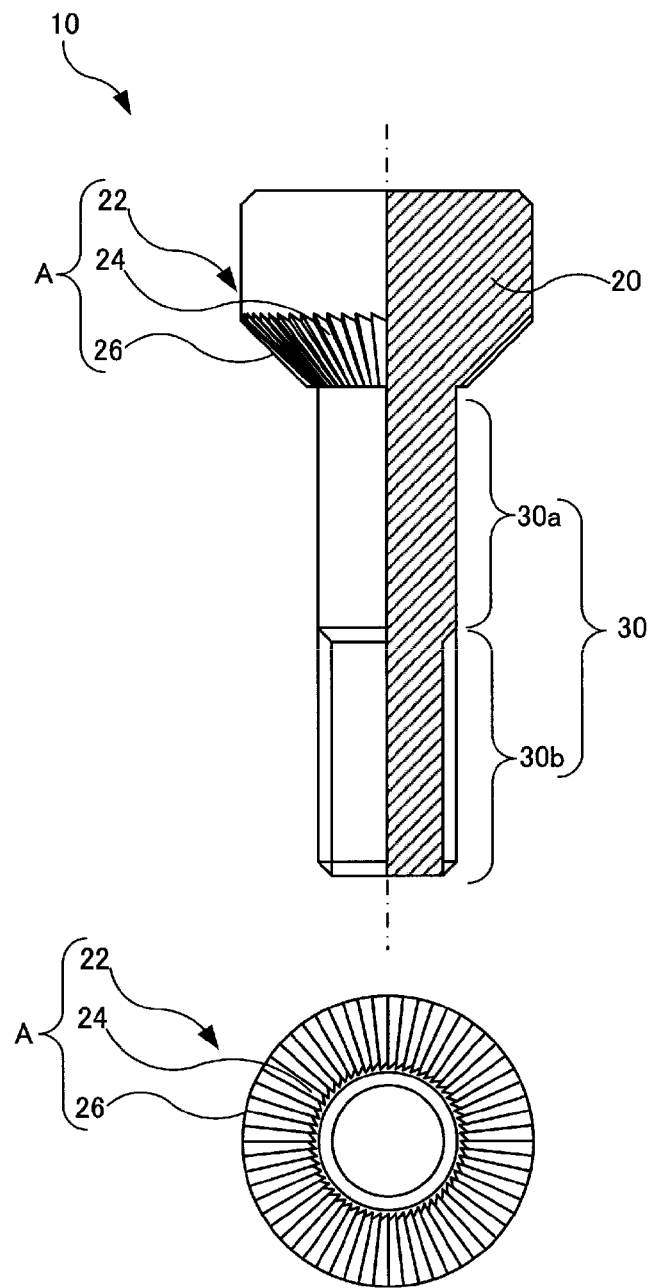
FIG. 17 illustrates a cross-sectional side view and a bottom view of a male screw body used for the same structure for preventing reverse rotation.

As shown in FIG. 17, as the first engaging mechanism A, screw-body-side recesses and protrusions 24 are formed on the screw-body-side seat part 22 of the male screw body 10. The screw-body-side recesses and protrusions 24 are formed in a shape of a plurality of saw blades continuously provided in a circumferential direction. An extending direction of each of the screw-body-side recesses and protrusions 24, for example, an extending direction of a ridge, corresponds to a radial direction of the male screw body 10. Thus, the screw-body-side recesses and protrusions 24 extend radially from the shaft center.

Further, screw-body-side taper faces 26 are formed on the screw-body-side seat part 22 to be inclined in a radial direction. The screw-body-side taper faces 26 are inclined so that a center side thereof may be close to an end of the screw. Thus, the screw-body-side taper faces 26 are provided in a conical shape protruding on a front side of the screw. More preferably, the aforementioned screw-body-side recesses and protrusions 24 are formed on the screw-body-side taper faces 26.

As shown in FIG. 18, as the first engaging mechanism A, first-receiving-part-side recesses and protrusions 64 to engage the screw-body-side recesses and protrusions 24 are formed on the first receiving part 60 of the washer 50. The first-receiving-part-side recesses and protrusions 64 are formed in a shape of a plurality of saw blades continuously provided in the circumferential direction. An extending direction of each of the first-receiving-part-side recesses and protrusions 64, for example, an extending direction of a ridge, corresponds to the radial direction of the male screw body 10. Thus, the first-receiving-part-side recesses and protrusions 64 extend radially from a center of a through hole 52 of the washer 50.

Further, preferably, washer-side taper faces 66 are formed on the first receiving part 60 to be inclined in the radial direction. The washer-side taper faces 66 are inclined so that a center side thereof may be close to the end of the screw, thereby forming a shape of a pot. Thus, the washer-side taper faces 66 are provided in a conical shape recessed on the front side of the screw. The aforementioned first-receiving-part-side recesses and protrusions 64 are formed on the washer-side taper faces 66.

Figure 19A:
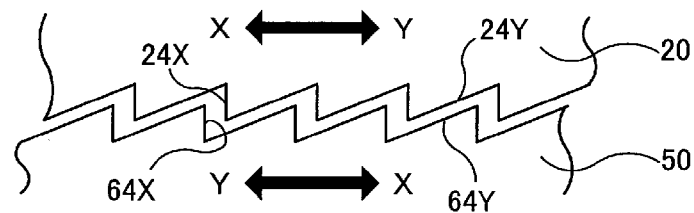
FIG. 19A illustrates an operation of saw blades of the same structure for preventing reverse rotation of the threaded body.

Accordingly, when strongly tightening the male screw body 10, the screw-body-side taper faces 26 of the screw-body-side seat part 22 are inserted into the recesses of the washer-side taper faces 66 of the washer 50 in the first engaging mechanism A, and the screw-body-side recesses and protrusions 24 engage the first-receiving-part-side recesses and protrusions 64. As shown in FIG. 19A, when the male screw body 20 rotates in a fastening direction Y, the toothed shapes of both allow relative slide thereof in a way that inclined surfaces 24Y and 64Y thereof are in contact with each other and a distance therebetween decreases in an axial direction. Conversely, when the male screw body 20 rotates in a loosening direction X, the toothed shapes prevent the relative movement thereof in a way that vertical surfaces (steeply inclined surfaces) 24X and 64X thereof are in contact with each other. In detail, by strongly tightening the male screw body 10, an engaging strength of the first engaging mechanism A may increase in the loosening direction X since the engagement between the screw-body-side recesses and protrusions 24 and the first-receiving-part-side recesses and protrusions 64 is enhanced as a distance between the screw-body-side seat part 22 and the first receiving part 60 decreases. Here, by differently setting inclination angles of the screw-body-side taper faces 26 and inclination angles of the washer-side taper faces 66, in detail, by setting inclination angles of the washer-side taper faces 66 from the shaft center to be narrower than inclination angles of the screw-body-side taper faces 26 from the shaft center, the male screw body 10 may be strongly tightened without rickety, irrespective of pitches of teeth formed on the respective taper faces.

Referring to FIG. 18 again, an outer wall 72 of the second receiving part 70 of the washer 50 is provided in a planer shape at a part corresponding to the washer-side contact part 110, and a distance from the shaft center of the screw to the outer wall 72 of the second receiving part 70 of the washer 50 changes in the circumferential direction. In detail, distances XA, XB, and XC from the shaft center of the screw to the first washer-side contact area 110X increase in the one rotating direction X of the male screw body 10. Distances YA, YB, and YC from the shaft center of the screw to the second washer-side contact area 110Y increase in the one rotating direction Y of the male screw body 10. In addition, a portion excluding the washer-side contact part 110 is provided in a shape of a perfect circle in which a distance from the shaft center of the screw is constant.

As shown in FIG. 16B, in the vicinity of the member-side seat part 82 of the member 80 to be fastened, a step protruding toward the head part of the male screw 10 is formed. A side wall of a planar shape facing the washer 50 at the step corresponds to the member-side contact part 120. A distance from the shaft center of the screw to the member-side contact part 120 also changes in the circumferential direction. In detail, distances X1, X2, and X3 from the shaft center of the screw to the first member-side contact area 120Y increase in the one rotating direction X of the male screw body 10. Distances Y1, Y2, and Y3 from the shaft center of the screw to the second member-side contact area 120X increase in the one rotating direction Y of the male screw body 10. In addition, such changes in the washer-side contact part 110 and the member-side contact part 120 are set to be equal, when a somewhat space margin is ignored. In another example, an elasticity or a shape of the washer 50 may be set to fill the space margin in the way that the washer 50 is deformed in a direction perpendicular to the shaft when the washer 50 is fastened with the male screw 10 and compressed in the axial direction.

Accordingly, when the second receiving part 70 of the washer 50 is in contact with the member-side seat part 82 of the member 80 to be fastened, the washer-side contact part 110 is in contact with the member-side contact part 120. Thus, relative rotation thereof in the circumferential direction is restricted while being aligned with the shaft center of the screw. In detail, the washer-side contact part 110 and the member-side contact part 120 act as the second engaging mechanism B.

As described above, the structure for preventing reverse rotation of the threaded body according to the embodiment B-1 prevents reverse rotation, in detail, loosening of the male screw body 10 in the way that, by interposing the washer 50, the first engaging mechanism A is provided between the screw-body-side seat part 22 and the first receiving part 60, the second engaging mechanism B is provided between the member-side seat part 82 and the second receiving part 70, and the male screw body 10 engages the member 80 to be fastened in the circumferential direction by mutual restrictions of the first engaging mechanism A and the second engaging mechanism B when an attempt is made to loosen the male screw body 10. Thus, despite occurrence of oscillations, a fastening state free from loosening may be obtained.

Further, in the present embodiment, as the first engaging mechanism A, the screw-body-side recesses and protrusions 24 and the first-receiving-part-side recesses and protrusions 64 are formed in the shape of a plurality of saw blades continuously provided in the circumferential direction, and act as a so-called ratchet device or one-way clutch device. Thus, in a case of fastening operation, relative movements of the screw-body-side recesses and protrusions 24 and the first-receiving-part-side recesses and protrusions 64 are allowed, whereby smooth relative rotation is implemented. Conversely, in a case of loosening operation, relative movements of the screw-body-side recesses and protrusions 24 and the first-receiving-part-side recesses and protrusions 64 are completely restricted. Therefore, both fastening workability and loosening preventing may be reasonably achieved.

In addition, in the embodiment B-1, as the first engaging mechanism A, the screw-body-side taper faces 26 and the washer-side taper faces 66 are formed on the screw-body-side seat part 22 and the first receiving part 60, respectively, and thus a contact area therebetween may increase. Furthermore, a fastening force in the axial direction of the male screw body 10 is also applied in the radial direction through the taper faces. The taper faces strongly press one another in the radial direction, whereby self-excitation centering may be performed. Therefore, concentricities of the male screw body 10 and the washer 50 may increase, and an engagement precision of the screw-body-side recesses and protrusions 24 and the first-receiving-part-side recesses and protrusions 64 may increase. Additionally, a minute difference in angle may be made by setting inclinations of the screw-body-side taper faces 26 on the protrusion side to be slightly steep, and setting inclination angles of the washer-side taper faces 66 on the recess side to be slightly narrow. In doing so, with an increase in a fastening pressure, the taper faces may be gradually in contact with one another from the center in the radially outward direction.

Besides, in the embodiment B-1, as the second engaging mechanism B, the shapes of the washer-side contact part 110 and the member-side contact part 120 avoid being concentric with respect to the shaft center of the screw. In other words, the distance from the shaft center of the screw to the washer-side contact part 110, and the distance from the shaft center of the screw to the member-side contact part 120 change in the circumferential direction. By the shapes described above, once the washer-side contact part 110 is in contact with the member-side contact part 120, relative rotation thereof in the circumferential direction is restricted while shaft centers thereof match. In detail, the washer-side contact part 110 and the member-side contact part 120 are formed partially in the circumferential direction, rather than being formed on all sides of the male screw body 10, and thus the washer 50 or the member 80 to be fastened may be manufactured in a simple shape, and relative rotation thereof may also be prevented. Further, the vicinity of the washer 50 or the screw body 10 may be opened widely.

Figure 19B:
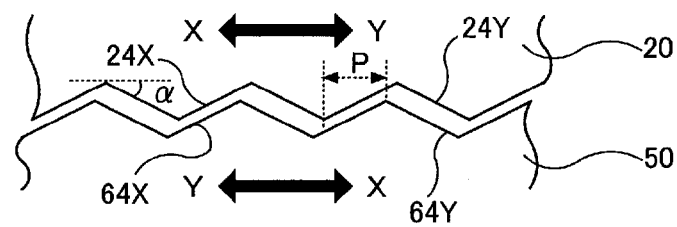
FIGS. 19B through 19D illustrate modified examples of the saw blades.

In the embodiment B-1, as the first engaging mechanism A, the screw-body-side recesses and protrusions 24 and the first-receiving-part-side recesses and protrusions 64 are provided in the shape of saw blades. However, the embodiment of the present invention is not limited thereto. For example, as shown in FIG. 19B, the recesses and protrusions may be provided in a threaded shape (including inclined surfaces on both sides). In doing so, when the male screw body 20 rotates in the loosening direction X, the inclined surfaces 24X and 64X perform relative movement. However, along the inclined surfaces, the screw-body-side recesses and protrusions 24 and the first-receiving-part-side recesses and protrusions 64 are separate from one another. When a moving distance (a separation angle α) is set to be greater than a lead angle of the male screw body 10, the screw-body-side recesses and protrusions 24 and the first-receiving-part-side recesses and protrusions 64 are separate from one another although an attempt is made to loosen the male screw body 10. Thus, the male screw body 10 may not be loosened. In addition, FIG. 19B illustrates the recesses and protrusions having cross-sections of isosceles triangles. However, as shown in FIG. 19C, the inclination angles of the inclined surfaces 24X and 64X to be in contact with each other when rotation is performed in the loosening direction may be set to be smoother than the inclination angles of the inclined surfaces 24Y and 64Y to be in contact with each other when rotation is performed in the fastening direction.

In doing so, a circumferential distance P of the inclined surfaces 24Y and 64Y which need to move over each other when rotation is performed in the fastening direction may decrease, and thus a gutter (gap) after fastening may be reduced.

Figure 19C:
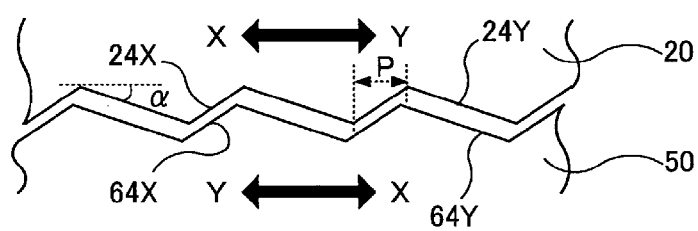
Figure 19D:
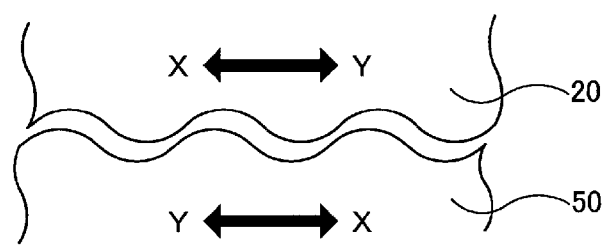
Figure 20A:
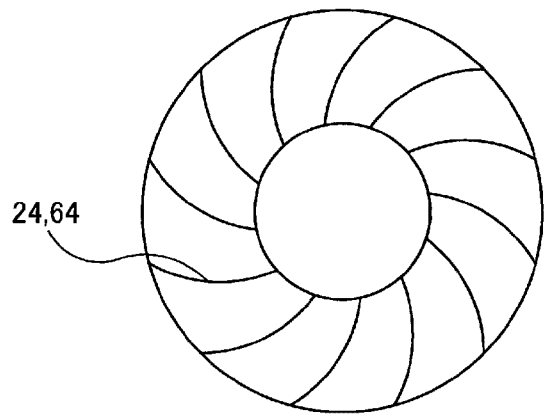
FIGS. 20A through 20C illustrate modified examples of the saw blades of the same structure for preventing reverse rotation.
Figure 20B:
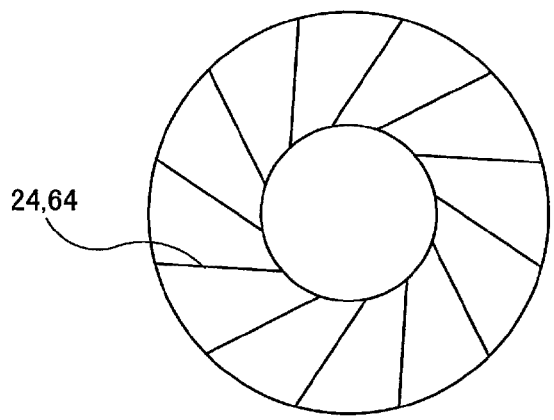
Figure 20C:
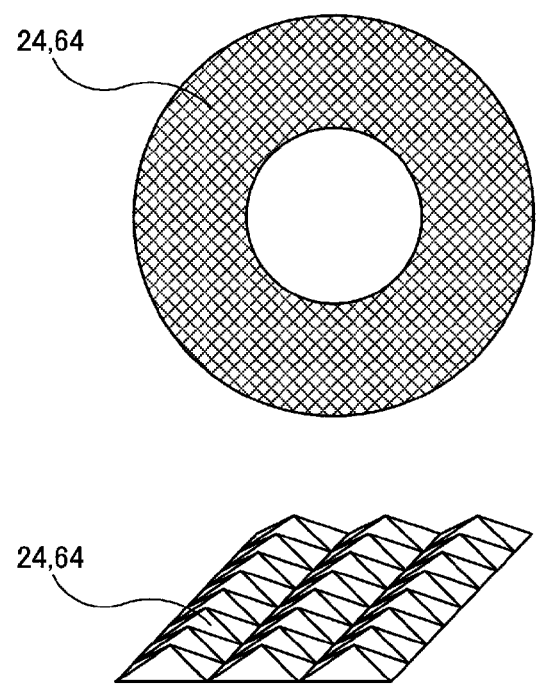

Further, as an application of FIGS. 19A through 19C, as shown in FIG. 19D, the recesses and protrusions may be provided in a wavy shape in which crests and roots are curved. In this example, when fastening, smooth manipulation may be obtained. Moreover, although the embodiment B-1 suggests the recesses and protrusions extending in the radial direction, swirling-shaped (spiral) grooves or threads (recesses and protrusions) may be formed, as shown in FIG. 20A. As shown in FIG. 20B, grooves or threads (recesses and protrusions) extending rectilinearly may be disposed to be inclined such that a circumferential phase may change with respect to the radial direction of the screw. As shown in FIG. 20C, a so-called emboss shape in which a plurality of minute recesses and protrusions are formed in the circumferential direction of the screw and on both sides (planarly) of the radial direction may be adopted.

Furthermore, as shown in the embodiment B-1, the shapes of the screw-body-side recesses and protrusions 24 and the first-receiving-part-side recesses and protrusions 64 do not need to match (be similar to one another). For example, a combination of different shapes selected from the variety of the shapes as shown in FIGS. 19A through 20C may be used.

Figure 21A:
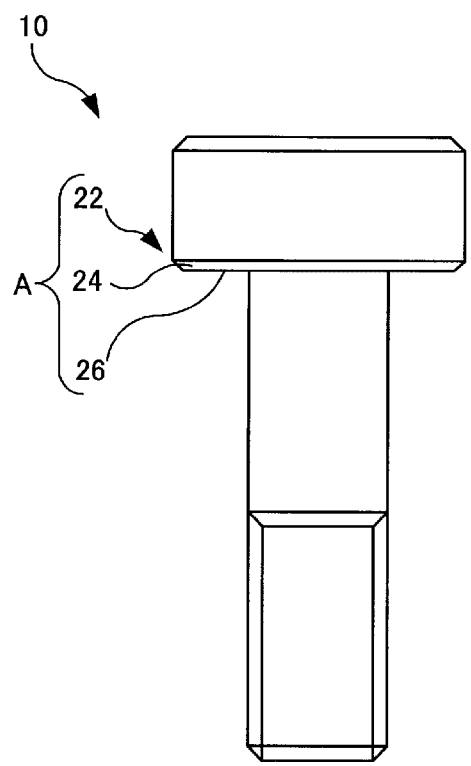
FIGS. 21A and 21B are side views illustrating applications of a male screw body of the same structure for preventing reverse rotation, the male screw body being not tightened.
Figure 21B:
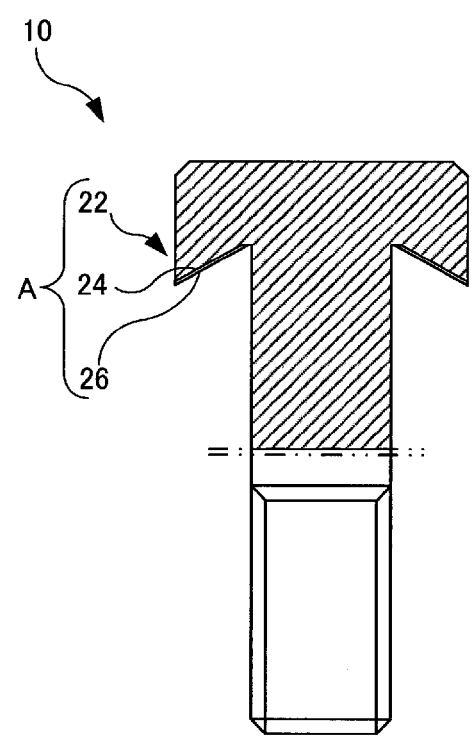

In the embodiment B-1, the screw-body-side taper faces 26 are provided in a shape of protrusions, and the washer-side taper faces 66 are provided in a shape of recesses. However, the embodiment of the present invention is not limited thereto. For example, the screw-body-side taper faces 26 may be provided in a planar shape as shown in FIG. 21A, or in a recessed shape as shown in FIG. 21B. The foregoing may also be applicable to the washer-side taper faces. In particular, although not shown in the drawings, the inclination angles of the taper faces may not need to match when an elastic deformation of the washer 50 is effectively utilized. The taper faces may be formed on one of the male screw body 10 or the washer 50. Further, by providing the taper faces in the shape of protrusions or recesses, both may be in close contact with each other using elastic deformation of the washer. In addition, to obtain an elasticity of the washer 50, a basic shape of the washer 50 may be a so-called spring washer which is formed in a spiral shape, or a disc spring washer.

Figure 22A:
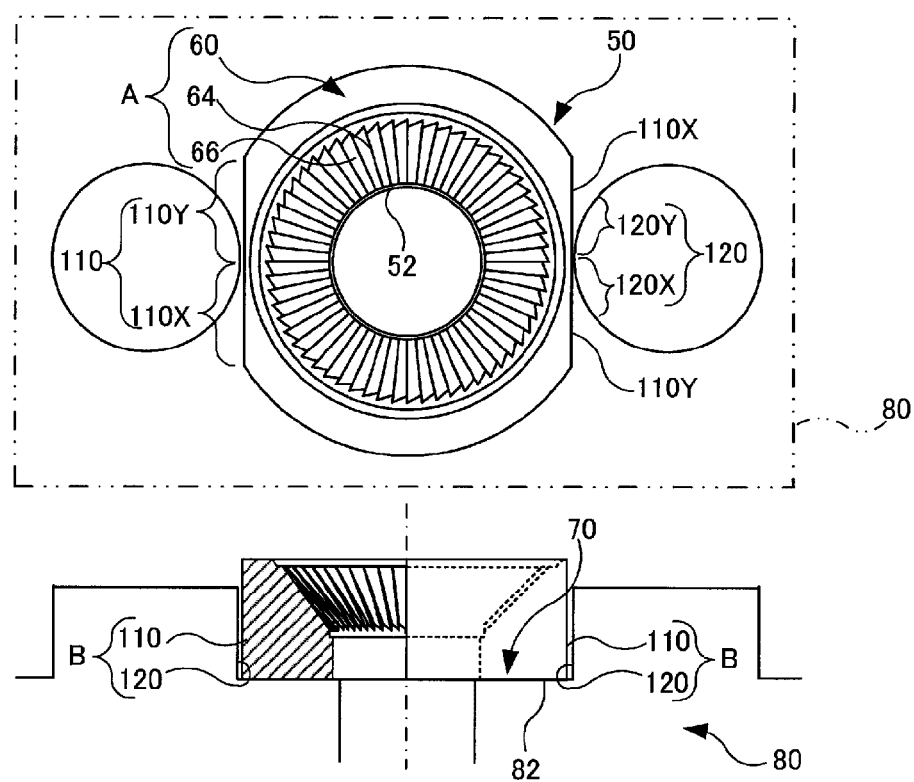
FIGS. 22A and 22B are top views and cross-sectional side views of washers used in applications of the same structure for preventing reverse rotation.

As an application of the embodiment B-1, as shown in FIG. 22A, the washer-side contact part 110 may be formed on a plurality of sides (here, two sides) in the vicinity of the second receiving part 70 of the washer 50. The member-side contact part 120 formed in the vicinity of the member-side seat part 82 is also formed on a plurality of sides. In this example, the first member-side contact area 110Y and the second member-side contact area 120X do not need to be provided in the similar shapes with respect to the first washer-side contact area 110X and the second washer-side contact area 110Y of the washer-side contact part 110. As described in the present application, the member-side contact part 120 may be provided on a portion of the outer circumferential surface of the column protruding with respect to the washer-side contact part 110. Thus, the first member-side contact area 110Y and the second member-side contact area 120X are provided in a shape of curved surfaces protruding toward the first washer-side contact area 110X and the second washer-side contact area 110Y to be in contact with each other. In the foregoing structure, the washer-side contact part 110 and the member-side contact part 120 are in contact with each other, and relative rotation thereof in the circumferential direction is restricted.

Figure 22B:
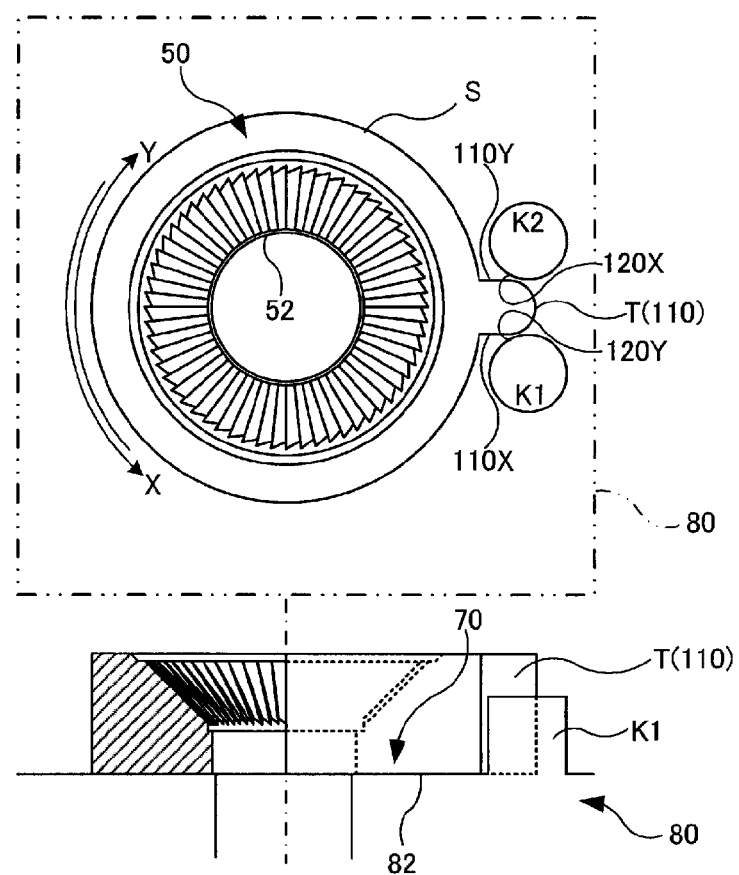

As shown in FIG. 22B, the outer wall of the washer 50 may be provided in a shape of a partial arc S concentric with respect to the shaft center of the screw, and a lump T extending in the radial direction may be provided within an area of the portion. The lump T corresponds to the washer-side contact part 110, one side of the lump T facing the one rotating direction X of the male screw body 10 corresponds to the first washer-side contact area 110X, and another side of the lump T facing the other rotating direction Y of the male screw body 10 corresponds to the second washer-side contact area 110Y. In this example, a pair of columnar projections K1 and K2 are formed in the vicinity of the member-side seat part 82, and the lump T may be disposed therebetween. The projections K1 and K2 correspond to the member-side contact part 120. The first member-side contact area 110Y to be in contact with the first washer-side contact area 110X is formed on the projection K1, and the second member-side contact area 120X to be in contact with the second washer-side contact area 110Y is formed on the projection K2. Further, although not shown in the drawings, the projections K1 and K2 corresponding to the member-side contact part 120 may be detachable from the member 80 to be fastened through a threaded structure.

Figure 23A:
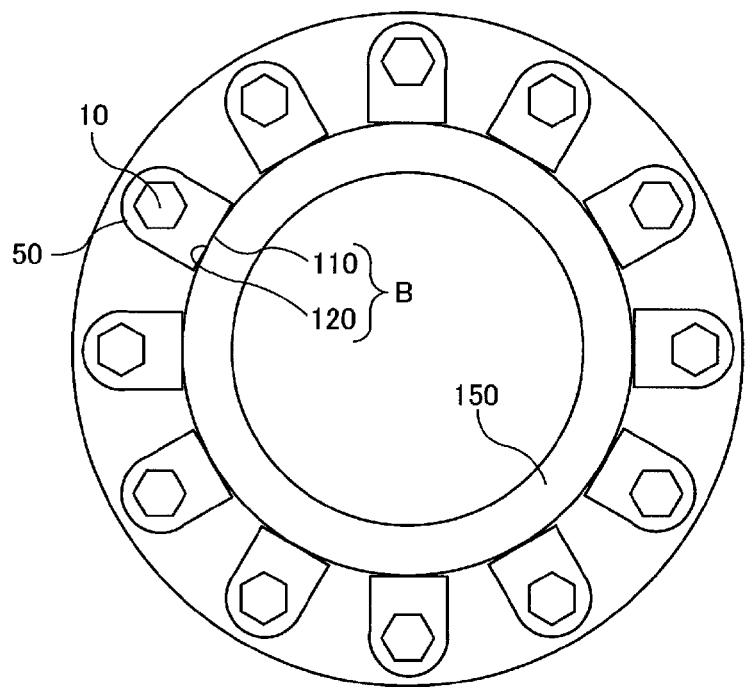
FIGS. 23A and 23B are top views illustrating examples of applying the same structure for preventing reverse rotation to fastening of a flange joint.

FIG. 23A illustrates an example of applying the structure according to the embodiment B-1 to fastening of a so-called flange joint. In this example, a portion of an outer circumferential surface of a pipe member 150 of the flange joint is used as the member-side contact part 120 of the second engaging mechanism B. Meanwhile, the washer-side contact part 110 to be in contact with the outer circumferential surface of the pipe member 150 is formed on the washer 50 to be applied to the screw body 10 such as a bolt or a nut. By providing the washer-side contact part 110 in a shape of a plane perpendicular to a radial direction of the pipe member 150, and disposing the washer-side contact part 110 to be in contact with the outer circumferential surface of the pipe member 150, rotation of the washer 50 in both directions is restricted.

Figure 23B:
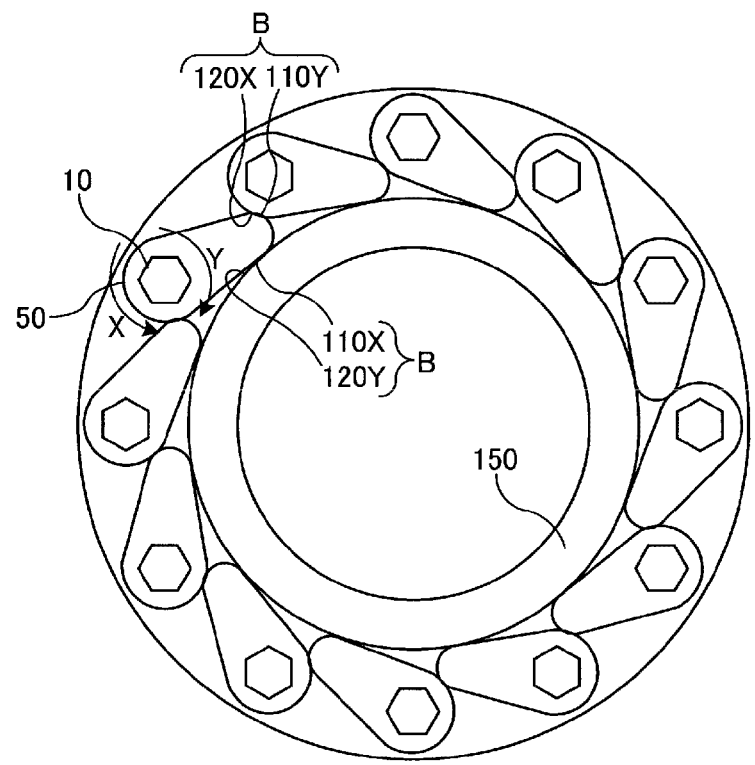

Further, the washer-side contact part 110 formed on the washer 50 may be provided in a shape as shown in FIG. 23B. In detail, when the screw body 10 rotates in the tightening direction Y, the first washer-side contact area 110X may be in contact with the outer circumferential surface of the pipe member 150 (the second member-side contact area 120Y). When the screw body 10 rotates in the loosening direction X, the second washer-side contact area 110Y may be in contact with an outer circumference of the adjacent washer 50 (the first member-side contact area 120X). In detail, neighboring washers 50 function as the member-side contact part 120 of the second engaging mechanism B. In doing so, the flange joint is fastened through the screw body 10 and the washer 50, as shown in FIG. 23B, and thus the structure for preventing reverse rotation of the threaded body is completed. The foregoing approach is not limited to fastening of the flange joint, and may be applicable when disposing a plurality of structures for preventing reverse rotation of threaded bodies in parallel.

Figure 24A:
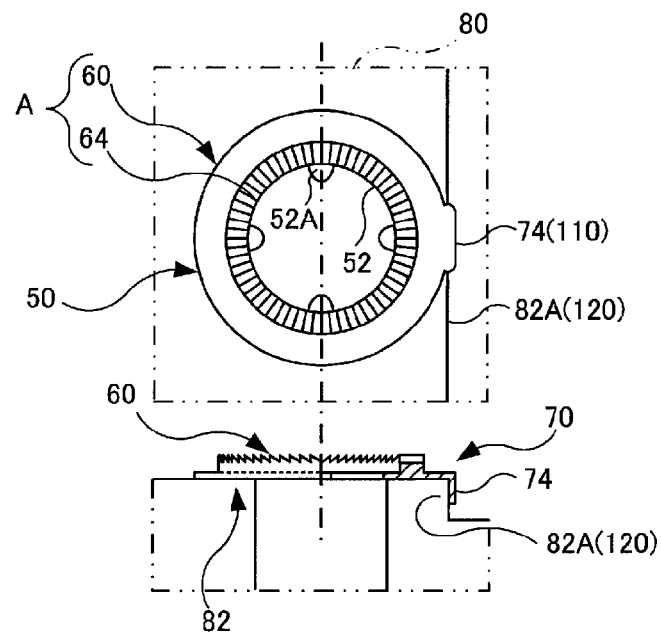
FIG. 24A illustrates a top view and a cross-sectional side view of a washer of a structure for preventing reverse rotation of a threaded body according to an embodiment B-2.
Figure 24B:
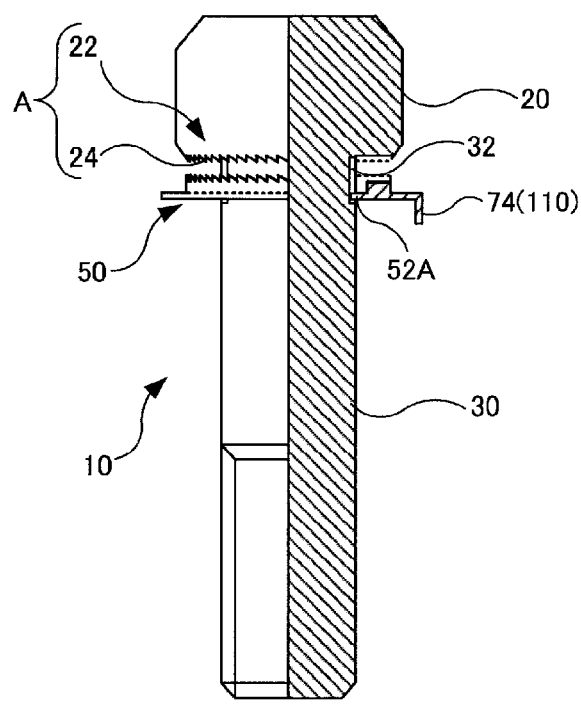
FIG. 24B is a cross-sectional side view illustrating the washer and a male screw body.

FIG. 24 illustrates a structure for preventing reverse rotation of a screw according to an embodiment B-2. As shown in FIG. 24B, the screw-body-side seat part 22 of the male screw body 10 is provided in a planar shape, and the screw-body-side recesses and protrusions 24 in the shape of saw blades are formed thereon. A constriction 32 is formed on the base of the shaft part 30 of the male screw body 10 to maintain the washer 50.

Referring to FIG. 24A, the first receiving part 60 of the washer 50 is provided in a planar shape, and the first-receiving-part-side recesses and protrusions 64 in the shape of saw blades are formed thereon. An engaging lump 52A protruding on an inner circumferential side is formed in the through hole 52 of the washer 50, thereby engaging the constriction 32 of the male screw body 10. Accordingly, the male screw body 10 and the washer 50 may be integrated (combined) in advance.

Further, a washer-side step part 74 is formed on the second receiving part 70 of the washer 50 to extend in an axial direction of the screw. The washer-side step part 74 is provided using a nail bent on the side of the member 80 to be fastened based on the second receiving part 70 of the washer 50.

Figure 24C:
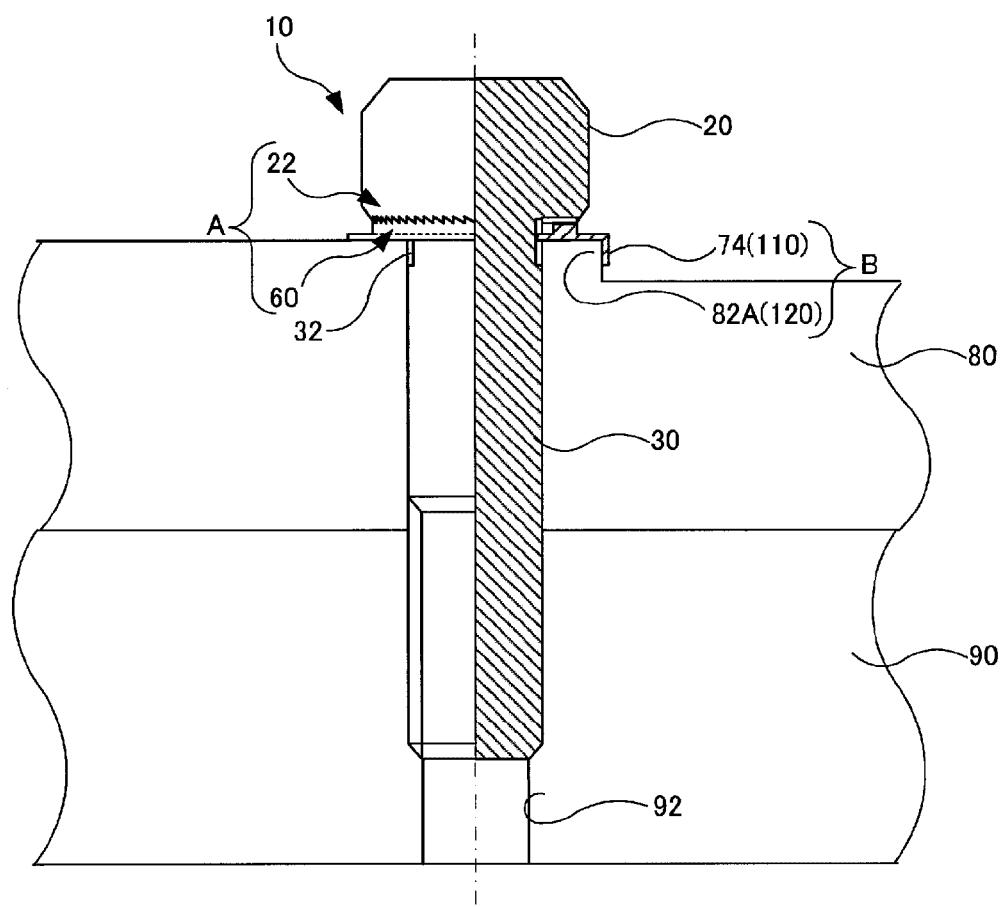
FIG. 24C is a cross-sectional side view illustrating a fastening state thereof.

A member-side step part 82A is provided in the member-side seat part 82 of the member 80 to be fastened to extend in the axial direction of the screw. The member-side step part 82A is a step depressed on the front side of the screw. Distances from the shaft center of the screw to the washer-side step part 74 and the member-side step part 82A match. Accordingly, when strongly tightening the male screw body 10, the washer-side step part 74 engages the member-side step part 82A, whereby relative rotation of the washer 50 and the member 80 to be fastened is prevented, as shown in FIG. 24C. In other words, the washer-side step part 74 corresponds to the washer-side contact part 110 of the second engaging mechanism B, and the member-side step part 82A corresponds to the member-side contact part 120 of the second engaging mechanism B.

As described above, by forming the second engaging mechanism B on a front side of the screw, when compared to the washer 50, in a range of a portion of the circumferential direction of the screw body 10, the vicinity of the screw body 10 may be opened.

In addition, in the embodiment B-2, the male screw body 10 and the washer 50 are integrated in advance through the constriction 32 of the male screw body 10 and the engaging lump 52A of the washer 50. However, the manner therefor is not limited thereto. For example, by providing magnetism on at least one side, the male screw body 10 and the washer 50 may be integrated using a magnetic force. Besides, the male screw body 10 and the washer 50 may be integrated in advance using an adhesive, (spot) welding, and press fitting (frictional force). The male screw body 10 and the washer 50 may also be integrated using an auxiliary device such as an O-ring.

Figure 25A:
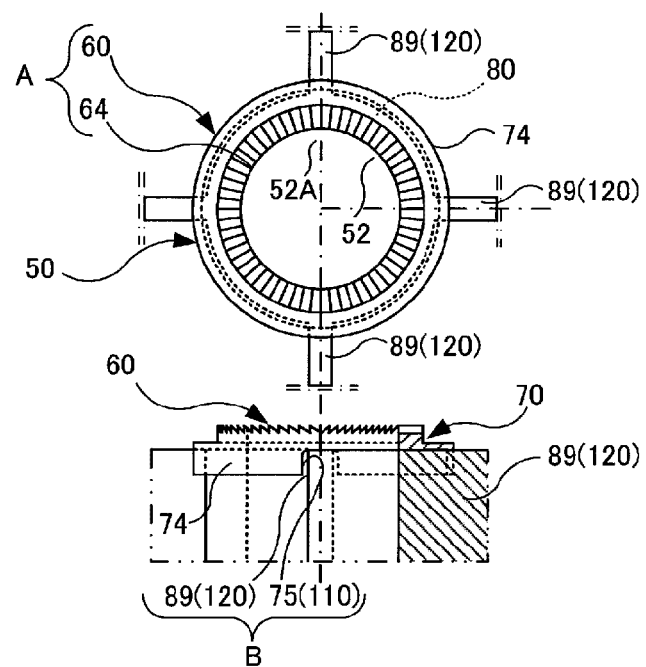
FIG. 25A illustrates a top view and a cross-sectional side view of a washer as an application of the same structure for preventing reverse rotation.
Figure 25B:
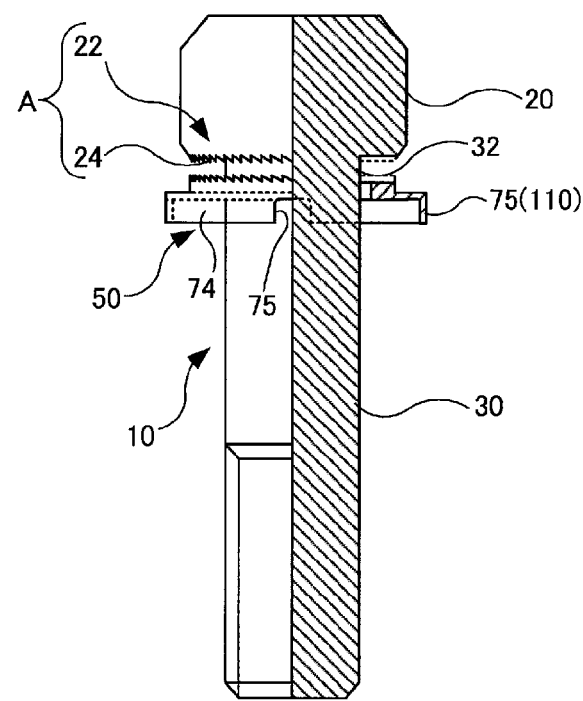
FIG. 25B is a cross-sectional side view illustrating the washer and a male screw body.
Figure 25C:
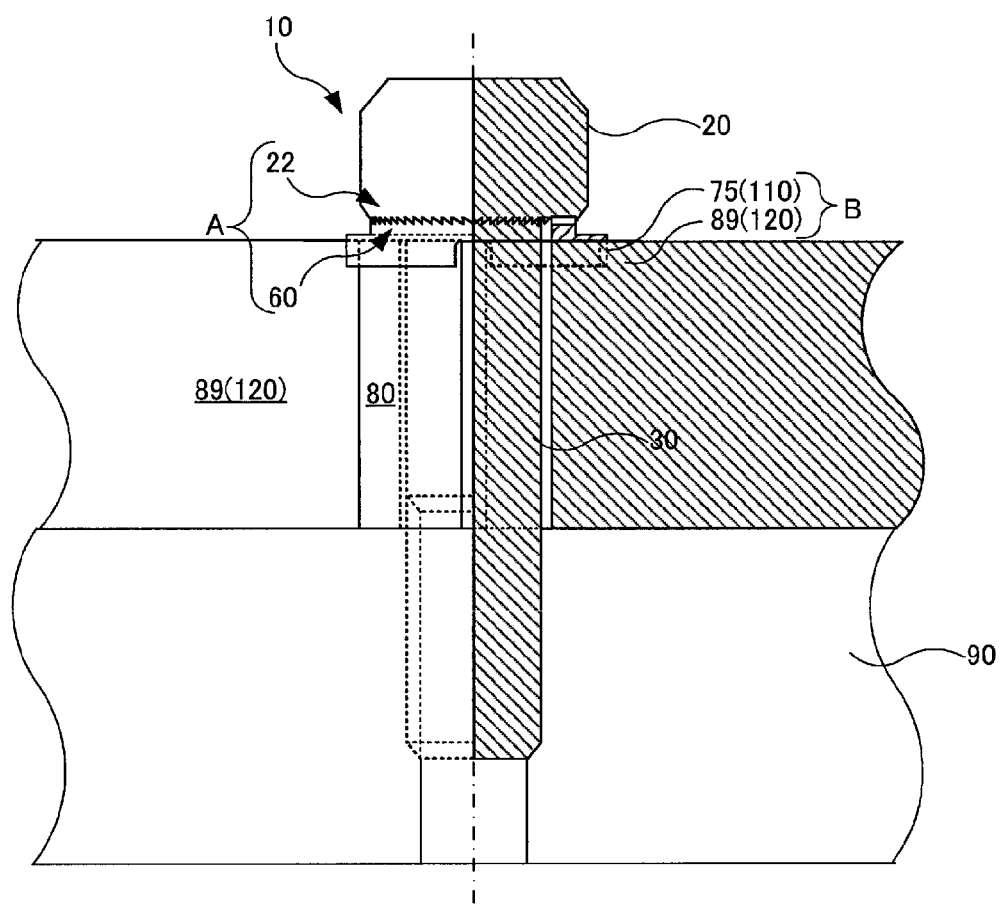
FIG. 25C is a cross-sectional side view illustrating a fastening state thereof.

FIGS. 25A through 25C illustrate an application of the embodiment B-2. The member 80 to be fastened is provided in a cylindrical shape to receive the shaft part 30. To increase a strength thereof, a rib 89 in a shape of a plate extending in all directions is disposed in the vicinity thereof. The rib 89 is utilized as the member-side contact part 120 of the second engaging mechanism B. A ring-shaped washer-side step part 74 to extend in the axial direction of the screw is formed in the vicinity of the second receiving part 70 of the washer 50. The washer-side step part 74 is covered with the cylindrical member 80 to be fastened. A notch 75 is formed on the washer-side step part 74 to avoid interference with the rib 89.

An inner circumferential surface of the notch 75 corresponds to the washer-side contact part 110, and a side of the rib 89 corresponds to the member-side contact part 120. The notch 75 and the rib 89 are in contact with each other to function as the second engaging mechanism B, and thus relative rotation of the washer 50 is restricted.

In FIGS. 24A through 25C, the washer-side step part 74 is formed on the outer circumference of the washer 50. However, the embodiment of the present invention is not limited thereto.

Figure 26:
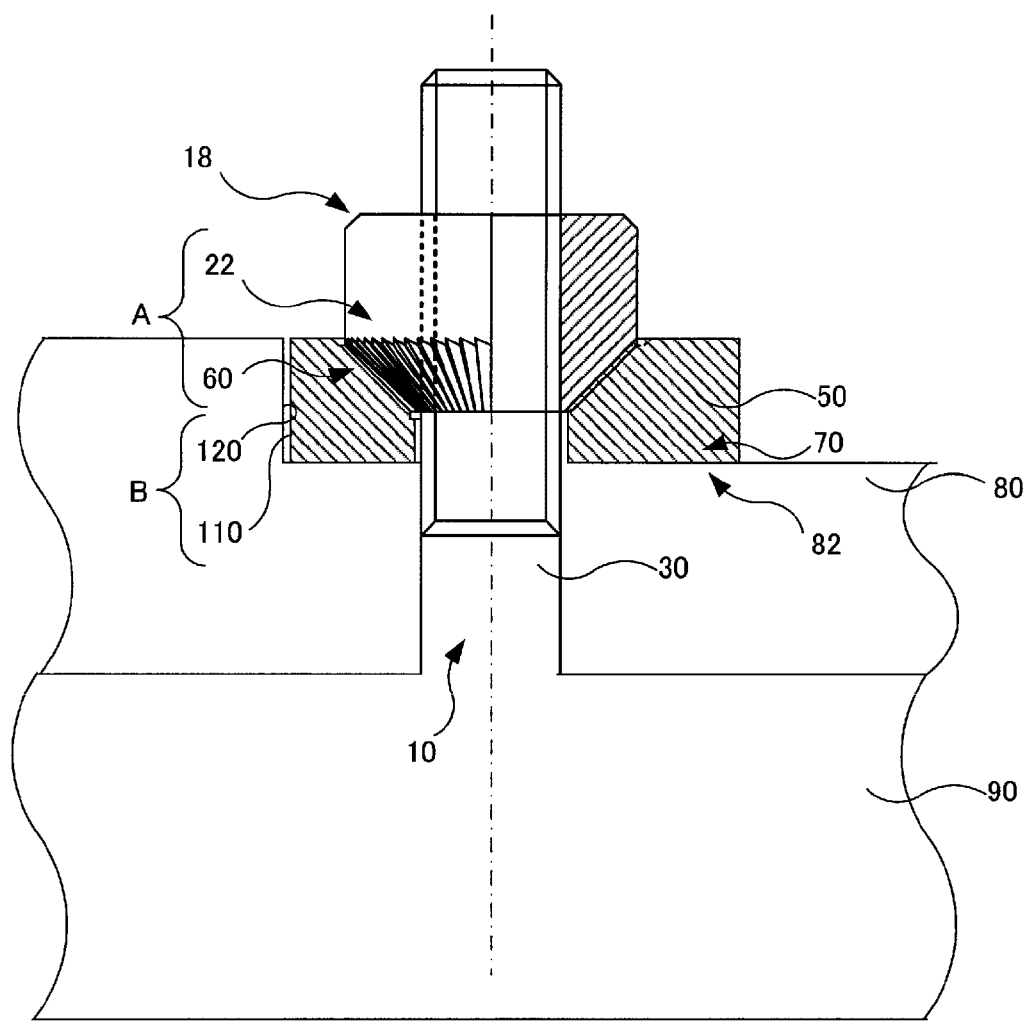
FIG. 26 is a cross-sectional side view illustrating a fastening state in a case of applying a structure for preventing reverse rotation of a threaded body of the present invention to a female screw body.

Further, in the embodiment 1 or B-2, the head part of the male screw body 10 engages the washer 50. However, the embodiment is not limited to an application to a male screw body. The loosening preventing device may be applied to a female screw body. For example, as shown in FIG. 26, by providing the first engaging mechanism A and the second engaging mechanism B among a female screw body 18, the washer 50, and the member 80 to be fastened, reverse rotation of the female screw body 18 may also be prevented.

In addition, in the embodiment 1 or B-2, the appearance of the washer 50 corresponds to a circular shape, a partial arc, or a chord. However, other shapes may be adopted. For example, the appearance of the washer 50 may be an elliptical shape, an oval shape, and a polygonal shape. Further, the appearance of the washer 50 may be a shape of a perfect circle eccentric with respect to the shaft of the screw. In detail, the appearance of the washer 50 with respect to the shaft center may preferably correspond to an imperfect circular shape (a shape other than a concentric perfect circle).

Lastly, embodiments of the present invention belonging to the group C will be described in detail with reference to the drawings.

Figure 27A:
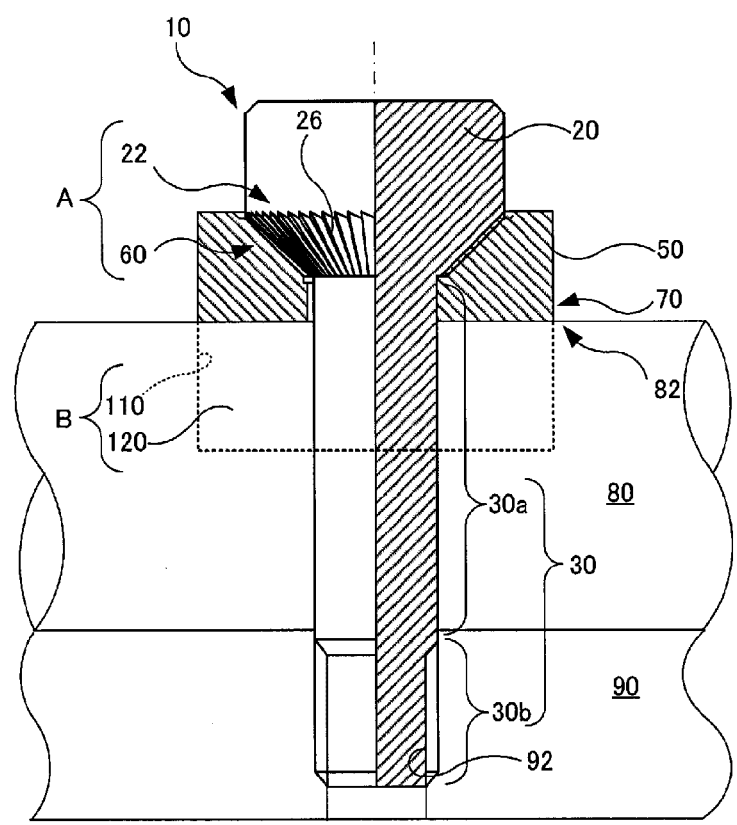
FIG. 27A is a cross-sectional front view illustrating a structure for preventing reverse rotation of a threaded body according to an embodiment C-1 of the present invention.
Figure 27B:
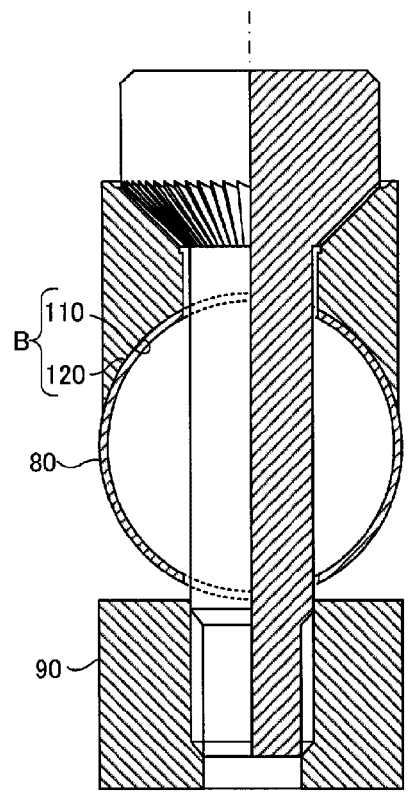
FIG. 27B is a cross-sectional side view thereof.
Figure 27C:
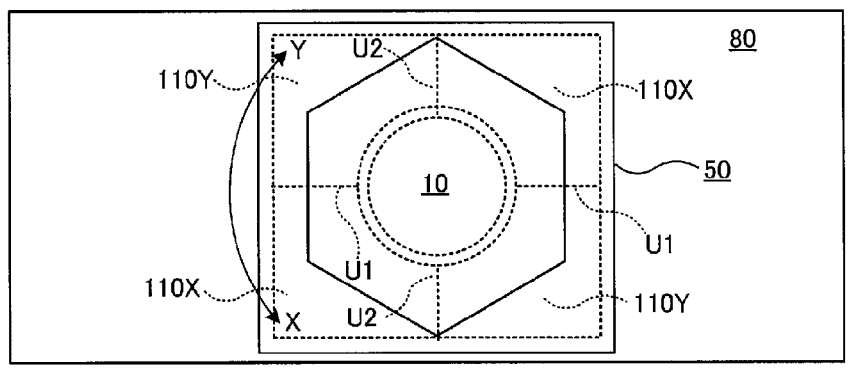
FIG. 27C is a top view thereof.
Figure 27D:
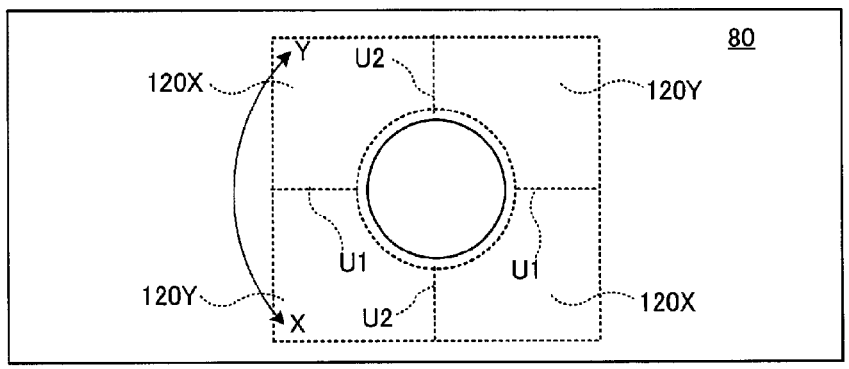
FIG. 27D is a top view illustrating only a member to be fastened.

FIGS. 27A through 27C illustrate a structure for preventing reverse rotation of a threaded body according to an embodiment C-1. The structure for preventing reverse rotation of the threaded body includes a male screw body 10, a washer 50 having a through hole 52, a first member 80 to be fastened, and a second member 90 to be fastened. The second member 90 to be fastened includes a female screw hole 92 to be screwed with the male screw body 10. By inserting the first member 80 to be fastened between the male screw body 10 and the second member 90 to be fastened, the first member 80 to be fastened is fastened to the second member 90 to be fastened. The first member 80 to be fastened is, for example, a so-called pipe material in a cylindrical structure, and a pair of through holes through which the male screw body 10 passes are formed therein.

The male screw body 10 is a so-called bolt, and includes a head part 20 and a shaft part 30. A screw-body-side seat part 22 is formed at a part corresponding to a lower portion or a root of the head part 20. The shaft part 30 includes a cylindrical part 30a and a threaded part 30b. The cylindrical part 30a is not essential.

A first receiving part 60 is formed on one (upper side of FIG. 12A) of outside and inside of the washer 50. The first receiving part 60 faces the screw-body-side seat part 22, and a first engaging mechanism A is provided therebetween. When at least the screw-body-side seat part 22 rotates the male screw body 10 being fastened in a loosening direction, the first receiving part 60 and the screw-body-side seat part 22 engage each other, and the first engaging mechanism A prevents relative rotation of the first receiving part 60 and the screw-body-side seat part 22 in the corresponding rotating direction.

A second receiving part 70 is formed on another side (lower side of FIG. 27A) of the washer 50. The first receiving part 70 faces the first member 80 to be fastened.

The first member 80 to be fastened includes a member-side seat part 82 to face the second receiving part 70 of the washer 50. The second receiving part 70 and the member-side seat part 82 are nearly joint planar areas in contact with each other, and transfer a fastening force (axial force) of the male screw body 10 to the first member 80 to be fastened. In detail, a large portion of the axial force of the male screw body 10 is transferred to the first member 80 to be fastened through the washer 50. The example of transferring the large portion of the axial force of the male screw body 10 to the first member 80 to be fastened through the washer 50 is not essential. Conversely, a large portion of the axial force may not be transferred to the first member 80 to be fastened.

A second engaging mechanism B is provided in the member-side seat part 82 of the first member 80 to be fastened and the second receiving part 70 of the washer 50 to maintain a contact state therebetween although torque is applied to the washer 50 in a predetermined direction, and to restrict relative rotation thereof.

As shown in FIG. 27B, the second engaging mechanism B includes a washer-side inclined surface 110 and a member-side inclined surface 120. The washer-side inclined surface 110 is formed in the second receiving part 70 of the washer 50, and the member-side inclined surface 120 is formed in the member-side seat part 82 of the first member 80 to be fastened.

Figure 29A:
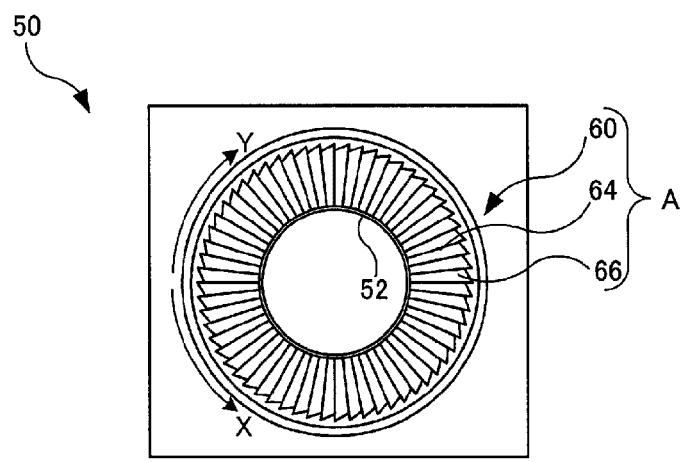
FIG. 29A is a top view of a washer used for the same structure for preventing reverse rotation.
Figure 29B:
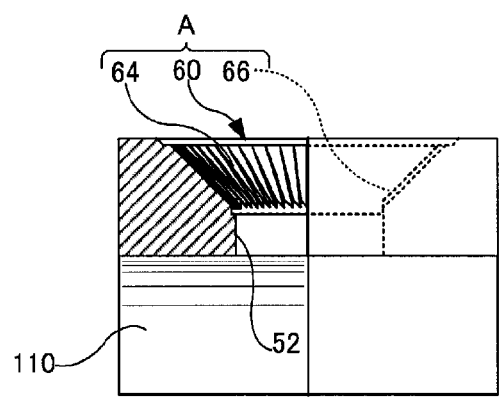
FIG. 29B is a cross-sectional front view thereof.
Figure 29C:
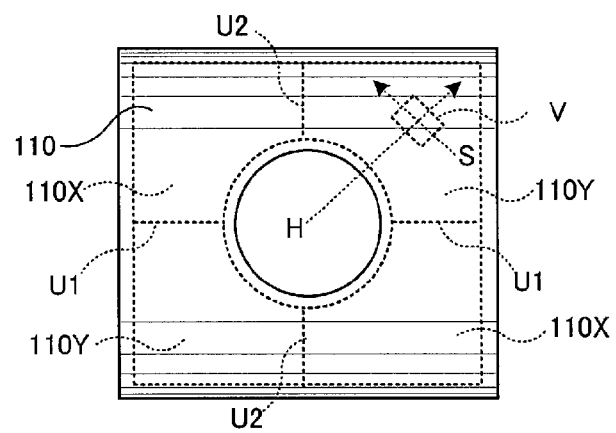
FIG. 29C is a bottom view thereof.
Figure 29D:
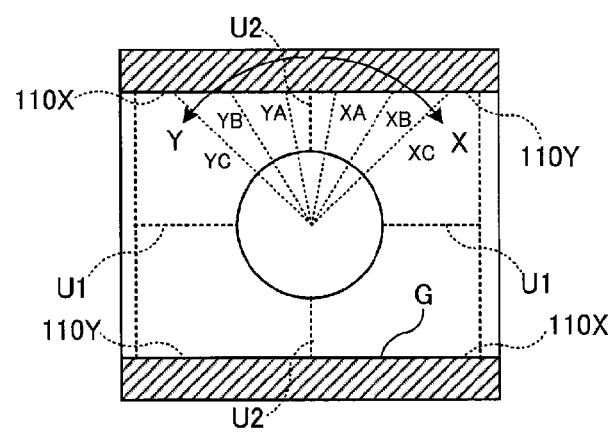
FIG. 29D is a cross-sectional bottom view

As shown in FIG. 29D, the washer-side inclined surface 110 includes an area in which a distance from a shaft center to a cross-sectional shape (a section line G) perpendicular to the shaft at a proper position on an axial line of the male screw body 10 or the through hole 52 changes in circumferential directions X and Y of the male screw body 10.

The member-side inclined surface 120 to be in contact with the washer-side inclined surface 110 also includes an area in which a distance from the shaft center to a cross-sectional shape (a section line G) perpendicular to the shaft at a proper position on the axial line of the male screw body 10 or the through hole 52 changes in the circumferential directions X and Y of the screw body 10.

Further, as already described above, in the present embodiment, since the first member 80 to be fastened is a pipe material, the member-side inclined surface 120 is provided using an outer circumferential surface of the pipe material. Thus, the washer-side inclined surface 110 to face the member-side inclined surface 120 is also provided using a curved surface including a partial circumferential surface of a virtual column having an axis inclined with respect to the shaft of the male screw body 10 (an axis in a coaxial state with an axis of the pipe material of the first member 80 to be fastened).

In detail, the washer-side inclined surface 110 includes a first washer-side inclined area 110X to face one rotating direction X of the male screw body 10, and a second washer-side inclined area 110Y to face another rotating direction Y of the male screw body 10. The member-side inclined surface 120 includes a first member-side inclined area 120Y to face the other rotating direction Y of the male screw body 10 to be in contact with the first washer-side inclined area 110X, and a second member-side inclined area 120X to face the one rotating direction X of the male screw body 10 to be in contact with the second washer-side inclined area 110Y.

For example, in a case in which the male screw body 10 is a right-hand screw, when rotating the male screw body 10 in the direction Y to tighten the male screw body 10, as shown in FIGS. 27A through 29D, the washer 50 performs relative rotation in the direction Y with respect to the member-side seat part 82 accordingly. However, as a result, the contact state between the first washer-side inclined area 110X and first member-side inclined area 120Y is maintained, and relative rotation thereof is restricted. Similarly, when loosening the male screw body 10 in the direction X, the washer 50 performs relative rotation in the direction X with respect to the member-side seat part 82 accordingly. However, as a result, the contact state between the second washer-side inclined area 110Y and the second member-side inclined area 120X is maintained, and relative rotation thereof is restricted.

Further, the first washer-side inclined area 110X and the second washer-side inclined area 110Y of the washer-side inclined surface 110 are continuous curved surfaces. However, singular points or singular lines (singular lines in the present embodiment) U1 and U2 may exist on boundaries therebetween. The singular line U1 extends in parallel in the radial direction. The singular line U2 extends in the radial direction and is displaced in the axial direction.

In addition, here, a structure in which rotation of the washer 50 is also restricted when the male screw body 10 rotates in both directions X and Y is illustrated. However, the embodiment of the present invention is not limited thereto. When at least the washer 50 rotates in the loosening direction X along with the male screw body 10, the contact state between the second washer-side inclined area 110Y and the second member-side inclined area 120X may be maintained, and relative rotation of the second receiving part 70 and the member-side seat part 82 with respect to the corresponding rotating direction X may be prevented.

As described above, by the operations of the first engaging mechanism A and the second engaging mechanism B, when the male screw body 10 rotates in the loosening direction X, relative rotation of the male screw body 10 and the first member 80 to be fastened is restricted through interposition of the washer 50. Accordingly, loosening of the male screw body 10 is prevented. In addition, when the male screw body 10 rotates in the tightening direction Y, co-rotation of the washer 50 may be restricted by the second engaging mechanism B, and an engaging operation of the first engaging mechanism A may be properly performed.

Figure 28:
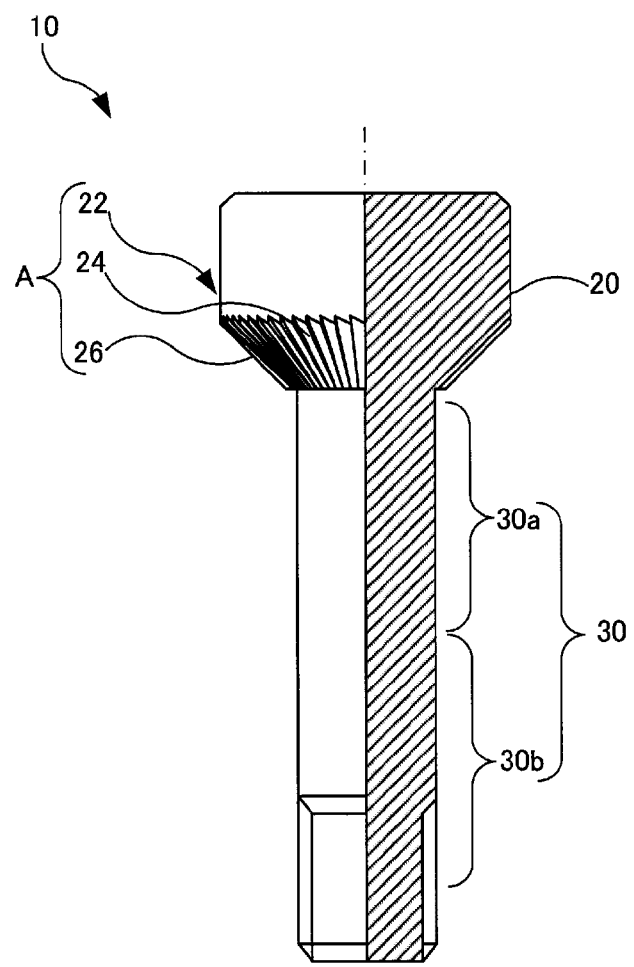
FIG. 28 is a cross-sectional front view of a male screw body used for the same structure for preventing reverse rotation.

As shown in FIG. 28, as the first engaging mechanism A, screw-body-side recesses and protrusions 24 are formed on the screw-body-side seat part 22 of the male screw body 10. The screw-body-side recesses and protrusions 24 are formed in a shape of a plurality of saw blades continuously provided in a circumferential direction. An extending direction of each of the screw-body-side recesses and protrusions 24, for example, an extending direction of a ridge, corresponds to a radial direction of the male screw body 10. Thus, the screw-body-side recesses and protrusions 24 extend radially from the shaft center.

Further, screw-body-side taper faces 26 are formed on the screw-body-side seat part 22 to be inclined in a radial direction. The screw-body-side taper faces 26 are inclined so that a center side thereof may be close to an end of the screw. Thus, the screw-body-side taper faces 26 are provided in a conical shape protruding on a front side of the screw. More preferably, the aforementioned screw-body-side recesses and protrusions 24 are formed on the screw-body-side taper faces 26.

As shown in FIGS. 29A and 29B, as the first engaging mechanism A, first-receiving-part-side recesses and protrusions 64 to engage the screw-body-side recesses and protrusions 24 are formed on the first receiving part 60 of the washer 50. The first-receiving-part-side recesses and protrusions 64 are formed in a shape of a plurality of saw blades continuously provided in the circumferential direction. An extending direction of each of the first-receiving-part-side recesses and protrusions 64, for example, an extending direction of a ridge, corresponds to the radial direction of the male screw body 10. Thus, the first-receiving-part-side recesses and protrusions 64 extend radially from a center of the through hole 52 of the washer 50.

Further, preferably, washer-side taper faces 66 are formed on the first receiving part 60 to be inclined in the radial direction. The washer-side taper faces 66 are inclined so that a center side thereof may be close to the end of the screw, thereby forming a shape of a pot. Thus, the washer-side taper faces 66 are provided in a conical shape recessed on the front side of the screw. The aforementioned first-receiving-part-side recesses and protrusions 64 are formed on the washer-side taper faces 66.

Figure 30A:
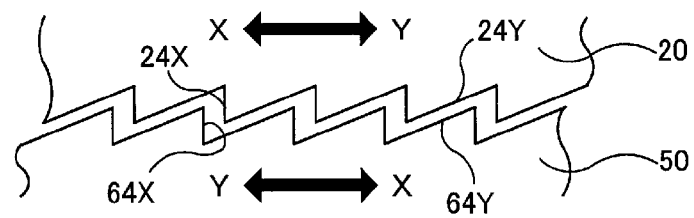
FIG. 30A illustrates an operation of saw blades of the same structure for preventing reverse rotation of the male screw body.

Accordingly, when strongly tightening the male screw body 10, the screw-body-side taper faces 26 of the screw-body-side seat part 22 are inserted into the recesses of the washer-side taper faces 66 of the washer 50 in the first engaging mechanism A, and the screw-body-side recesses and protrusions 24 engage the first-receiving-part-side recesses and protrusions 64. As shown in FIG. 30A, when the male screw body 20 rotates in a fastening direction Y, the toothed shapes of both allow relative slide thereof in a way that inclined surfaces 24Y and 64Y thereof are in contact with each other and a distance therebetween decreases in an axial direction. Conversely, when the male screw body 20 rotates in a loosening direction X, the toothed shapes prevent the relative movement thereof in a way that vertical surfaces (steeply inclined surfaces) 24X and 64X thereof are in contact with each other. In detail, by strongly tightening the male screw body 10, an engaging strength of the first engaging mechanism A may increase in the loosening direction X since the engagement between the screw-body-side recesses and protrusions 24 and the first-receiving-part-side recesses and protrusions 64 is enhanced as a distance between the screw-body-side seat part 22 and the first receiving part 60 decreases. Here, by differently setting inclination angles of the screw-body-side taper faces 26 and inclination angles of the washer-side taper faces 66, in detail, by setting inclination angles of the washer-side taper faces 66 from the shaft center to be narrower than inclination angles of the screw-body-side taper faces 26 from the shaft center, the male screw body 10 may be strongly tightened without rickety, irrespective of pitches of teeth formed on the respective taper faces. A number of the screw-body-side recesses and protrusions 24 and a number of the first-receiving-part-side recesses and protrusions 64 do not need to match. Further, phases or positions in the circumferential direction may be set properly in response to a request for mechanical strength.

As shown in FIG. 29D, when considering a state in which the washer-side inclined surface 110 of the washer 50 is cut off on a surface perpendicular to the axial direction, a distance from the shaft center of the screw to the cut surface changes in the circumferential direction. In detail, distances XA, XB, and XC from the shaft center of the screw to the second washer-side inclined area 110Y increase in the one rotating direction X of the male screw body 10. Distances YA, YB, and YC from the shaft center of the screw to the first washer-side inclined area 110X increase in the one rotating direction Y of the male crew body 10. From the foregoing, it is understood that the washer-side inclined surface 110 may engage the member-side inclined surface 120 in the circumferential direction.

When describing from another viewpoint with reference to FIG. 29C, the washer-side inclined surface 110 includes at least a slightly inclined area V which is displaced in the axial direction (toward the first member 80 to be fastened) along an outer side of one radial direction H based on the shaft of the screw body 10, and displaced in the axial direction and the circumferential direction E. Thus, the washer-side inclined surface 110 includes an area that is displaced in a direction from the first receiving part 60 in the axial direction of the male screw body 10 toward the second receiving part 70 when moving in a radially outward direction of the male screw body 10.

Further, when a somewhat space margin or a space intentionally and aggressively provided to allow elastic deformation is ignored, the washer-side inclined surface 110 and the member-side inclined surface 120 are set to be the same curved surface. In another example, an elasticity or a shape of the washer 50 may be set to fill the space margin in the way that the washer 50 is fastened with the male screw 10 and compressed in the axial direction.

Accordingly, when the second receiving part 70 of the washer 50 is in contact with the member-side seat part 82 of the first member 80 to be fastened, the washer-side inclined surface 110 is in contact with the member-side inclined surface 120. Thus, relative rotation thereof in the circumferential direction S is restricted while being aligned with the shaft center of the screw. In detail, the washer-side inclined surface 110 and the member-side inclined surface 120 act as the second engaging mechanism B.

As described above, the structure for preventing reverse rotation of the threaded body according to the embodiment C-1 prevents reverse rotation, in detail, loosening of the male screw body 10 in the way that, by interposing the washer 50, the first engaging mechanism A is provided between the screw-body-side seat part 22 and the first receiving part 60, the second engaging mechanism B is provided between the member-side seat part 82 and the second receiving part 70, and the male screw body 10 engages the first member 80 to be fastened in the circumferential direction S by mutual restrictions of the first engaging mechanism A and the second engaging mechanism B when an attempt is made to loosen the male screw body 10. Thus, despite occurrence of oscillations, a fastening state free from loosening may be obtained.

Further, in the present embodiment, as the first engaging mechanism A, the screw-body-side recesses and protrusions 24 and the first-receiving-part-side recesses and protrusions 64 are formed in the shape of a plurality of saw blades continuously provided in the circumferential direction, and act as a so-called ratchet device or one-way clutch device. Thus, in a case of fastening operation, relative movements of the screw-body-side recesses and protrusions 24 and the first-receiving-part-side recesses and protrusions 64 are allowed, whereby smooth relative rotation is implemented. Conversely, in a case of loosening operation, relative movements of the screw-body-side recesses and protrusions 24 and the first-receiving-part-side recesses and protrusions 64 are completely restricted. Therefore, both fastening workability and loosening preventing may be reasonably achieved.

In addition, in the embodiment C-1, as the first engaging mechanism A, the screw-body-side taper faces 26 and the washer-side taper faces 66 are formed on the screw-body-side seat part 22 and the first receiving part 60, respectively, and thus a contact area therebetween may increase. Furthermore, a fastening force in the axial direction of the male screw body 10 is also applied in the radial direction through the taper faces. The taper faces strongly press one another in the radial direction, whereby self-excitation centering may be performed. Therefore, concentricities of the male screw body 10 and the washer 50 may increase, and an engagement precision of the screw-body-side recesses and protrusions 24 and the first-receiving-part-side recesses and protrusions 64 may increase. Additionally, a minute difference in angle may be made by setting inclinations of the screw-body-side taper faces 26 on the protrusion side to be slightly steep, and setting inclination angles of the washer-side taper faces 66 on the recess side to be slightly narrow. In doing so, with an increase in a fastening pressure, the taper faces may be gradually in contact with one another from the center in the radially outward direction.

Besides, in the embodiment C-1, as the second engaging mechanism B, the washer-side inclined surface 110 and the member-side inclined surface 120 facing each other include an area in which a cross-sectional shape (a section line G) perpendicular to the shaft at a proper position on an axial line is displaced in the circumferential directions X and Y of the male screw body 10. By the shape, once the washer-side inclined surface 110 is in contact with the member-side inclined surface 120, relative rotation in the circumferential direction is restricted, and an axial force of the threaded body is transferred through the washer-side inclined surface 110 and the member-side inclined surface 120 facing each other. Since a restricting force of relative rotation is applicable using the axial force of the threaded body, the relative rotation may be definitely prevented as much as the threaded body is tightened. However, when the screw-body-side recesses and protrusions 24 and the first-receiving-part-side recesses and protrusions 64 sufficiently interlock one another, even at a tightening strength not causing axial force transfer, rotation in a predetermined direction, in detail, loosening may be sufficiently prevented.

Furthermore, by providing the washer-side inclined surface 110 to be a curved surface, the washer-side inclined surface 110 may be in close contact with the member-side inclined surface 120 through mutual elastic deformation. Thus, when fastening the threaded body, so-called looseness may be restrained. In particular, as described in the present embodiment, when the first member 80 to be fastened is a member of a cylindrical or columnar shape, the washer-side inclined surface 110 may be in close contact with the member-side inclined surface 120 by effectively utilizing a shape of a circumferential surface of the first member 80 to be fastened.

Figure 30B:
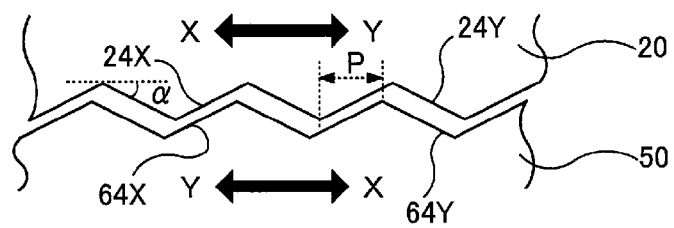
FIGS. 30B through 30D illustrate modified examples of the saw blades.
Figure 30C:
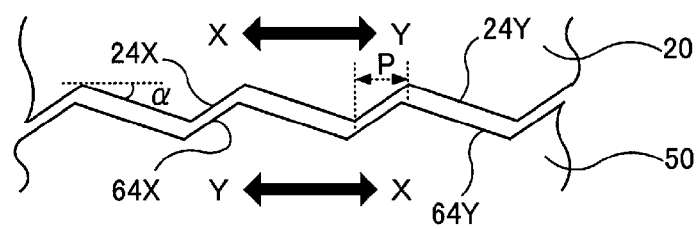

In the embodiment C-1, as the first engaging mechanism A, the screw-body-side recesses and protrusions 24 and the first-receiving-part-side recesses and protrusions 64 are provided in the shape of saw blades. However, the embodiment of the present invention is not limited thereto. For example, as shown in FIG. 30B, the recesses and protrusions may be provided in a threaded shape (including inclined surfaces on both sides). In doing so, when the male screw body 20 rotates in the loosening direction X, the inclined surfaces 24X and 64X perform relative movement. However, along the inclined surfaces, the screw-body-side recesses and protrusions 24 and the first-receiving-part-side recesses and protrusions 64 are separate from one another. When a moving distance (a separation angle α) is set to be greater than a lead angle of the male screw body 10, the screw-body-side recesses and protrusions 24 and the first-receiving-part-side recesses and protrusions 64 are separate from one another although an attempt is made to loosen the male screw body 10. Thus, the male screw body 10 may not be loosened. In addition, FIG. 30B illustrates the recesses and protrusions having cross-sections of isosceles triangles. However, as shown in FIG. 30C, the inclination angles of the inclined surfaces 24X and 64X to be in contact with each other when rotation is performed in the loosening direction may be set to be smoother than the inclination angles of the inclined surfaces 24Y and 64Y to be in contact with each other when rotation is performed in the fastening direction. In doing so, a circumferential distance P of the inclined surfaces 24Y and 64Y which need to move over each other when rotation is performed in the fastening direction may decrease, and thus a gutter (gap) after fastening may be reduced.

Figure 30D:
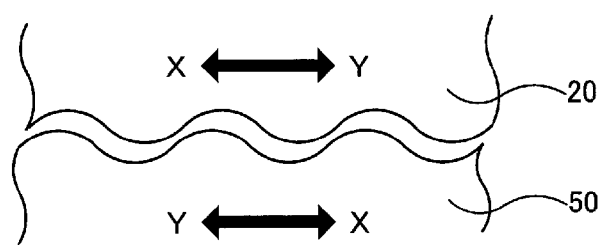
Figure 31A:
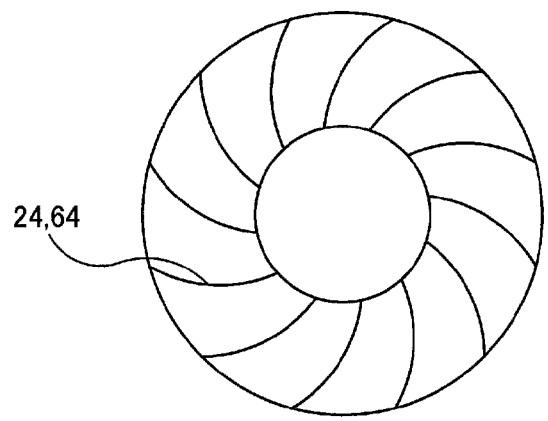
Figure 31B:
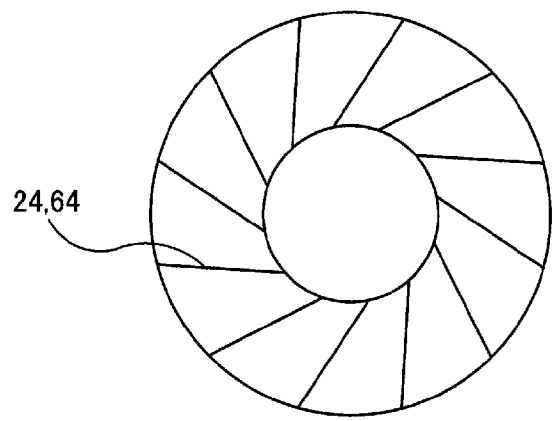

Further, as an application of FIGS. 30A through 30C, as shown in FIG. 30D, the recesses and protrusions may be provided in a wavy shape in which crests and roots are curved. In this example, when fastening, smooth manipulation may be obtained. Moreover, although the embodiment C-1 suggests the recesses and protrusions extending in the radial direction, swirling-shaped (spiral) grooves or threads (recesses and protrusions) may be formed, as shown in FIG. 31A. As shown in FIG. 31B, grooves or threads (recesses and protrusions) extending rectilinearly may be disposed to be inclined such that a circumferential phase may change with respect to the radial direction of the screw. As shown in FIG. 31C, a so-called emboss shape in which a plurality of minute recesses and protrusions are formed in the circumferential direction of the screw and on both sides (planarly) of the radial direction may be adopted.

Furthermore, as shown in the embodiment C-1, the shapes of the screw-body-side recesses and protrusions 24 and the first-receiving-part-side recesses and protrusions 64 do not need to match (be similar to one another). For example, a combination of different shapes selected from the variety of the shapes as shown in FIGS. 30A through 31C may be used.

Figure 32A:
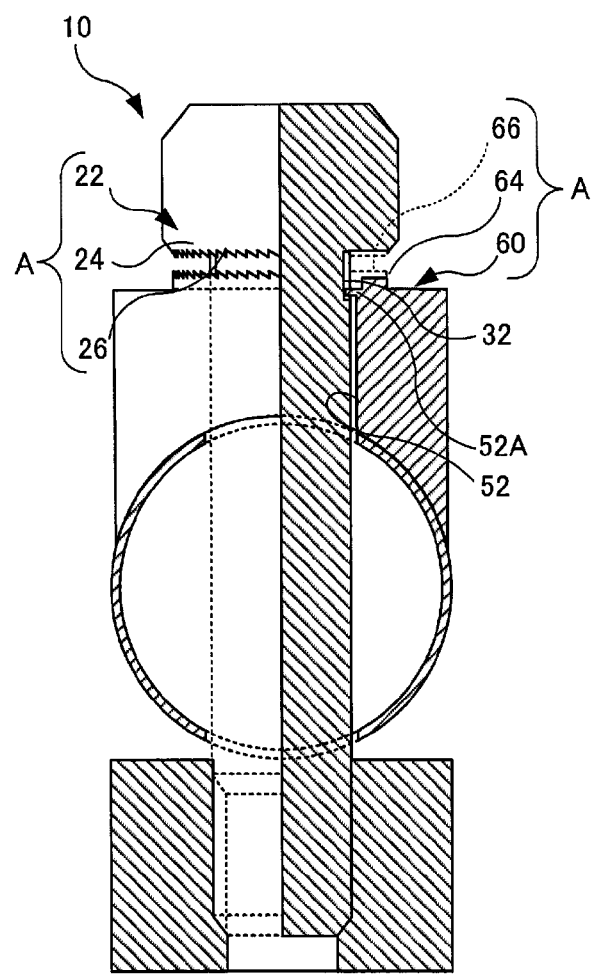
FIG. 32A is a cross-sectional front view illustrating an application of the same structure for preventing reverse rotation.

In the embodiment C-1, the screw-body-side taper faces 26 are provided in a shape of protrusions, and the washer-side taper faces 66 are provided in a shape of recesses. However, the embodiment of the present invention is not limited thereto. For example, the screw-body-side taper faces 26 and the washer-side taper faces 66 may be provided in planar shapes as shown in FIG. 32A. In another example, a constriction 32 may be formed on the base of the shaft part 30 of the male screw body 10 to maintain the washer 50. An engaging lump 52A protruding on an inner circumferential side is formed in the through hole 52 of the washer 50, thereby engaging the constriction 32 of the male screw body 10. Accordingly, the male screw body 10 and the washer 50 may be integrated (combined) in advance.

Figure 32B:
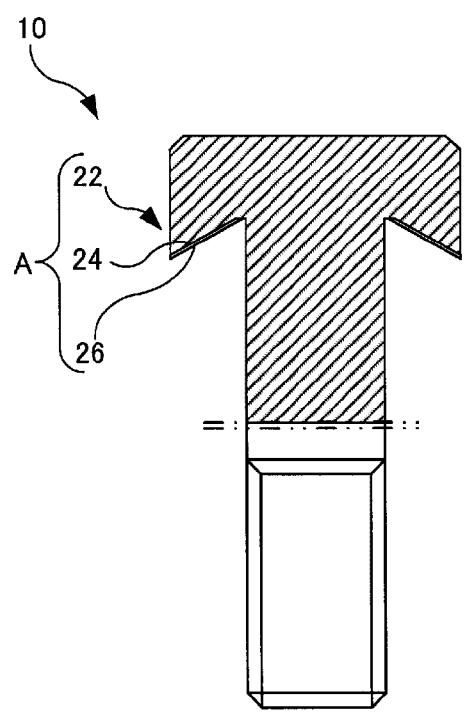
FIG. 32B is a cross-sectional front view illustrating an application of the male screw body.

Further, as shown in the male screw body 10 of FIG. 32B, the screw-body-side taper faces 26 may be provided in a shape of recesses. In particular, although not shown in the drawings, the inclination angles of the taper faces may not need to match when an elastic deformation of the washer 50 is effectively utilized. The taper faces may be formed on one side of the male screw body 10 or the washer 50. Further, by providing the taper faces in the shape of protrusions or recesses, both may be in close contact with each other using elastic deformation of the washer. In addition, to obtain an elasticity of the washer 50, a basic shape of the washer 50 may be a so-called spring washer which is formed in a spiral shape, or a disc spring washer.

Figure 33A:
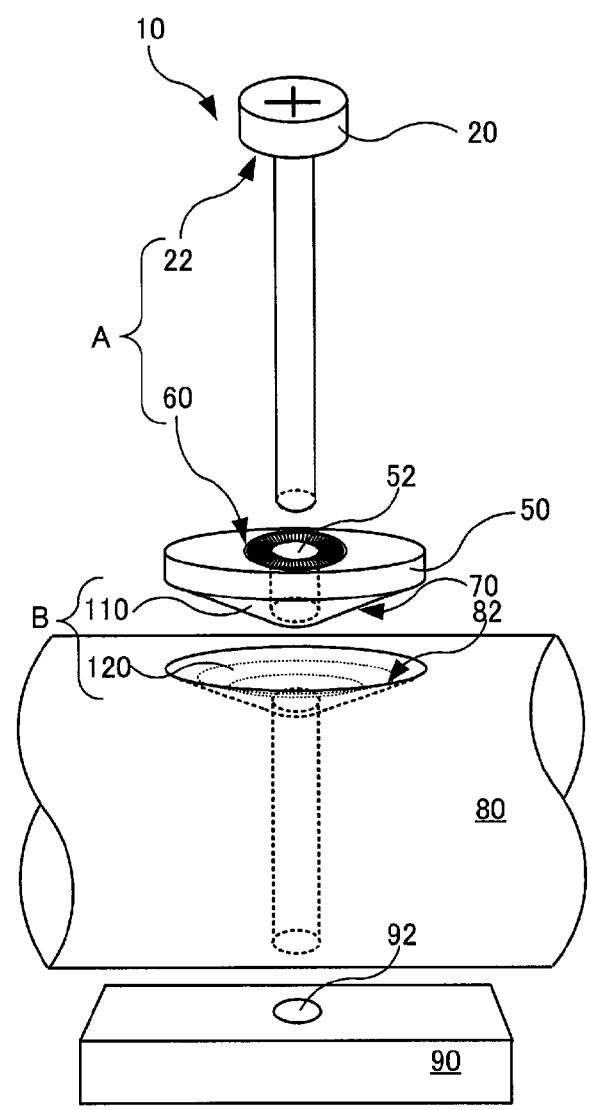
FIG. 33A is an exploded perspective view of a structure for preventing reverse rotation of a threaded body according to an embodiment C-2 of the present invention.
Figure 33B:
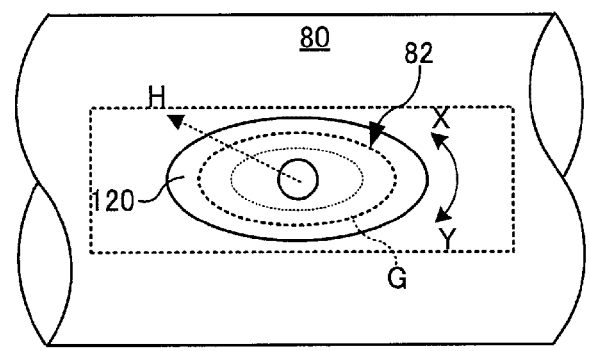
FIG. 33B is a top view of a member to be fastened.
Figure 33C:
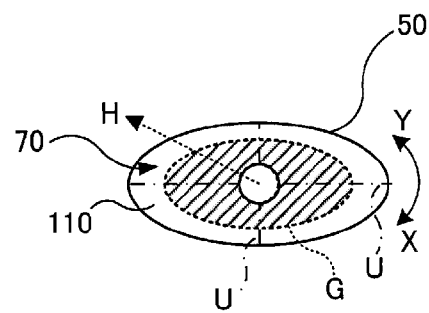
FIG. 33C is a cross-sectional bottom view of a washer.

FIGS. 33A through 33C illustrate a structure for preventing reverse rotation of a threaded body according to an embodiment C-2. As shown in FIG. 33A, the screw-body-side seat part 22 of the male screw body 10 is provided in a planar shape, and the screw-body-side recesses and protrusions 24 in the shape of saw blades are formed thereon. The first receiving part 60 of the washer 50 is provided in a planar shape, and the first-receiving-part-side recesses and protrusions 64 in the shape of saw blades are formed thereon.

As shown in the bottom view of FIG. 33C, a central portion of the second receiving part 70 of the washer 50 is provided in a shape of a protrusion in the axial direction of the male screw body 10. In detail, an overall hemisphere which is similar to an oval and a cross-sectional shape in a direction perpendicular to the shaft is provided, and the through hole 52 is formed at a center thereof. Using the shape, the washer-side inclined surface 110 is formed on the entire area of the second receiving part 70. The washer-side inclined surface 110 includes an area in which a cross-sectional shape (a section line G) perpendicular to the shaft at a proper position on an axial line of the male screw body 10 or the through hole 52 is displaced based on the shaft center in circumferential directions X and Y of the male screw body 10. In detail, the washer-side inclined surface 110 includes an area that is displaced in a direction from the first receiving part in the axial direction of the male screw body 10 toward the second receiving part 70 when moving in a radially inward direction of the male screw body 10. The washer-side inclined surface 110 is provided toward an inner side of the radial direction H, and inclined to protrude toward the first member 80 to be fastened. In addition, a singular line or a singular line U extends along a short axis and a long axis of the oval.

As shown in the top view of FIG. 33B, the member-side seat part 82 of the first member 80 to be fastened is provided in a shape of a recess similar to an oval hemisphere, and a female screw hole 92 is formed at a center of the bottom thereof. The member-side inclined surface 120 is formed using the shape of the member-side seat part 82. The member-side inclined surface 120 includes an area in which a cross-sectional shape (a section line G) perpendicular to the shaft at a proper position on an axial line of the male screw body 10 is displaced based on the shaft center in the circumferential directions X and Y of the male screw body 10. When strongly tightening the male screw body 10, the washer-side inclined surface 110 is in contact with the member-side inclined surface 120, the axial force of the male screw body 10 is transferred, and simultaneously relative rotation of the washer 50 and the first member 80 to be fastened is prevented.

As described above, in a case of the member-side seat part 82 similar to a partial recess of a pipe material, by providing the second receiving part 70 of the washer 50 in a bowl shape which is an imperfect circle shape protruding on the first member 80 to be fastened, both may be in close contact with each other. In particular, through a surface contact area of a pot shape, the axial force of the male screw body 10 may be efficiently transferred to the first member 80 to be fastened.

Figure 34:
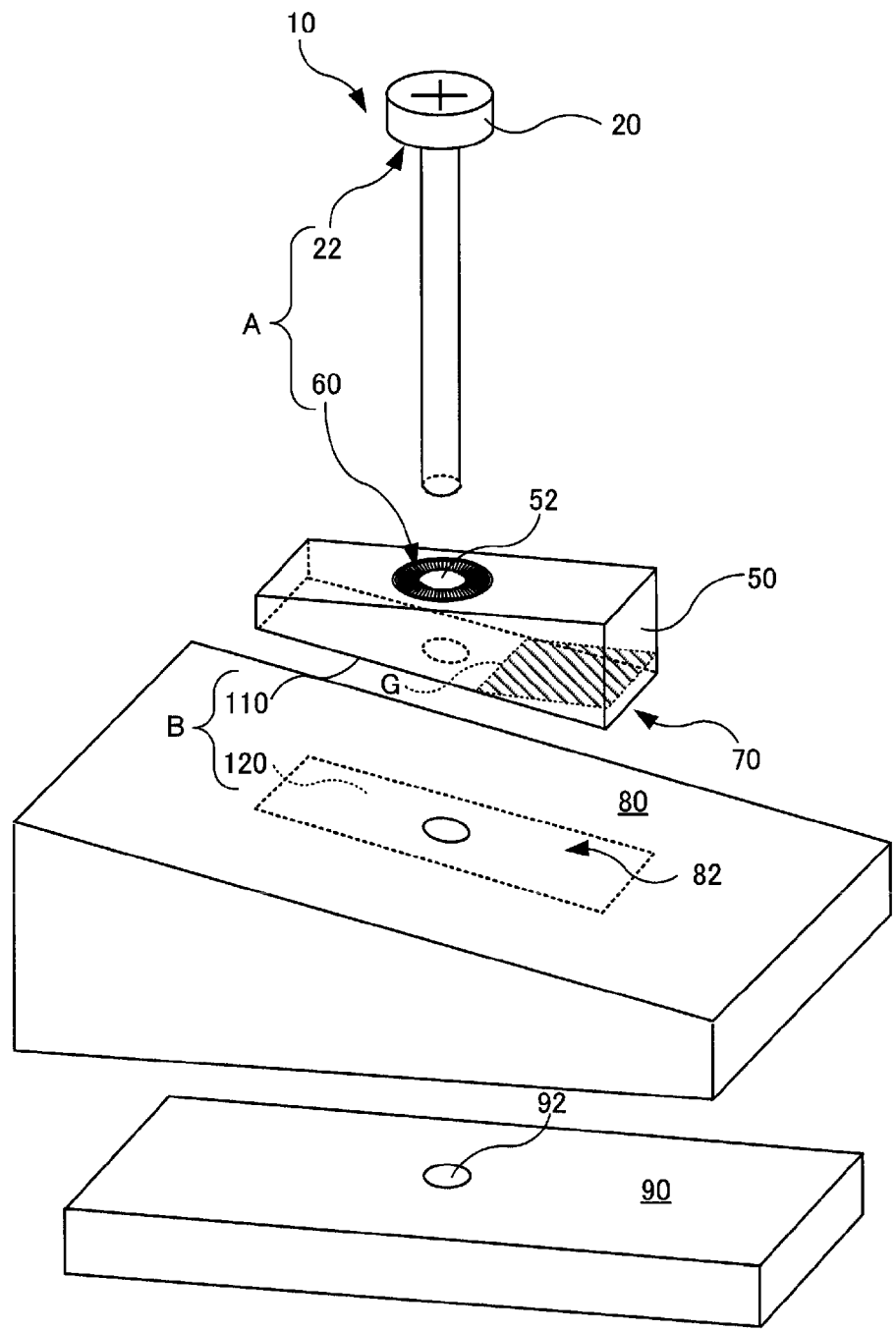
FIG. 34 is an exploded perspective view of a structure for preventing reverse rotation of a threaded body according to an embodiment C-3 of the present invention.

FIG. 34 illustrates a structure for preventing reverse rotation of a screw according to an embodiment C-3. As shown in FIG. 34A, the screw-body-side seat part 22 of the male screw body 10 is provided in a planar shape, and the screw-body-side recesses and protrusions 24 in the shape of saw blades are formed thereon. The first receiving part 60 of the washer 50 is provided in a planar shape, and the first-receiving-part-side recesses and protrusions 64 in the shape of saw blades are formed thereon.

Further, the second receiving part 70 of the washer 50 is provided in a shape of a single plane inclined with respect to the axial direction of the male screw body 10. The washer-side inclined surface 110 is formed on the second receiving part 70 using the shape. In the washer-side inclined surface 110, a distance from the shaft center to a cross-sectional shape (a section line G) perpendicular to the shaft of the male screw body 10 changes in a circumferential direction of the male screw body 10.

The member-side seat part 82 of the first member 80 to be fastened is also provided in a shape of a single plane inclined with respect to the axial direction of the male screw body 10. Using the shape of the member-side seat part 82, the member-side inclined surface 120 in which a distance from the shaft center to a cross-sectional shape perpendicular to the shaft of the male screw body 10 changes in the circumferential direction of the male screw body 10 is formed. Accordingly, when strongly tightening the male screw body 10, the washer-side inclined surface 110 is in contact with the member-side inclined surface 120, the axial force of the male screw body 10 is transferred, and simultaneously relative rotation of the washer 50 and the first member 80 to be fastened is prevented.

As described above, in a case in which the member-side seat part 82 is provided in a plane inclined with respect to the axial direction, by forming the washer-side inclined surface 110 to be parallel to the member-side seat part 82 in the second receiving part 70 of the washer 50, both of the washer-side inclined surface 110 and the member-side inclined surface 120 may be in close contact with each other. Further, the second engaging mechanism B is provided using the washer-side inclined surface 110 and the member-side inclined surface 120, such that the axial force of the male screw body 10 is transferred, and simultaneously relative rotation of the washer 50 and the first member 80 to be fastened is restricted.

In addition, in the embodiment C-3, the washer-side inclined surface 110 and the member-side inclined surface 120 correspond to a single plane. However, the washer-side inclined surface 110 and the member-side inclined surface 120 may be provided using a plurality of planes with different inclination angles. For example, two wedge-shaped inclined surfaces having V-shapes on sides may be combined, or at least three polygonal bowl-shaped inclined surfaces may be used. Further, the washer-side inclined surface 110 and the member-side inclined surface 120 may be provided using a combination of a plane and a curved surface.

In the example shown in FIGS. 32A and 32B, the male screw body 10 and the washer 50 are integrated in advance through the constriction 32 of the male screw body 10 and the engaging lump 52A of the washer 50. However, the manner therefor is not limited thereto. For example, by providing magnetism on at least one side, the male screw body 10 and the washer 50 may be integrated using a magnetic force. Besides, the male screw body 10 and the washer 50 may be integrated in advance using an adhesive, (spot) welding, and press fitting (frictional force). The male screw body 10 and the washer 50 may also be integrated using an auxiliary device such as an O-ring.

Figure 35:
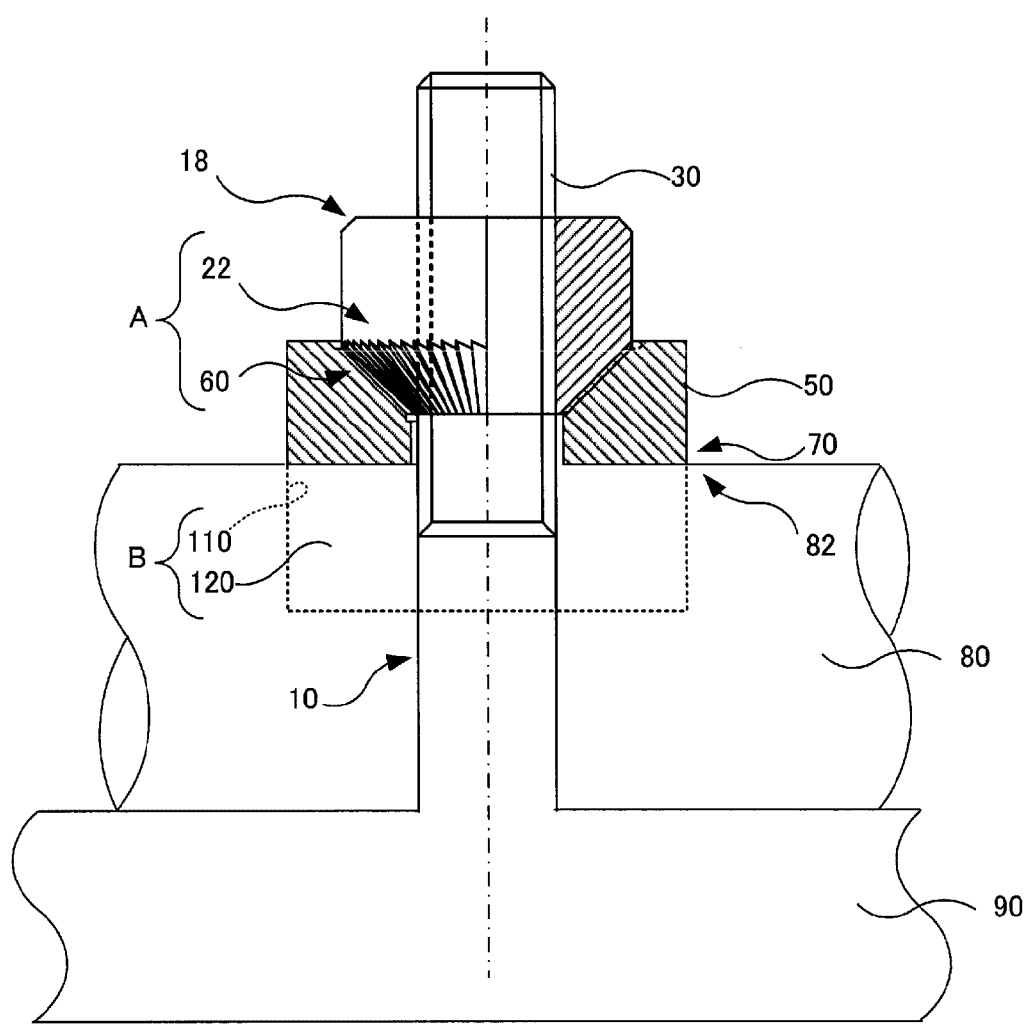
FIG. 35 is a cross-sectional side view illustrating a fastening state in a case of applying a structure for preventing reverse rotation of a threaded body of the present invention to a female screw body.

In the embodiments 1 through C-3, the head part of the male screw body 10 engages the washer 50. However, the embodiments are not limited to an application to a male screw body. The loosening preventing device may be applied to a female screw body. For example, as shown in FIG. 35, as an application of the embodiment C-1, by providing the first engaging mechanism A and the second engaging mechanism B among a female screw body 18, the washer 50, and the first member 80 to be fastened, reverse rotation of the female screw body 18 may also be prevented.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the embodiments of the present invention, loosening of a screw may be definitely prevented through a simple structure.

DESCRIPTIONS OF REFERENCE NUMERALS

- 10 Male screw body
- 20 Head part
- 22 Screw-body-side seat part
- 24 Screw-body-side recesses and protrusions
- 23 Pressed face
- 26 Screw-body-side taper faces
- 30 Shaft part
- 30*a* Cylindrical part
- 30*b* Threaded part
- 50 Washer
- 52 Through hole
- 52A Engaging lump
- 60 First receiving part
- 64 First-receiving-part-side recesses and protrusions
- 66 Washer-side taper faces
- 70 Second receiving part
- 72 Outer wall
- 74 Washer-side step part
- 80 Member to be fastened
- 82 Member-side seat part
- 84 Recessed housing part
- 89 Rib
- 90 Base or second fastening member
- 92 Female screw hole
- 110 Washer-side contact part
- 110X First washer-side contact area or first washer-side inclined area
- 110Y Second washer-side contact area or second washer-side inclined area
- 120 Member-side contact part or member-side inclined surface
- 120X Second member-side contact area or second member-side inclined area
- 120Y First member-side contact area or first member-side inclined area

The invention claimed is:

1. A structure for preventing reverse rotation of a threaded body, the structure comprising:
   a screw body having a thread, and a washer to fasten a member to be fastened through the screw body and the washer, wherein the screw body comprises a screw-body-side seat part to face the washer, and the washer comprises a first receiving part to face the screw-body-side seat part, and a second receiving part to face the member to be fastened, the member comprising a member-side seat part;
   a first engaging mechanism provided between the screw-body-side seat part and the first receiving part to maintain an engaging state therebetween although torque is applied to the screw-body-side seat part in a predetermined direction; and
   a second engaging mechanism provided between the member-side seat part and the washer to maintain an engaging state therebetween although torque is applied to the washer in the predetermined direction, such that rotation of the screw body being fastened in the predetermined direction is prevented, wherein the second engaging mechanism is provided between the member-side seat part and the second receiving part to maintain an engaging state therebetween although torque is applied to the washer in the predetermined direction, such that rotation of the screw body being fastened in the predetermined direction is prevented, and wherein the member-side seat part comprises a recessed housing part to receive the second receiving part, and the second engaging mechanism obtains the engaging state by interlocking the second receiving part and the recessed housing part.

2. The structure of claim 1, wherein the first engaging mechanism comprises screw-body-side recesses and protrusions formed on the screw-body-side seat part, and first-receiving-part-side recesses and protrusions formed on the first receiving part to engage the screw-body-side recesses and protrusions, such that the engaging state is obtained.

3. The structure of claim 2, wherein the screw-body-side recesses and protrusions have at least one of a shape of saw blades provided in a circumferential direction, a threaded shape, a wavy shape, a shape of swirling-shaped grooves or threads, and an emboss shape.

4. The structure of claim 2, wherein the first-receiving-part-side recesses and protrusions have at least one of a shape of saw blades provided in a circumferential direction, a threaded shape, a wavy shape, a shape of swirling-shaped grooves or threads, and an emboss shape.

5. The structure of claim 1, wherein screw-body-side taper faces are formed on the screw-body-side seat part to be inclined in a radial direction, and washer-side taper faces are formed on the first receiving part to be inclined in a radial direction.

6. The structure of claim 1, wherein an engaging strength of the first engaging mechanism increases in the loosening direction as a distance between the screw-body-side seat part and the first receiving part decreases.

7. The structure of claim 1, wherein the first engaging mechanism allows relative rotation of the screw-body-side seat part in a tightening direction between the screw-body-side seat part and the first receiving part.

8. The structure of claim 1, wherein a distance from a shaft of the screw body to an inner wall of the recessed housing part changes in a circumferential direction, and a distance from the shaft of the screw body to an outer wall of the second receiving part changes in the circumferential direction, such that the engaging state is obtained through a contact between the inner wall of the recessed housing part and the outer wall of the second receiving part.

9. The structure of claim 1, wherein a fastening strength of the screw body is transferred to the member to be fastened through a contact surface between a bottom of the recessed housing part and the second receiving part.

10. The structure of claim 1, wherein the inner wall of the recessed housing part and the outer wall of the second receiving part have a shape of circles eccentric with respect to the shaft of the screw body.

11. The structure of claim 1, wherein the member-side seat part comprises a member-side step part stepped in an axial direction of the screw body, and the second receiving part comprises a washer-side step part to engage the member-side step part.

12. The structure of claim 1, wherein the washer comprises a washer-side contact part at a distance from a shaft of the screw body around the second receiving part, the distance changing in a circumferential direction, the washer-side contact part contacts and engages a portion of the body to be fastened, such that the second engaging mechanism maintains a contact state therebetween although torque is applied to the washer in the predetermined direction, and the first engaging mechanism prevents relative rotation between the screw body and the washer in the predetermined direction, and the second engaging mechanism prevents relative rotation between the washer and the member to be fastened in the predetermined direction, whereby relative rotation between the screw body and the member to be fastened in the predetermined direction is prevented.

13. The structure of claim 12, wherein the washer-side contact part comprises a first washer-side contact area to face one rotating direction of the screw body, and a second washer-side contact area to face another rotating direction of the screw body.

14. The structure of claim 12, wherein the member to be fastened comprises a member-side contact part to be in contact with the washer-side contact part, the member-side contact part at a distance from a shaft of the screw body around the member-side seat part, the distance changing in a circumferential direction, and the second engaging mechanism maintains the contact state therebetween through the washer-side contact part and the member-side contact part although torque is applied to the washer in the predetermined direction, such that rotation of the screw body being the member to be fastened in the predetermined direction is prevented by the second engaging mechanism.

15. The structure of claim 14, wherein the member-side contact part comprises a first member-side contact area to face the other rotating direction of the screw body and to be in contact with the washer-side contact part, and a second member-side contact area to face the one rotating direction of the screw body and to be in contact with the second member-side contact part.

16. The structure of claim 15, wherein the washer-side contact part extends from the member to be fastened toward the washer in an axial direction of the screw body, or extends from the second receiving part of the washer toward the member to be fastened in an axial direction of the screw body.

17. The structure of claim 1, wherein the second receiving part of the washer comprises a washer-side inclined surface to face the member-side seat part, the washer-side inclined surface comprises an area in which a distance from a shaft center to a cross-sectional shape perpendicular to the shaft of the screw body changes in a circumferential direction of the screw body, the washer-side inclined surface engages the member-side seat part of the member to be fastened, such that the second engaging mechanism maintains a contact state therebetween although torque is applied to the washer in the predetermined direction, and the first engaging mechanism prevents relative rotation between the screw body and the washer in the predetermined direction, and the second engaging mechanism prevents relative rotation between the washer and the member to be fastened in the predetermined direction, whereby relative rotation between the screw body and the member to be fastened in the predetermined direction is prevented.

18. The structure of claim 17, wherein the washer-side inclined surface comprises an area that is displaced in a direction from the first receiving part in the axial direction of the screw body toward the second receiving part when moving in a radially outward direction or a radially inward direction of the screw body.

\* \* \* \* \*